(12) United States Patent
Neill

(10) Patent No.: US 11,630,826 B2
(45) Date of Patent: Apr. 18, 2023

(54) REAL-TIME PROCESSING OF A DATA STREAM USING A GRAPH-BASED DATA MODEL

(71) Applicant: RN Technologies, LLC, Garden City, NY (US)

(72) Inventor: Richard Neill, Garrison, NY (US)

(73) Assignee: RN Technologies, LLC, Garden City, NY (US)

( * ) Notice: Subject to any disclaimer, the term of this patent is extended or adjusted under 35 U.S.C. 154(b) by 0 days.

(21) Appl. No.: 17/328,983

(22) Filed: May 24, 2021

(65) Prior Publication Data

US 2021/0374143 A1 Dec. 2, 2021

Related U.S. Application Data

(60) Provisional application No. 62/704,834, filed on May 29, 2020.

(51) Int. Cl.
*G06F 16/2455* (2019.01)
*G06F 9/54* (2006.01)
*G06F 16/901* (2019.01)
*G06F 16/25* (2019.01)

(52) U.S. Cl.
CPC ........ *G06F 16/24568* (2019.01); *G06F 9/541* (2013.01); *G06F 16/254* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 10,262,271 B1* | 4/2019 | Doddi | G06N 5/022 |
| 2003/0189943 A1* | 10/2003 | Gorti | H04L 47/6215 |
| | | | 370/330 |
| 2014/0156806 A1* | 6/2014 | Karpistsenko | H04L 67/2885 |
| | | | 709/219 |
| 2017/0007148 A1* | 1/2017 | Kaditz | A61B 5/055 |
| 2017/0091673 A1* | 3/2017 | Gupta | G06N 5/022 |

(Continued)

OTHER PUBLICATIONS

Al-Kateb et al., "Adaptive-Size Reservoir Sampling over Data Streams," 19th International Conference on Scientific and Statistical Database Management (SSDBM), Jul. 2007, 10 pages.

(Continued)

*Primary Examiner* — Alex Gofman
*Assistant Examiner* — Umar Mian
(74) *Attorney, Agent, or Firm* — Fish & Richardson P.C.

(57) ABSTRACT

A method for processing of a data stream using a graph-based data model includes receiving a data stream including data messages; disassembling the data messages data elements and metadata; generating a structured data model comprising the set of data elements based on the type of the data elements and the pattern of the data messages; instantiating a workflow to process the structured data model; configuring a CPS-G model sub-graph to add to the CPS-G model based on the type of the data elements and the pattern of the data messages; adding the CPS-G model sub-graph to the CPS-G model to form the CPS-G dataset; and storing the CPS-G dataset including the CPS-G model sub-graph in a data store for further processing by streaming computation and machine learning algorithms.

37 Claims, 39 Drawing Sheets

(56) References Cited

U.S. PATENT DOCUMENTS

| | | | | |
|---|---|---|---|---|
| 2017/0147709 | A1* | 5/2017 | Ganz | H04L 67/10 |
| 2017/0289240 | A1* | 10/2017 | Ghare | G06F 16/27 |
| 2018/0039696 | A1* | 2/2018 | Zhai | G06F 16/334 |
| 2019/0196795 | A1* | 6/2019 | Cavalier | G06F 9/541 |
| 2019/0286972 | A1* | 9/2019 | El Husseini | G06N 3/063 |
| 2019/0362016 | A1* | 11/2019 | Xie | G06F 16/2465 |
| 2020/0027196 | A1* | 1/2020 | Wolfson | G06T 5/50 |
| 2020/0082026 | A1* | 3/2020 | Tian | G06F 16/288 |
| 2021/0049455 | A1* | 2/2021 | Kursun | G06N 3/08 |
| 2021/0157858 | A1* | 5/2021 | Stevens | G06F 40/237 |

OTHER PUBLICATIONS

Chao, "A general purpose unequal probability sampling plan," Biometrika, Dec. 1982, 69(3):653-656.

Efraimidis et al., "Weighted random sampling with a reservoir," Information Processing Letters, Mar. 2006, 97(5):181-185.

Efraimidis, "Weighted Random Sampling over Data Streams," https://arxiv.org/abs/1012.0256v2, Jul. 2015, 14 pages.

Ghatage, "Frequent Pattern Mining Over Data Stream Using Compact Sliding Window Tree & Sliding Window Model," International Research Journal of Engineering and Technology (IRJET), Jul. 2015, 2(4), 217-223, 8 pages.

Scarselli et al., "The Graph Neural Network Model," IEEE Transactions on Neural Networks, Jan. 2009, 20(1):61-80.

Tangwongsan et al., "Parallel Streaming Random Sampling," https://arxiv.org/abs/1906.04120, Jun. 1-17, 2019.

Wu et al., "A Comprehensive Survey on Graph Neural Networks," IEEE Transactions on Neural Networks and Learning Systems, Jan. 2021, 32(1):4-24, 22 pages.

* cited by examiner

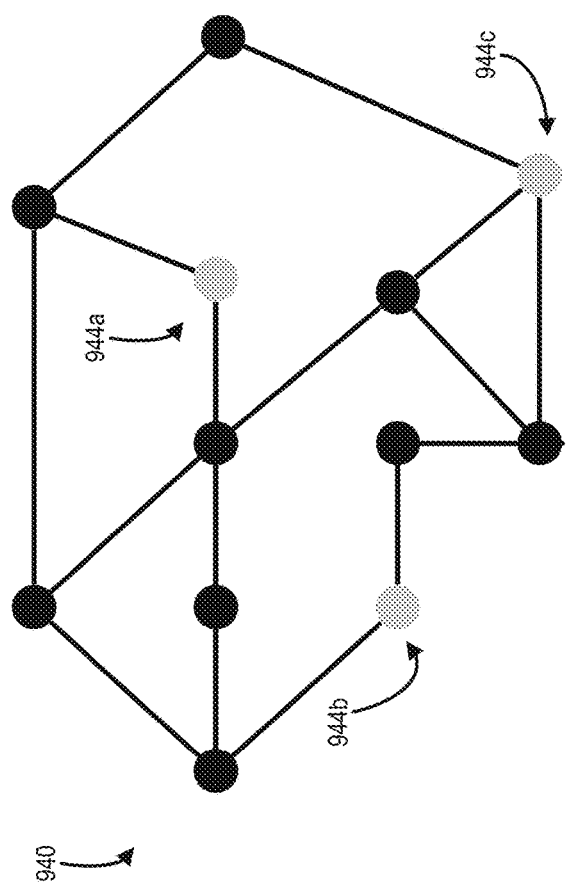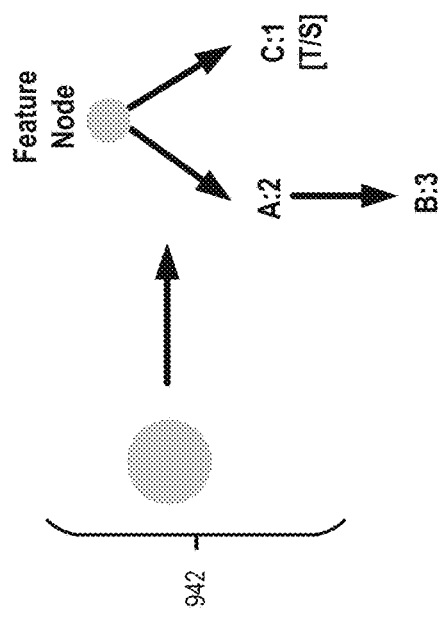
Illustrative CPS-G General Graph Structure Illustrating Min-Prefix Sub-Graph Structure
FIG. 9B

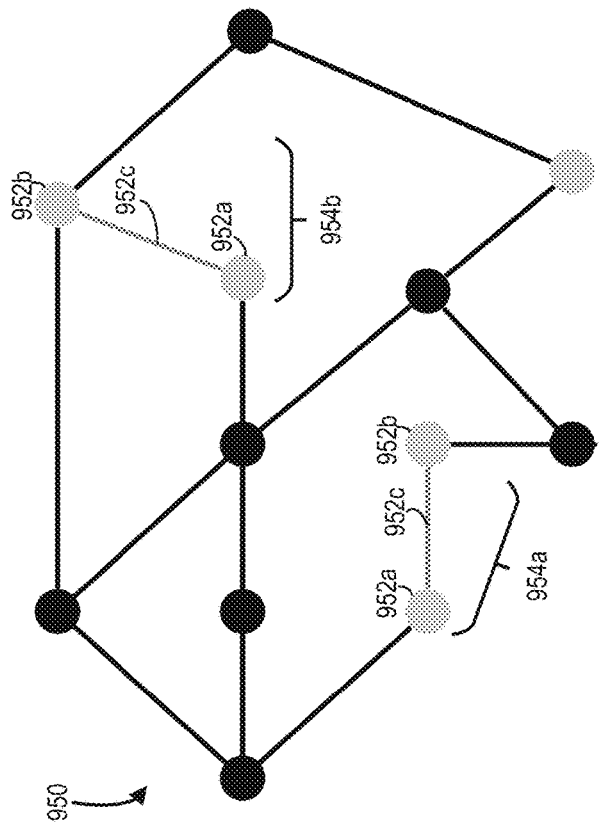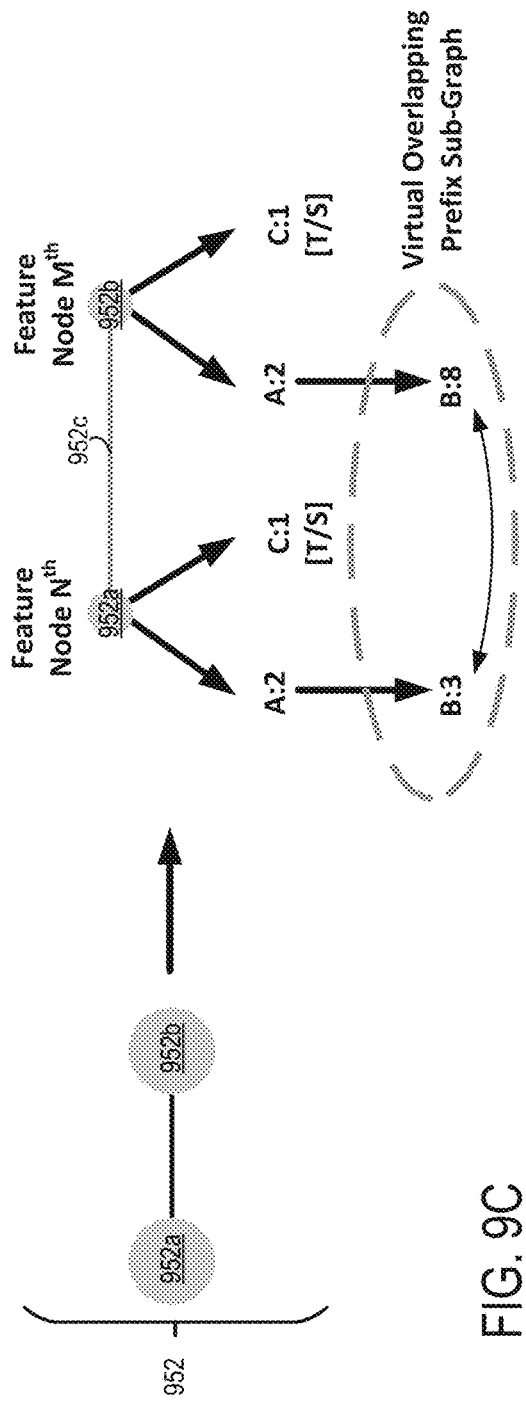
FIG. 9C

Illustrative CPS-G General Graph Structure Illustrating Max-Prefix Sub-Graph Structure where all nodes are part of at least one CPS prefix sub-graph 2000 

Configuring a CPS-G model sub-graph to add to the CPS-G model that indicates the pattern represented by the set of data elements and one or more data elements of the set of data elements
2002

Adding the CPS-G model sub-graph to the CPS-G model, wherein a location of the CPS-G model sub-graph in the CPS-G model represents a relationship of the pattern of the data elements to other processed data messages of the stream
2004

FIG. 20

REAL-TIME PROCESSING OF A DATA STREAM USING A GRAPH-BASED DATA MODEL

CLAIM OF PRIORITY

This application claims priority under 35 U.S.C. § 119(e) to U.S. Provisional Application Ser. No. 62/704,834, filed on May 29, 2020, the entire contents of which are hereby incorporated by reference.

TECHNICAL FIELD

The present disclosure relates to real-time data processing and computing. More specifically, the present disclosure describes implementation of systems for dynamic data model transformation, validation/error correction, real-time analytics, and analysis, and collective coordination, orchestration, and command/control of networks of applications and devices.

BACKGROUND

Modern data processing, analytics and analysis systems typically ingest data and process in an interactive fashion through time scheduled polling or iterative, request-response methods either initiated by a client or server device or system or combination thereof. The first stage, data ingestion is typically handled in an application programming interfaces (API) interaction, whereby data is ingested, then transformed or restructured before it can be utilized for further processing or export to secondary systems. The data transformation or restructuring process is designed to overcome ingested data format misalignment or structural differences to utilize within the given system. This process is often referred to as extract-transform-load (ETL) stage and is utilized after the ingestion process to convert ingested data into a new format that is structured or transformed. Once data are ingested, the data, represented as the structured format, is processed by further a series of additional computational or processing systems. These systems derive analytical or intelligence from the transformed data. The processing systems can be a part of a command and control system that manages or orchestrate a network of devices or other intelligent systems.

SUMMARY

The data processing system described in this document provides a system configured to process data received from different sources and transform the data into structured data that are suitable for data processing tasks such as data validation and error analysis, real-time analytics, and networked-device command/control process orchestration. The data processing system is configured to receive data of different types (e.g., any data type), including structured data and unstructured data. The data processing system is configured to extract useful information from the ingested data and structure the data to conform to a data model. The data processing system uses the data model for data validation and error detection. The data processing system extracts data elements from the incoming data and transforms the data into the data-model in a way to minimize the amount of computation required by applications requiring access to subsets of data for real-time analysis and those ideally represented and processed as graph structures. The data being received can include data streams, and the data processing system is configured to output processing results in real-time or near real-time. Once the results are generated, the data processing system performs distribution (e.g., in real-time or near-real time) to networked application(s) or device(s) for other processes to be performed. These downstream devices can include distributed network applications or system platforms operated by one or more third parties.

The data processing system performs the data ingestion, generation or updating of the data model, validation, and error detection in a pipelined, real-time or near real-time manner using a series of processing modules. Real-time or near real-time processing refers to a scenario in which received data are processed as made available to systems and devices requesting those data immediately (e.g. within milliseconds, tens of milliseconds, or hundreds of milliseconds) after the processing of those data are completed, without introducing data persistence or store-then-forward actions. In this context, a real-time system is configured to process a data stream as it arrives, and output results as quickly as possible (though processing latency may occur). Though data can be buffered between module interfaces in a pipelined architecture, each individual module operates on the most recent data available to it. The overall result is a workflow that, in a real-time context, receives a data stream and outputs processed data based on that data stream in a first-in, first out manner. However, non-real-time contexts are also possible, in which data are stored (either in memory or persistently) for processing at a later time. In this context, modules of the data processing system do not necessarily operate on the most recent data available.

The data processing system includes a series of modules that operate in a coordinated pipeline as one or more sets of processing workflows. In this description, the workflows are manifested as a set of one or more mapped virtual workflows to a set of physical system modules. The modules are configured for operating on incoming message data by extracting and transforming the message data into an efficient data model for feature and pattern mining relevant data. The modules ensure that ingested and/or transformed data conforms to expected data-models by validating and detecting errors and enforcing data quality for correction of erroneous or missing ingested data. Each data element may be further mapped into an efficient compressed pattern graph data-model format, for processing said data for use by algorithms executing within a computational fabric, applications and/or networked devices before transforming the data prior to delivery to said applications and/or networked devices.

The utility of the data processing system includes at least three application areas. First, the modules of the data processing system perform large-scale data ingestion and reconfigurable dynamic data-model transformation, validation/error-correction and data-model/data-set data quality enforcement without pre-configuration for the particular processing scenario. Second, the modules perform real-time data-model transformation for each data-set to a graph data-model that may contain one or more compact pattern stream graph representations, each based on a generalized compact pattern stream data model implementation. Third, the modules perform real-time data analytics and analysis including efficient implementation and execution of Graph Neural Network (GNN) algorithms. Forth, the modules form a multi-agent, distributed application, coordination, and orchestration platform for network-connected devices, applications, and systems.

The implementations described herein can provide various technical benefits. For instance, the techniques described herein support multiple stages of data-model transformation, performing data validation and enabling data conversion to multiple data-representations within a unified processing pipeline and enabling the ability to process massive amounts of data in real-time. The system processes real-time data by eliminating redundant information in a configurable and programmatic process. The data processing system extracts patterns of information based on a determined utility and significance of the patterns in the received data. Processing, such as pattern extraction, can be done prior to compressing the relevant data into a compressed compact pattern stream format. In some implementations, the compact pattern stream format represents the underlying relevant ingested datasets, stored within a newly generated dynamic (e.g., changing or changeable) graph structure. In an example, the dynamic graph structure can include a forest of multi-dimensional prefix-trees, or more generally prefix-sub-graphs, but other patterns or graph topologies can be used or instantiated. The dynamic graph structure comprising compressed or summarized data is called a compact pattern stream graph (CPS-G).

In some implementations, a CPS-G includes one or more compact pattern stream (CPS) prefix-trees organized within a forest data-structure. In some implementations, a CPS-G includes one or more compact pattern streams (CPS) represented and embedded within a general graph topology, or complete graph, that includes Directed Acyclic Graph (DAG), or other graph topology structures that may be directed, undirected, with or without cycles. A DAG includes a graph having vertices or nodes connected by directed edges point from a vertex to another vertex without forming closed loops. In some implementations, each CPS prefix-structure (CPS-G is the embodiment of a prefix-tree expanded topologically in support of a general graph structure) includes a relevant pattern representing the underlying datasets and is extended to a multi-dimensional graph structure, where each graph node is additionally a tensor-based graph node storage structure that can contain additional features of the datasets, metadata, pointers to subtrees of the current CPS prefix structure, pointers to other CPS prefix structures, pointers to other graph nodes or sub-graph structures including virtualized graph or sub-graph structures (a graph or set of nodes and edges created from a given sub-graph of the full graph topology), or pointer nodes enabling access through interfaces providing runtime access from applications or other data processing system modules. In some embodiments, the data processing modules use the CPS-G for high-performance access to data, implementation of generative data model structures including virtual multi-dimensional CPS prefix graph based structures by different entity or feature types, and virtualized data-model structures for use by the computation module that improves overall performance through availability of high-speed graph database structure access. The overall structure can include as an undirected graph implemented as a graph database. Nodes within a given CPS prefix structure can generally be tensor structures that may include data entities or pointers to other nodes anywhere within the forest/graph and more generally graph network representing the internal data-model of the data processing system. Thus, the data processing system is configured for efficient storage and access to streaming datasets using CPS-G instances. In some embodiments, graph edges (an edge connects any pair of nodes within a graph structure) within a given CPS prefix graph structure are tensor structures that include data entities representing additional internal data-model representation for use within the data processing system.

In some embodiments, CPS prefix graph structures may share common entities or nodes. In this case a virtualize graph node or sub-graph of the complete graph represents the shared CPS prefix graph structures.

In any of the embodiments, the CPS-G graphs or sub-graph structures and stored data provide input to graph-based algorithms and queries. The queries are used to search, access, update, add, and remove data and properties of data. In addition, the queries are used to search, access, update, add, and remove the graph, one or more sub-graphs, their corresponding structure and properties of the graph, one or more sub-graphs, or a corresponding structure of the graph, to update or adjust the overall CPS-G structure and support the processing tasks of the platform.

In addition to efficient storage and access to streaming datasets, the CPS-G enables the implementation of dynamic virtual data model structures (subsequently referred to as CPS-G slices). CPS-G slices can include a CPG-G generated from specified sub-graphs of nodes organized for efficient access or graph data processing that represent a specified subset of data of interest over dynamically configurable time-period windows, spatial domains, or other entities or feature sets of interest for implementing any of the use-case application scenarios previously described. In some implementations, CPS-G slices are generated through execution of one or more CPS-G graph query operations within the CPS-G model generator module comprising one or more CPS-G model generator engines (one or more parallel software processes). A function of the CPS-G model generator engines is to produce CPS-G sub-graphs from the CPS-G full graph based on programmatically defined input requirement specifications or rules. The rules are derived in accordance with one or more query constructs.

In any of the embodiments, the CPS-G graphs may implement one or more Graph Neural Networks (GNNs), as described in Scarsselli, et al. "The Graph Neural Network Model". IEEE Transactions on Neural Networks 2007 and Wu, et al. "A Comprehensive Survey on Graph Neural Networks", IEEE Transactions on Neural Networks and Learning Systems. 2021, the contents of each of which are incorporated by reference in entirety. In applications where the CPS-G is implementing one or more Graph Neural Networks (GNN), the embodiment of both CPS-G topologies and implementation of shared entities using virtual sub-graphs improves the performance (e.g., reduces training time and machine learning execution time) of training and executing machine learning operations (such as classification or prediction) against the GNN. The performance gain is attributable to the concurrent use of compression (e.g., CPS summarization) and sharing of data (e.g., by virtual sub-graphs) within the CPS-G virtual sub-graphs, whereby computations (e.g., when CPS encoded, or summarized graph data represents pre-computed results) may be executed local to the virtual sub-graph node data structures without the need to perform one or more graph traversal operations.

The data processing system provides for a dynamic processing framework for further processing of real-time compact data streams. The data process system enables transforming of the resultant compact streaming data set model into a target data-model for distribution and delivery to external systems (e.g., downstream systems, distributed systems, and/or third-party systems). Incoming messages are ingested by a pool or set of interfaces (e.g., transport listener processes) and transformed into individual data elements through a parallel disassembly processing network that extracts the data elements from incoming message payloads.

Data elements matching specified criteria are selected and enriched further by labeling or tagging said data. The labeling or tagging is subsequently used by modules of the data processing system for producing programmatically controlled generative data-models to minimize the amount of computation required by applications requiring access to subsets of data for real-time analysis. The labeling or tagging process adds metadata to the data elements to facilitate additional processing at a later stage or module in the workflow.

Message data may arrive in real-time or not. Prior to forwarding processed message data to the data model transformation stage, messages are windowed in snapshots by an adaptive windowing method that maintains a continuous snapshot of the relevant message data and by expiring or decaying out data over time which is no longer statistically relevant. This operation matches the internal processing rate to that of the incoming messaging rate and includes data sketching as the underlying method of operation.

Generally, after message data ingestion, an output is presented to the remaining system modules. These modules can be configured in different ways based on the corresponding application scenario for each of one or more processing workflows. A workflow can be dynamically instantiated across one or more modules represented as parallel data-flow pipelines that collectively and dynamically transform, and process in temporal order, structured sources of multi-dimensional data. A processing workflow may be instantiated for supporting multiple independent use-case scenarios. The use case scenarios can include execution needs of one or more data analysis and analytics applications, networked devices and systems, autonomous devices and systems, each across multi-dimensional data-streams across arbitrary time ranges, or spatial domains, physical parameters such as from physics, organic/inorganic chemistry, and biological, including historically through real-time and predicted future state leveraging one or more of the computation module Machine Learning (ML) engines. The use case scenarios can include providing data-computational resources for orchestrating the coordinated, real-time activities and goal objectives for cooperative networks of devices. The use case scenarios can include dynamically transforming ingested data into a target data format in real-time for consumption by a network of clients or subscribing systems including database or data-lake platforms. The use case can include some combination of the above scenarios, or others as the data processing system can be utilized in other scenarios to those skilled in the art.

Multi-dimensional data sources generally include combination of data derived or ingested from networks, systems, devices, sensors (organic, inorganic, chemical, physical, biological), software, operating system components, and third-party data feeds, database systems, data-feeds, as well as user generated activities or events. Multi-dimensional data sources may be organized by single sources, groups of sources, from public networks, cloud-based sources, or managed service provider systems, however the system is not limited to any given data source type or format.

Another advantage enabled by the data processing system is simultaneously processing real-time streaming of multi-dimensional data, previously stored multi-dimensional data, and predicted future state or predicted multi-dimensional target variables in a fully unified and transparent manner. This is achieved through an architecture that leverages dynamic data ingestion, dynamic extract/transform/load (ETL) processing, data transformation, data validation and intelligent error detection, and windowing methods to efficiently ingest or extract and store data sources of arbitrary nature into the CPS-G structure. Temporal or spatial multi-dimensional data and incoming multi-party real-time data feeds that have undergone initial windowing or sketch processing (e.g., by an adaptive windowing module) are passed into the streaming data mining window processing module which emits windows of relevant message data patterns from a universe of raw data based on pattern mining heuristics and intelligent encoding. The data mining module provides a second layer of data compression, relevant data expression, and information gain as a final preprocessing step prior to CPS-G storage and domain specific computation.

To increase the performance of applications, external devices and systems, the generative data models representing a slice (e.g., a portion of the CPS-G graph including one or more tensors encapsulated by a graph node), subset, materialized view, or sub-graph of the CPS-G that is instantiated in real-time, provide the datasets of interest for a given instance or workflow as part of minimizing computational latency and maximizing the domain specific performance. The generative data models can be provided by a client device, application, or system, among others. The generative data models are programmatically defined and driven by a relational algebra or graph data-model structured programmatic query language constructs. Based on the generative data model, permutations or collections of CPS-G datasets are dynamically unrolled just-in-time for further processing in accordance to a CPS-G sub-graph definition from the in-memory representation, or persistent data storage depending on memory capacity relative to dataset history.

A domain controller (DC) is configured to manage and configure the modules in the data processing system. The DC is configured to manage and configure the modules for streaming processing scenarios involving coordination and orchestration among the modules. The DC is also configured to manage and configure applications, devices or networks of devices as previously described. The DC therefore integrates the modules. In some implementations, the DC includes an external software process that interfaces and configures the operation of the data processing system. The DC generally configures workflows across the system modules. The DC generally configures generative models to provide relevant and transformed input data for real-time processing (e.g., CPS-G data is utilized within execution of the data-flow computation engine). The DC generally interfaces, instantiates, and streams data to/from computation engine modules. The DC generally configures the propagation of resulting datasets for final post-processing which entails data-model transformation followed by either persistent storage (for batch-oriented interfaces) or directly to the output modules in the case of streaming messaging scenarios.

The data-model transformation previously described is performed when an emitted target data model format from the data processing system is to be adapted to external subscribing devices and systems. These devices and systems can include databases, data-lakes, cloud services distributed application systems and devices, mobile, sensors, IoT or autonomous devices, systems such as aerial drones, unmanned aerial vehicles (UAV), and autonomous vehicles, among others.

In some implementations, the transformed data and underlying target data-model may be streamed by the data processing system to subscribing applications or devices. These applications and devices generally utilize the processed information delivered in accordance with standard network transport protocols in order to communicate to and from the device or application, or networks thereof. In other words, the transformed data is configured to match the requirements of downstream applications and systems.

The following embodiments are configured to enable one or more of the previously described advantages.

In a general aspect, a process for real-time processing of a data stream using a graph-based data model includes the following actions. The process includes receiving a data stream including data messages having a plurality of formats. The process includes disassembling each of the one or more data messages into a set of data elements and associated metadata, the set of data elements having a particular format. The process includes determining, from the associated metadata and the set of data elements, at least one pattern included in the set data elements. The process includes instantiating a workflow to process the set of data elements based on the pattern. The workflow is configured to select a compact pattern stream graph (CPS-G) data model based on the particular format of the set of data elements. The CPS-G data model represents processed data messages of the data stream. The workflow is configured to populate the CPS-G model with data elements from the set of data elements. The CPS-G data model includes a CPS-G dataset when populated with the set of data elements. Populating the CPS-G data model includes configuring a CPS-G model sub-graph to add to the CPS-G model that indicates the pattern represented by the set of data elements and one or more data elements of the set of data elements. Populating the CPS-G data model includes adding the CPS-G model sub-graph to the CPS-G model. A location of the CPS-G model sub-graph in the CPS-G model represents a relationship of the pattern of the data elements to other processed data messages of the stream. The process includes generating, by a logic engine, output data from the CPS-G dataset, wherein the logic engine is configured to update the output data in real-time or near real-time when the CPS-G model sub-graph is added to the CPS-G model.

In some implementations, the CPS-G model comprises a complete graph comprising an assembly of nodes and edges, with one or more compact pattern stream sub-graph structures embedded within the graph. In some implementations, the CPS-G model comprises an assembly of sub-graphs organized as a forest data-model structure wherein each graph node in the forest data-model structure includes one of a dataset entities, a feature, or a platform. In some implementations, each sub-graph of the assembly comprises another sub-graph, a node, or a prefix structure that configured to provide storage of datasets sorted by frequency of occurrence in a compact representation of dataset patterns or compact pattern stream trees. In some implementations, a graph node comprises a multi-dimensional data-structure or tensor data-model. In some implementations, a first sub-graph of the assembly of sub-graphs includes a pointer to a second sub-graph, the pointer enabling access to the second sub-graph for an application accessing the first sub-graph or enabling two or more sub-graphs to share a set of common nodes and/or edges.

In some implementations, the CPS-G model sub-graph represents a subset of the data stream over one or more of a configurable time-period window, spatial domain, data source, data type of the data stream, and a data pattern of the data stream.

In some implementations, the data store comprises one of an in-memory data store or a persistent database, and wherein the data store is accessible by a plurality of parallel workflows processing the data stream.

In some implementations, the process includes receiving, at a compute module, the CPS-G dataset through a real-time streaming interface or from the data store. The process includes selecting, based on the instantiated workflow, one or more logic engines for processing the CPS-G dataset, the one or more logic engines being selected from a set of logic engines, each logic engine including a logic model that is unique to that logic engine, the logic model configured for processing the CPS-G dataset. The process includes generating, by the selected one or more logic engines, intermediate data from the CPS-G dataset, the intermediate data being transformable into one or more different target data models. In some implementations, the logic model is selected from a list comprising: a supervised machine learning model, an unsupervised machine learning model, a support vector machine, a neural network, a clustering algorithm, a regression algorithm, a swarm engine, a genetic learning algorithm, or an evolutionary learning algorithm. In some implementations, the one or more logic engines are configured to dynamically unroll the GPS-G dataset in real-time during runtime of the workflow. In some implementations, the process includes receiving, at a particular data model generator that is designated by the workflow, the intermediate data generated by the selected one or more logic engines. The process includes transforming the intermediate data into a target data model represented by the particular data model generator, wherein the particular data model generator is associated with a downstream application. The process includes configuring the target data model to a data format specified by the downstream application. The process includes storing the target data model having the data format for sending to the downstream application. In some implementations, the data format is specified by an application programming interface (API) of the downstream application. The process includes sending the target data model having the data format to the downstream application based on the API.

In some implementations, the workflow is instantiated as one or more additional workflows each configured to process in parallel additional structured data models each generated from the data stream. In some implementations, one of the additional structured data models is associated with another domain that is different from the domain of the structured data model.

In some implementations, disassembling each of the one or more data messages into a set of data elements and associated metadata includes disassembling the data messages into a stream of both real-time and non-real-time workflows based on one or both of a rate analysis and a message velocity analysis. Each workflow is annotated with a respective workflow identifier. The data messages are associated with the respective workflow identifier of each workflow.

In some implementations, disassembling each of the one or more data messages into a set of data elements and associated metadata includes applying an adaptive windowing rule to the data stream to partition the data messages into a plurality of data windows. One or more input reservoir windows provided as a first input stage followed by a second output reservoir. In some implementations, a first size of the input reservoir windows together is equal or greater than a second size the second output reservoir window. The input reservoir windows aggregate the data messages of the data stream.

In some implementations, the process includes receiving the set of data elements and associated metadata at an extract-transform-load (ETL) processor module comprising a semantic layer configured to identify one or more patterns in the set of data elements and the associated metadata. The process includes determining, by the semantic layer, that the structured data model is associated with the one or more patterns in the set of data elements and the associated metadata. The process includes transforming the set of data elements to match a template of the structured data model. The structured data model comprising the set of data elements is generated based on the transformed set of data elements that match the template. In some implementations, the ETL processor is configured to transform the data elements from a first dataset of a first data model into a second dataset of a second data-model within the workflow. The first and second datasets are different, and the first and second data models are different. In some implementations, the one or more patterns match at least one relevance criterion. Determining that the structured data model is associated with the one or more patterns in the set of data elements and the associated metadata is based on the at least one relevance criterion.

In some implementations, the process includes enabling, by one or more transports and integration interfaces, client access in accordance to the transport type, protocol type, and interface specifications of each client application or device or network thereof.

In some implementations, the process includes providing, using the structured data model, real-time viewership measurement, content or streaming media interactivity, real-time analysis, or targeted digital content delivery-based applications. In some implementations, the real-time analysis comprises targeted generation of content items for at least one of television, mobile devices, or web-based devices.

In some implementations, the process includes providing, based on the CPS-G dataset, a real-time viewership analysis of the data stream, a real-time visualization of the data stream, or prediction of consumer behavior of digital content consumption based on the data stream.

In some implementations, the data stream is received from one or more data sources comprising collected chemical or biological sample datasets received from at least one network attached Multisensor (system comprising one or more sensor devices), nuclear magnetic resonance (NMR/Multisensor) or magnetic resonance imaging (MRI) device, or X-Ray imaging device, whereby each Multisensor, NMR/Multisensor/MRI/X-Ray device provides a sample collection unit that generates a Multisensor, NMR/Multisensor/MRI/X-Ray-based chemical signatures representing the sample properties for various nuclei, molecules, compounds, or image pattern, as the sample dataset, and wherein a chemical or biological structure is included in the sample datasets. Samples exist in any combination of solids, liquids, or gases. The process includes generating a CPS-G dataset using the sample dataset. The process includes generating result data based on the CPS-G dataset. The process includes sending the result data to an application associated with the Multisensor, NMR/Multisensor/MRI/X-Ray device. A Multisensor includes chemical, environmental, and biological sensor monitoring or measurement devices. For example, chemical sensors include gases and liquid sensors that detect and measure the presence and concentration of gas and liquid atoms, molecules and compounds of both organic and inorganic composition. Environmental sensors include temperature, pressure, humidity and presence of elements of interest in detecting, measuring, and monitoring gases and liquids chemistries relevant to environment characteristics such as air quality and water pollution. Sensors may include optical and spectral-based detection and measurement devices enabling the analysis of an environment at different wavelengths, an example of which is a thermal imaging sensor.

Finally Multisensor for biological and metabolic includes medical devices and sensors that detect, measure, and monitor a wide range of biological and metabolic processes including heart-rate, EKG, blood-pressure, O2, temperature, blood chemistries, presence of viral and bacterial agents, as well as metabolic activities.

In some implementations, receiving the data stream including one or more data messages is received from a first device. The process includes receiving a second data stream from a second device that is different from the first device. The CPS-G dataset is generated based on the first data stream and the second data stream. In some implementations, the first device comprises an NMR/Multisensor device including a distributed sample analysis system, wherein the second device comprises an autonomous device, and wherein the first device is coupled to the second device.

In a general aspect, a process for processing data from a plurality of distributed data sources includes receiving, from a client device, a request for data that is generated from a plurality of autonomous or semi-autonomous devices. Autonomous devices include computing device configured to operate without any human intervention. Semi-autonomous devices are configured to operate with limited human intervention, but perform most functions without human intervention. The autonomous or semi-autonomous devices can include autonomous vehicles such as land, aerial, aquatic, robots, drones, automobiles, planes, portable NMR/MRI, Medical, Biometric, Multisensor, and other systems and devices. The process includes receiving, from each autonomous or semi-autonomous device of the plurality of autonomous or semi-autonomous devices, a data stream. A first data stream of the plurality of data streams has a first format, and a second data stream of the plurality of data streams has a second format that is different from the first format. The first data stream is received from a first autonomous or semi-autonomous device, and the second data stream is received from a second autonomous or semi-autonomous device. The process includes applying a windowing function to the first data stream and the second data stream to obtain portions of the first and second data streams. The windowing function is based on a geographical location of the first autonomous or semi-autonomous device and the second autonomous or semi-autonomous device, wherein the portions of the first and second data streams are associated with the geographical location. The process includes generating at least one data element representing a data pattern included in the portions of the first and second data stream. The process includes generating a CPS-G dataset including the at least one data element. The process includes processing the CPS-G dataset using machine learning model selected from a plurality of machine learning models that are available in a local memory. The process includes generating results data based on the processing. The process includes transforming the result data into a format specified by an application programming interface (API) of the client device.

In some implementations, the first format comprises a first communication protocol and wherein the second format comprises a second communication protocol. In some implementations, each of the first autonomous device and the second autonomous device includes an NMR/Multisensor device. The data pattern comprises T1 or T2 Relaxometry based chemical signatures for one or more nuclei, and one or more sensor measurements (e.g., from the Multisensor, NMR/Multisensor described previously). The result data comprises a report of the chemical signatures, multiple sensor measurements, timestamps, and associated geographical locations. In some implementations, the result data is streamed to the client device in a real-time data stream.

In some implementations a system for real-time processing of a data stream using a graph-based data model. The system includes at least one processor; and a memory storing instructions that, when executed by the at least one processor, cause the at least one processor to perform operations to perform one or more of the processes previously described.

In some implementations, one or more non-transitory computer-readable media store instructions for real-time processing of a data stream using a graph-based data model, the instructions causing, when executed by at least one processor, the at least one processor to perform operations to perform one or more of the processes previously described.

The details of one or more embodiments are set forth in the accompanying drawings and the description below. Other features and advantages will be apparent from the description and drawings, and from the claims.

BRIEF DESCRIPTION OF THE DRAWINGS

FIGS. 9A-9G provide illustrations of example CPS-G graphs for various use cases.

FIGS. 19-21 are flow diagrams showing example processes for real-time processing of data from different data sources.

Like reference numbers and designations in the various drawings indicate like elements.

DETAILED DESCRIPTION

Figure 1:
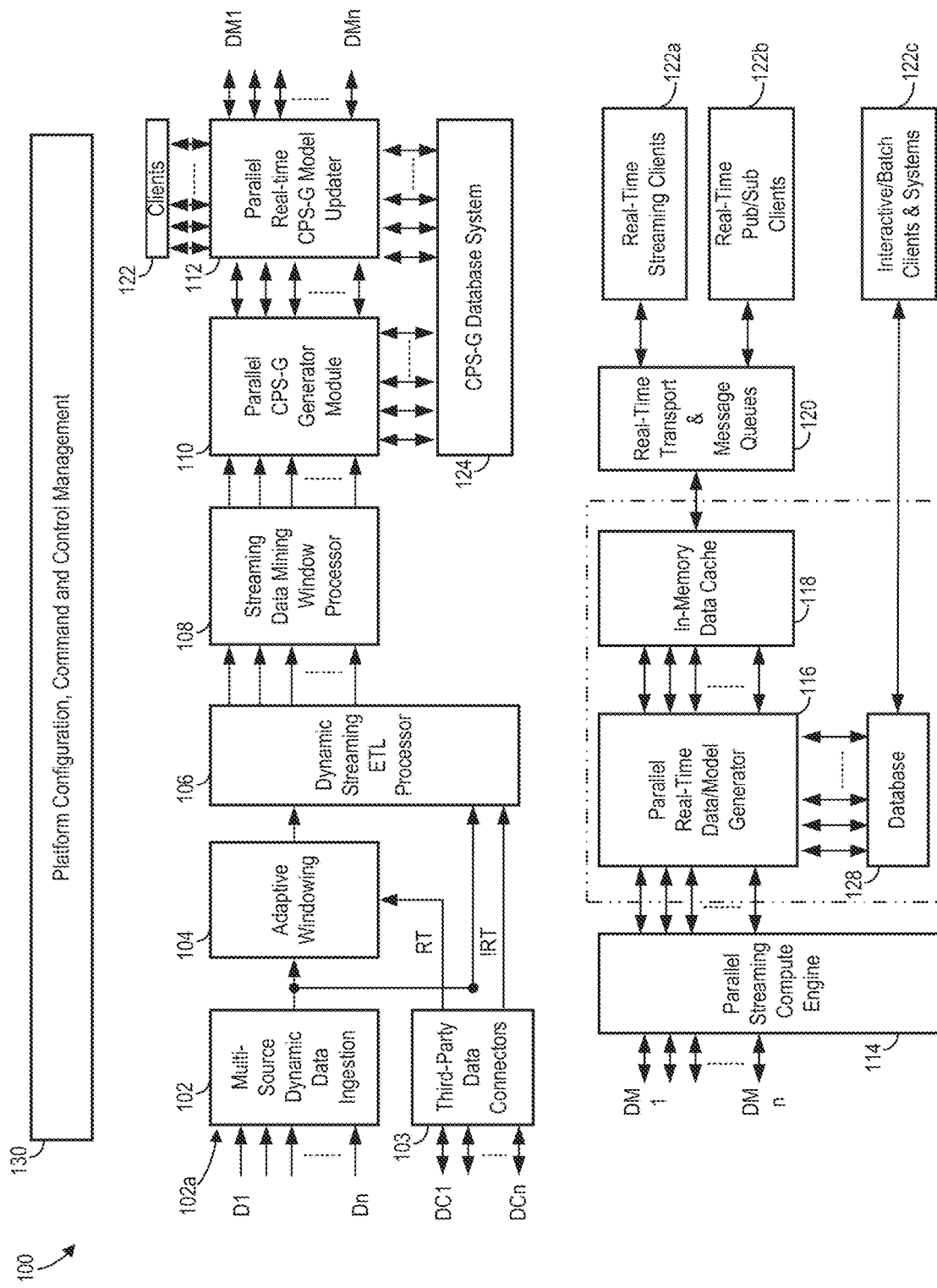
FIG. 1 is a schematic diagram of an example data processing system showing end-to-end system design.

A data processing system described in this specification includes a set of data processing modules, each including logic for processing data as described herein. The modules are configured to operate in a coordinated pipeline as one or more sets of processing workflows. The workflows can be manifested as a set of one or more mapped virtual workflows to the set of physical system modules. A workflow may include a set of modules configured for operating on incoming message data by extracting, transforming the message data into an efficient data model for feature and pattern mining relevant data. A data element may be mapped into an efficient compressed pattern graph data-model format (such as a CPS-G), for processing said data for use by applications and/or networked devices and/or systems. The modules are configured for transforming the data elements of the data models prior to delivery to downstream applications and/or networked devices.

Generally, when the data processing system ingests and transforms the data, the data processing system performs data model and entity validation, error detection, and correction methods. In some implementations, the data processing system performs these functions based on a template matching analysis, such as against a data-model or against entity data types. For example, if the data processing system expects a string format in a given context, but receives an integer or incorrect format of floating point or data-type instead, the error correction can be performed. An example of a model correction includes expecting a four-word data width but receiving a two-word data width. In this example, the data processing system automatically extends a length of the data vector from two words to four words before outputting a result. The data processing system performs predictive machine learning (ML) methods utilizing the ingested data and system as training data to improve said heuristic and ML methods. Generally, notifications and alerts are sent to external systems to monitor the data model and entity quality in real-time as the pipeline operates against all data. Examples of data quality analysis for data and data models, and subsequent error correction, are further described in relation to FIG. 16C. FIG. 16C represents a degenerative implementation of system can be for basic data and data model ingestion, in addition to data and data model quality analysis and correction (e.g., self-healing).

The data processing system is configured for the following applications, though this list is not exhaustive. The data processing system is configured for high-scale data ingestion and reconfigurable dynamic data-model transformation on the fly. The data processing system is configured for high-performance, real-time or near real-time data analytics and analysis. Real-time or near real-time processing refers to a scenario in which received data are processed as made available to systems and devices requesting those data immediately (e.g. within milliseconds, tens of milliseconds, or hundreds of milliseconds) after the processing of those data are completed. The processing delay between when data are received and when data are available can be on the order of seconds. While there is no guarantee of when output data will be available, real-time data output from the data processing system generally represents the latest data received from one or more data sources, with a processing delay of up to several seconds. For each module in a pipelined workflow of the data processing system, the module is configured process the most recent available data and output the data to the next module in the pipeline. In an embodiment, each module in a workflow of modules operates in parallel and at a synchronous or nearly-synchronous rate. In an example, when a downstream module is ready to process additional data, the downstream module accesses the most recent data from a buffer or other in-memory storage that is provided from an upstream module. When the module is finished processing the additional data, the additional data is stored in an in-memory storage for access by one or more downstream modules or systems.

Generally, the module(s) process data without introducing persistence. The systems are configured to process the data stream without requiring a "store-then-forward" data paradigm (e.g., on a flash or hard-drive), to the processing flow. If storage of data is used, the storage is asynchronous to the workflow (e.g., occurs in parallel). Therefore, real-time or near real-time processing is performed in a context of stream or data-flow computing.

The data processing system described in this disclosure enables a conversion structure for ingested data using one or more different processes. The data processing system is configured to identify patterns from different data types (e.g., data formats or data protocols) without matching the patterns to a pre-designed set of patterns or design templates. However, while a design template is not required, the data processing system performs matching against known templates when those templates are available. The data processing system is configured such that patterns for matching can be defined programmatically or are self-learned. In an example, a programmatic or self-learning matching process is applied initially. The data processing system uses known templates if either the programmatic or self-learning matching process does not result in determination of a pattern. FIG. 5C shows an example of validation/error/correction feedback system.

The data processing system is able to process received data independent of available data from the data sources or client systems that communicate with the data processing system. For example, the data processing system is configured to handle any input-output relationship structure of the data sources or client systems. If the data processing system is invoked to process data as a part of a service call, the data processing system is not limited by the device or application generating the service call. The data processing system is configured to be able to receive source data that includes many errors or a lack of structure, such as unstructured data streams. The data processing system updates a data model that represents each of the data streams. The data processing system is also configured to access data through API structures. These functions are further described in relation to FIG. 5C.

As previously stated, the data processing system is configured to process data streams. The data processing system is configured for adaptive windowing and data sketching. As described herein, adaptive windowing and data sketching are data summarizing techniques for real-time data processing. The data processing system performs the data summarization techniques to also perform labeling of data streams, data-model matching (as previously described), and pattern analysis to extract relevant data elements for application-specific processing (e.g., configured to satisfy stated requirements of the application). The data processing system integrates an ETL system, a pattern mining subsystem that removes redundant or irrelevant data, and an analytics processing pipeline that defines or accesses data subsets of interest in real-time.

The data processing system is configured to ingest data from a large number of devices and types of applications, including the Internet-of-things (IoT), mobile devices (e.g., smartphones or cellular-enabled devices), and autonomous devices (such as drones, robotic devices, and vehicles). The data processing system is configured for processing data at a high-scale within real-time constraints (e.g., processing data streams as they arrive). The data processing system is configured for processing data in multiple formats, types, and range specifications in accordance with networks of many different kinds of applications and devices and their respective streaming data capabilities. For example, the data processing system is configured to process data streams that are highly redundant in nature (e.g., a majority of the data are redundant). In this context, data patterns indicate where relevant data or data outliers exist in the data. For example, an IoT device, such as a temperature sensor, may generate a continuous stream of temperature readings every few milliseconds. The temperature data stream is generally repetitive within some defined range of values. The data processing system may only need to take note of outlier values. In another example, an unmanned aerial vehicle (UAV) device, such as a drone, generates a continuous real-time stream of coordinate, velocity, or sensor data as it follows a trajectory along with other telemetry gathered from sensors. The drone may alter its plan and/or trajectory based on measured and analyzed sensor data, or that of other drones operating in a coordinated process as part of a collective goal. This represents a real-time control, coordination and orchestration scenario. The drone may require a real-time stream of command and control data generated through an orchestration system based on the real-time drone telemetry, while the temperature sensor does not require real-time command and control. The data processing system can summarize the stream of data from the temperature sensor in a different way than the command and control telemetry from the drone. For example, the data processing system emphasizes outliers for the temperature sensor and discards inlier data. The data processing system retains inlier telemetry data for the drone. The data processing system is configured to label a significance of ingested data as part of the ingestion process.

The data processing system is configured to receive data from devices or applications that are part or elements of a collective system that work together to complete a task or function, or more generally optimize a function. The data processing system assists (e.g., as a service) the devices, applications and/or system platforms to coordinate and orchestrate their operation or behavior among one another (e.g., to execute some task or function in a coordinated manner).

FIG. 1 is a schematic diagram of an example data processing system 100 showing end-to-end system design. A set of modules (e.g., 102, 103, 104, 106, 108, 110, 112, 114, 116, 118, 120, 124, and 128) are organized in a streaming data-flow pipeline architecture. Each of these modules is described in detail herein.

A multi-source dynamic data ingestion module 102 provides integration from external data source(s) to the data processing system 100. The module 102 provides an interface that is capable of handling any incoming data of any format. The module 102 enriches the incoming data with metadata or labels if needed. These metadata or labels signal to the rest of the data processing system 100 how the incoming data are to be processed. The incoming data are segregated into real time data (RT) and non-real-time data. Based on this segregation, the module 102 sends the enriched incoming data to an adaptive windowing module 104, or sends the incoming data directly to the ETL processor 106 for extracting a payload. The module 104 includes one or more ports 102a for receiving the incoming data from the data source(s). The module 102 includes one or more processors and can include a local memory accessible by the one or more processors. The structure of module 102 is described further in relation to FIGS. 3A-3B.

An external data-source includes an application, a device, some other system or set of systems, including service-oriented platforms, capable of generating data or message streams over a variety of network protocols. Continuous data or real-time data from data sources (D1 . . . Dn), in the form generated by applications and/or devices, are ingested by the multi-source dynamic data ingestion module 102. The module 102 receives the external data sources with variable message formats and structure. The module 102 enriches the data as required by labeling or adding metadata, including workflow identification, before forwarding for further internal processing of the next stage in the data processing system pipeline.

In some implementations, the data sources D1-DN can include any applications, clients, systems, or devices for which data is being processed (generally in real time) or one application or another. For example, data sources D1-DN can each be UAVs in a swarm, and each UAV may require off-board processing for accomplishing a common goal with the swarm. The data processing system 100 receives data from the UAVs, which may each be made by different manufacturers and may each send data in different formats or protocols. The data processing system 100 is configured to combine these data into a common model (e.g., the CPS-G model), use the model to compute result data, and respond to each UAV with result data. In an example, the result data can be navigation instructions, instructions to operate one or more UAV sensors or gather data, or some other application. Essentially any device can be a data source, and the data processing system 100 can process data for that data source as a service.

In cases where a specialized integration is required between the module 102 and an external data source, one or more third-party connectors 103 provide similar functionality to the module 102 and are configured to incrementally process data for specialized or unique integration requirements. These requirements exist when a specific application programming interface (API) representing the third-party connector interface 103 definition is implemented in order to receive data (DC1 . . . DCn) from the given third-party provider. For example, the requirements include messages that are sent/received by the data connectors 103 to cause the external data source to send the incoming data to the data processing system 100. The messages include commands, configuration information, acknowledgement signals, or any similar data for receiving the incoming data from the external data source.

The output of the data ingestion module 102 includes either or both of real-time and non-real-time data streams, denoted as RT and !RT in the example of FIG. 1. In the case of non-real-time data streams, the amount of data received in a given time frame is low enough to allow the data ingestion module 102 and a dynamic streaming ELT processor module 106 to be directly integrated with no intermediary buffering or adaptive windowing. In the case of real-time streams, adaptive windowing is performed to prepare the data stream for extraction of payload data by the ETL processor 106.

An example aspect of receiving incoming data from an external data source is described for ingestion module 102. The module 102 includes a dictionary (e.g., stored in memory) that informs a matching engine (e.g., 308 and 310 of FIG. 3A) to parse an IP address field and add label to a message. Here, an incoming message is 1 . . . M bytes, and M+1, M+2, M+N bytes of additional label data or metadata are being added. An additional correspondence between the IP address and a type of device or service associated with the incoming message is received. For example, an IoT temperature gauge sending data from address 10.1 is labeled "IOT-Temp," a drone from address 10.2 is labeled "DRONE" and so forth. A MAC address is decoded to determine a company associated with a respective device. The ingestion module 102 enumerates device-specific properties that are useful to downstream processing in the pipeline. The decoded MAC address, IP address, etc. are send to the ETL processor 106 as previously described for further processing.

In another aspect, the ingestion module 102 ingests data of interactive television or over-the-top (OTT) media applications. The module 102 extracts a provider identifier and interprets the identifier to provide additional hints (e.g., labels in the N-byte extension area) on what is available by region for given data (e.g., electronic programming guide (EPG) data, movie titles, etc.). The labels are used in conjunction with user channel and content selections to determine how to best process the data (by the downstream modules 106, 110, etc.) for analysis (e.g., by $3^{rd}$ party systems) of viewing patterns for users. For example, the ingestion module 102 enables computation of what users are watching in a given region during a given time window for a given service.

In another aspect, a portable nuclear magnetic resonance (NMR/Multisensor) device sends analysis results to the ingestion module 102 of the data processing system 100. The ingestion module 102 extracts IP/MAC data and labels and/or enriches the message with location and/or time data. The enriched data is then processed by the ETL processor 106 and CPS-G generator module 110. For example, the enriched message (the N additional bytes) includes geospatial and time information to enable a multi-device, multi-geographic pattern analysis of recorded data from a Multisensor or NMR/Multisensor device. This aspect is also applicable for using electronic devices as proxies for macro-level behavior or activity patterns modeling humans.

Generally, the Multisensor or NMR/Multisensor device of this example includes chemical, environmental, and biological sensors or monitoring and measurement devices. For example chemical sensors include gases and liquid sensors that detect and measure the presence and concentration of gas and liquid atoms, molecules and compounds of both organic and inorganic composition. Environmental sensors include temperature, pressure, humidity and presence of elements of interest in detecting, measuring, and monitoring gases and liquids chemistries relevant to environment characteristics such as air quality and water pollution. Multisensors for biological and metabolic includes medical devices and sensors that detect, measure, and monitor a wide range of biological and metabolic processes including heart-rate, EKG, blood-pressure, O2, temperature, blood chemistries, presence of viral and bacterial agents, as well as metabolic activities. Other similar sensors can be included in the multisensor.

In each of the above aspects, the ingestion module 102 adds timestamp and location information to the message body as additional metadata for various operations especially analysis and analytics. Each message is labeled with a unique identifier or a workflow identifier to group the different device message streams into one or more workflow identifiers (e.g., one of the N bytes). For example, based on the workflow ID, messages are sorted into different groups that have the same operations applied on that given group. A label can be assigned to indicate the start of a new data stream and hence workflow. For example, the CPS-G generator module 110 (described below) can utilize the label to detect the start of a new sub-graph.

The adaptive windowing module 104 includes one or more processing devices and associated memory configured to select and forward data in temporal order through reservoir sampling channels. The sampling channels implement configurable sliding windows and sample policies to incoming data-streams. In some implementations, two reservoir sampling channels are used for scalability and to increase processing performance. For example, a first layer (an input reservoir) handles multiple message streams in parallel. A second layer (an output reservoir) generates the aggregate window or sample of samples across all input windows and hence the universe of all data received. The windowing module logic is described in further detail in relation to FIGS. 4A-4B.

The windowing module 104 samples the data and maintains a continuous stream of data to the system pipeline based on statistically data sampling leveraging weighted sampling methods. Specifically, the module 104 adjusts a sampling policy and/or a sketching policy applied to the data stream received from the ingestion module 102 for adjusting sizes of realized windows. Sampling refers to which data are included in a data window. Sketching refers to a process for summarizing the sampled data (e.g., removing redundant data). Such functionality can be implemented through a configurable statistical relevance/scoring or decay functions applied to the adaptive window reservoirs, resulting in a mechanism for configurable windowing policies as desired.

The sampling methods can be performed in a variety of known ways (e.g., based on the Chao Algorithm). For example, for each element in a data stream, a relative weight for that element is calculated and used to randomly decide if the element is added into a reservoir. If the element is selected, then one of the existing elements of the reservoir is uniformly selected and replaced with the new item. If the probabilities of all elements in the reservoir are already proportional to their respective weights, then by selecting uniformly which element to replace, the probabilities of all items remain proportional to their respective weights after the replacement.

In some implementations, the data received by the windowing module 104 is asynchronous, meaning that data are received at varying rates and at varying times. For example, the plurality of systems or devices that are sending data to the data processing system 100 need not be in communication with one another to coordinate sending the data. Output from the adaptive windowing module 104 is forwarded to the next stage of the data processing system pipeline, which includes the dynamic streaming ETL processing module 106.

The ETL processing module 106 extracts pipeline-relevant data from the incoming data. The ETL processing module 106 labels and enriches the sampled data with additional meta-data as required to help identify characteristics of the source providers and to facilitate system module pipeline processing. Additionally, the ETL processing module 106 is configured for enriching and augmenting the original data-set with additional data such as timestamp, geo-spatial coordinates, source device characteristics, and metadata describing the structure and content of ingested messages from the given source provider interfaces, systems or devices. For example, additional metadata for both graph and computational processing of all message streams and their associated workflows, is annotated with labels indicating the respective relationships of the workflows and message streams to the system. For example, message data used to anchor one or more entities as a collection, realizing an aspect of the underlying data-model requirements are labeled as node labels (NL). Examples include device identifiers, timestamps, group, index, or transaction identifiers, or other suitable identifiers. The ETL processing module 106 includes one or more processors and associated memory. In some implementations, the ETL processing module 106 includes one or more machine learning engines (e.g., engines 536 and 542 of FIG. 5C) that perform data extraction and data enrichment as subsequently described. As subsequently described, the machine learning engines may include specialized hardware, such as machine learning accelerators including an array of linked nodes each configured to store a weight value and perform an activation function on data received at that respective node. Additionally, other processing hardware can be used for machine learning engines. The ETL processing module 106 is described in further detail in relation to FIGS. 5A-5C.

One or more data entities that are properties or values that are within a given NL (e.g., the data entities) are grouped and labeled as a node property (NP). As an embodiment, the ETL processing module 106 annotates a given message or data entity to indicate command/control messages for special processing such as bypassing the data-mining operations in favor of real-time processing by data processing system 100 (e.g., the parallel streaming compute engine 114) followed by transmitting the data to external systems. Command and control messages may associate to a message label of "CC," indicating such a message is associated to a command and control operation.

In another embodiment, the ETL processing module 106 annotates a given message to indicate a given message or data entity is data-model identifier for special processing. For example, messages or data entities that are associated with an underlying data-model representation are labeled as DM. The label indicates that the messages or data entities represent an aspect of a particular data-model, and the ETL processing module 106 processes these messages in a similar manner as the node labels, as previously described.

In many applications, data-model transformations constitute a particular operation, which is flagged by the labeling of the data by the ingestion module 102 and which is performed by the ETL processing module 106. The ETL processing module 106 is configured to store definitions of the input-output data-model transformation processing, either for non-real-time processing or within a real-time streaming scenario.

Based on the definitions, the ETL module 106 transforms the incoming message data structures from either the data ingestion module 102, or in the real-time streaming case, the adaptive windowing module 104, into a new data-model structure as output. The data-model structure is generated by the modules 110, 112 as described herein. In some embodiments, such as represented in FIGS. 15 and 16B, the output data stream of the ETL processor 106 is sent directly to the data model generator module (e.g., module 110). In embodiments, additional processing is needed prior to updating the data-model. In this case, the output from the ETL processor module 106 is sent to the streaming data mining window processor module 108.

Figure 5A:
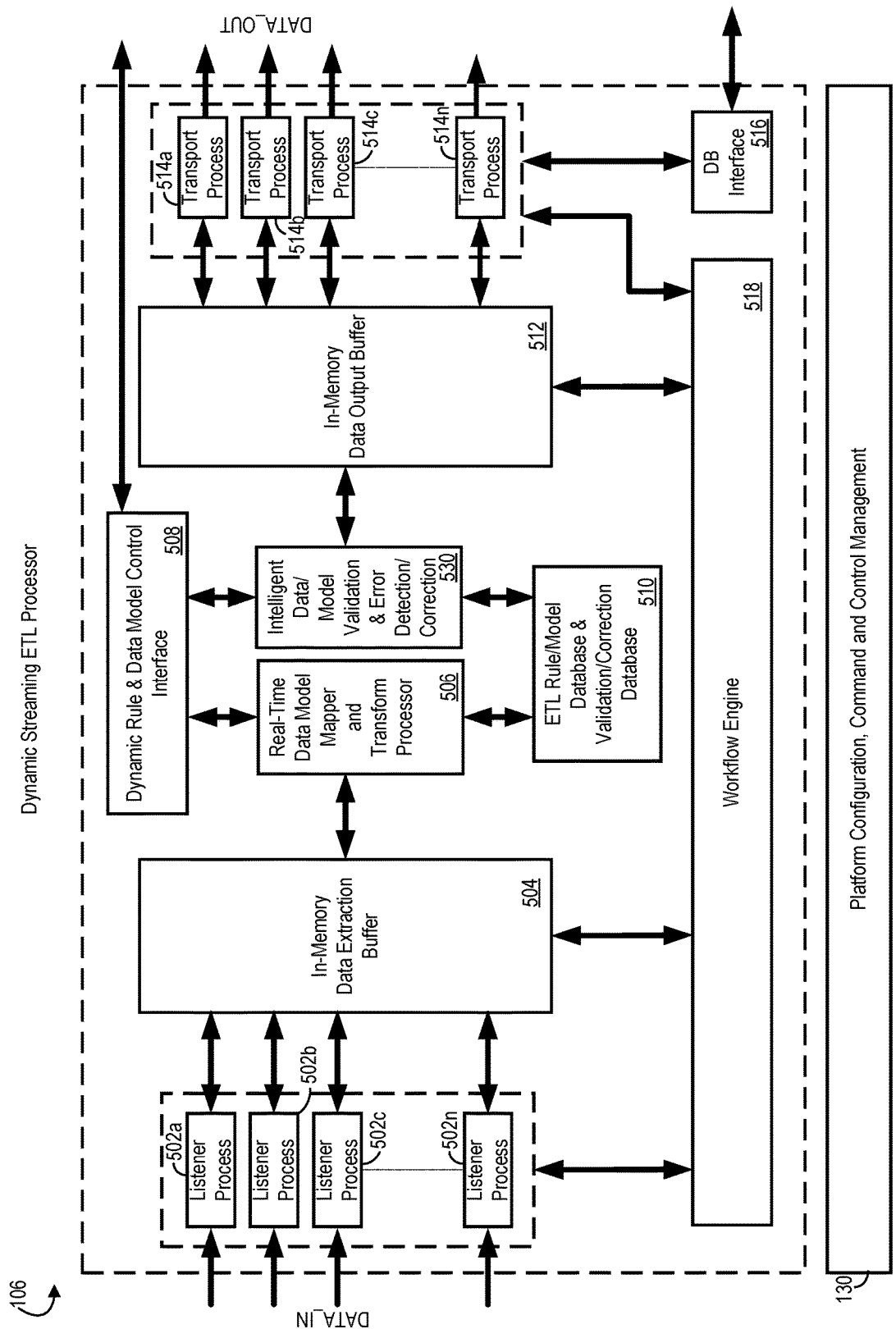
FIG. 5A is a block diagram illustrating a dynamic streaming ETL data module configured to performs programmatic transformations to map one or more source data-model formats to one or more target data-model formats and to perform intelligent data validation, error detection and correction.
Figure 5B:
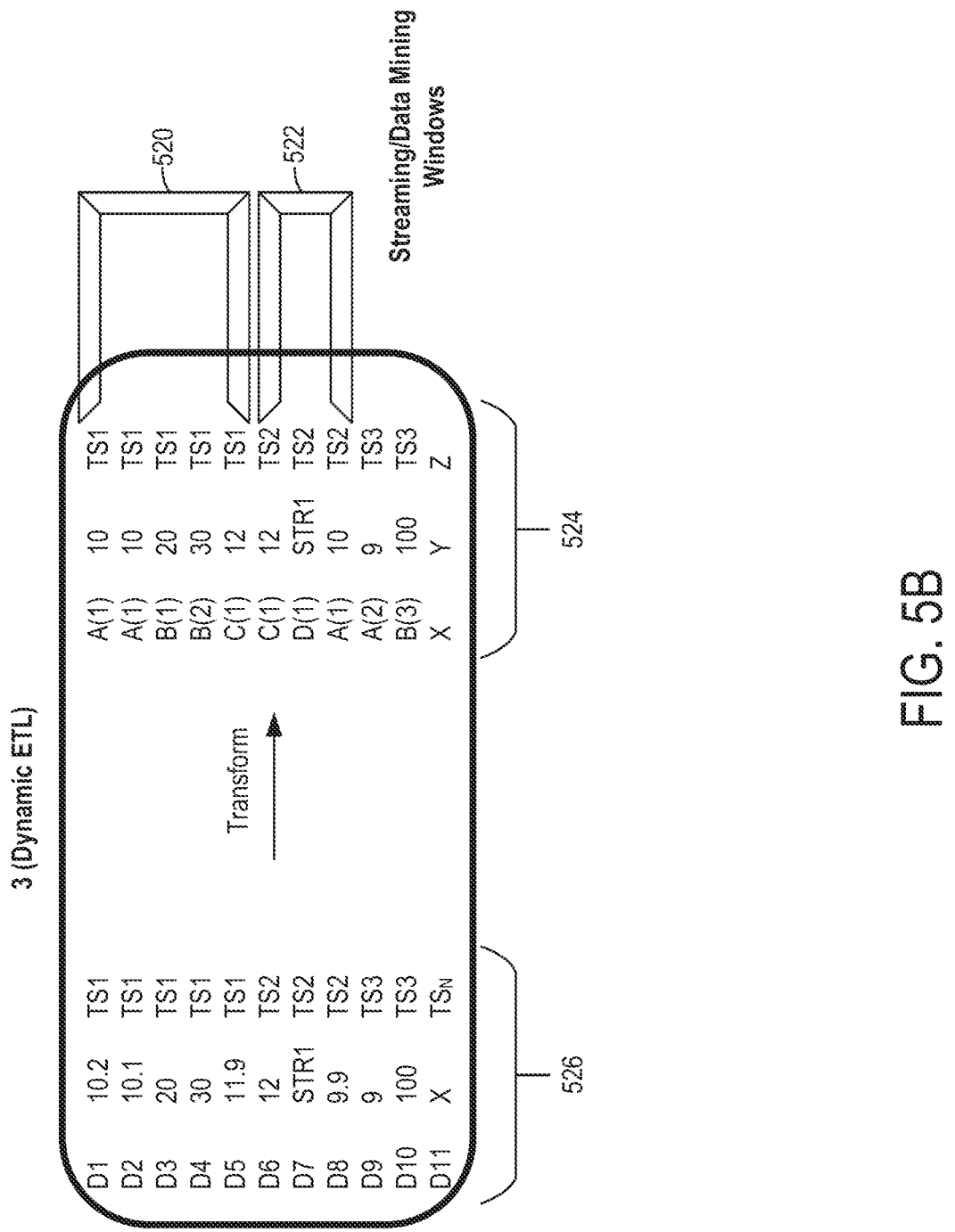
FIG. 5B illustrates a representative data-model entity mapping between an ingestion source and target data-model.
Figure 5C:
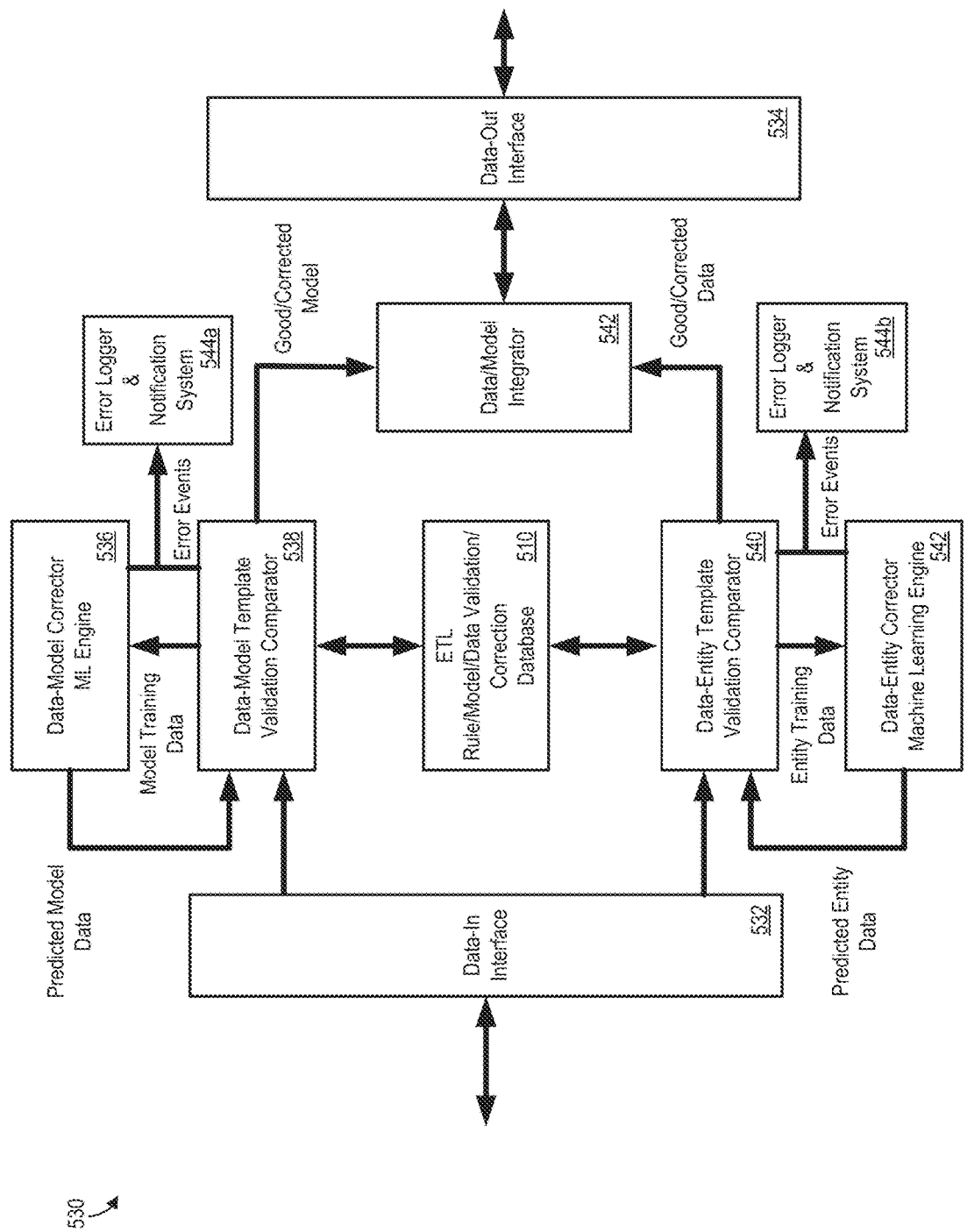
FIG. 5C is a block diagram illustrating a data and/or model validation, error detection, and correction sub-system. Generally, the data processing system utilizes configurable templates for data-model and data-set representations and supervised predictive and heuristic machine learning algorithms to improve the quality of both data-models and corresponding ingested data-entities.

Briefly turning to FIGS. 5A-5C, the ETL processor module 106 is configured for validation, error detection and correction of ingested data received from the window module 104 or the ingestion module 102. The ETL module 106 corrects erroneous data (e.g., lossy data, missing fields, low data quality, and so forth) within a given ingested message, prior to further propagation within the system pipeline. In another example, the ETL module 106 performs validation, detection, and/or correction as a preprocessing operation to cleanup data prior to direct use of the data by an external system (e.g., as shown in FIG. 16C). Processing steps for data correction, validation, and detection are described herein in relation to FIG. 5C.

Returning to FIG. 1, the data mining module 108 to extracts relevant patterns of data from the continuous stream of data. Relevant patterns are determined based on the enrichment performed by the ingestion module 102 and the labeling performed by the ETL processing module 106. For example, the ETL processing module 106 identifies a data source of the data stream. The ETL processing module 106 labels the data source with a label indicating the source. The source is predefined such that the ETL processing model 106 associates the source with data that includes large amounts of information that is either has no utility in the application domain, contains noisy data, or exists in highly redundant patterns of data which provides no information gain or utility. The ETL processing module 106 sends data having this label to the data mining module 108 to allow the data mining module to identify patterns in the data. The data mining widow processor module 108 is further described in relation to FIG. 6.

The data mining module 108 identifies patterns in data streams by matching configurable and programmatically defined representative patterns with incoming data-streams organized as windows. The data streams are processed using one or more configurable functions that maximize encoding data efficiency or that find a representative subset pattern of interest (in the data stream) that represents the complete pattern (the complete set of data across sliding windows). Example functions of the data mining module 108 include utility/profit-based objective function optimization, dictionary or template-based optimization, and minimum description length (MDL) optimization that is commonly used in text encoding/compression. In a degenerative case, the data mining module 108 output represents the fully representative pattern of the input data received.

The data mining window processor 108 sends the complete pattern representation that was generated or extracted to the parallel CPS-G generator module 110. The module 110 is configured to transform the representative and relevant pattern data streams into a compact pattern stream graph structure that enables real-time feature model selection and computation, as subsequently described.

Generally, the module 110 converts the data streams to a data-model and/or a database structure. The data-models that are populated by the module 110 based on the data received from the modules 106, 108 enable third party systems to perform real-time analysis, analytics or other control, coordination and orchestration scenarios as described herein. The data-model and database structure are each suited for enabling virtualized data-model views. To accomplish this, the data processing system 100 uses a prefix tree providing a compressed representation of streaming datasets or compact pattern stream (CPS) representation. The CPS representation is implemented in a graph structure defined as CPS-G that supports a fully enriched data-model and a relatively fast access mechanism (e.g., relative to non-data model configurations) through dynamically instantiated virtualized sub-graphs.

The parallel CPS-G generator module 110 is configured for ingesting one or more optimal pattern streams of data associated to a given workflow instance (produced by module 108) and populates or updates a CPS-G data model (also called a CPS-G database) in both memory and a persistence data store. In this manner, a given CPS-G generator is configured to update or populate a data model, and manages the complete sub-graph (which may include the complete graph) for a given workflow comprising one or more pattern streams. While the data-model is represented and implemented in terms of a graph database architecture, both in-memory storage and persistence storage 124 in FIG. 1 may be realized by any number of standard database platforms and may store combinations of CPS-G data-models and/or other data-models as required by the specific application domain or scenario the data processing system 100 implements. The CPS-G data model stores data from the data streams in a way that enables third-party applications to access and process data from the data streams in near-real time. The CPS-G data model is a particular data structure that is scalable and that is updated in real-time or near-real-time as more data of the data stream are ingested.

In an aspect, the parallel CPS-G generator module 110 configures a number of CPS-G engine processes during initialization. This number can include 1 or many CPS-G data model engines (also called data model generators), each configured to populate or update the CPS-G data model in parallel with one another. Workflows, which include the set of all messages or pattern streams assigned to a workflow as labeled by the ingestion module 102, are assigned (e.g., in a round-robin fashion) to a given respective data model engine to distribute the load. Generally, each CPS-G engine handles at least one workflow. Workflows are not generally split across multiple CPS-G engines. The module 110 can be preconfigured with a given number of parallel CPS-G engines, and additional CPS-G engines can be instantiated if additional workflows are needed. The module 110 is further described in relation to FIG. 7.

The CPS-G in-memory database 124 (and to persistent storage DB 124) is further manipulated and utilized by the parallel real-time CPS-G model updater 112. The CPS-G model updater 112 is configured to receive a CPS-G data-model from the module 112 and build one or more virtualized CPS-G models (also referred to as CPS-G sub-graphs). The structure of the CPS-G data models and their sub-graphs depends on the particular data stream being processed by the data processing system 100 and data requirements specified by an application (e.g., a third party application) requesting the processed data. The requirements can be specified as part of the enriched data stream or specified in a pre-configuration of the data processing system 100. The CPS-G structure and illustrative examples are further described in relation to FIGS. 8A-10.

CPS-G generator engines of the updater module 112 are configured to add, update, modify, and/or delete, for a given workflow, a complete sub-graph associated to the full CPS-G space based on analysis of all workflow message data. The engines operate on the whole graph and complete data model as they consume all the ingestion data. The updater module 112 and the CPS-G generator engines are described in further detail in relation to FIG. 11.

A CPS-G data slice or sub-graph is a portion of the CPS-G data-model generated in response to a query by an application or specified by the application programmatically. For example, a given application submits a query to the CPS-G model generator 112 which computes a sub-graph to satisfy the query. At this point, a much smaller data-structure is available to the querying application or the other modules of the data processing system 100. Subsequent processing occurs on a subset of the total CPS-G graph database 124. For example, a query includes "how many thermometers in zip codes 1, 2, 3 were above 50 degrees between 2010 and 2020." The analytics process feeds a similar sub-graph result set to one of the ML engines (e.g., of parallel streaming compute module 114) to compute the predicted temperatures from zip codes 1, 2, 3 in 2021 based on the historical data.

Computational operations and execution of complex algorithms utilizing one or more CPS-G datasets is performed within the parallel stream compute module 114. The parallel streaming compute module 114 can access either in-memory CPS-G model sub-graphs or selections of CPS-G model sub-graphs stored persistently. Generally, in-memory CPS-G model sub-graph selections are those available from the most recent computations, and persistently stored model sub-graphs are available from earlier computations. The compute module 114 includes a stream-oriented computing model. Available computing engines (e.g., processors or processing platforms) are optimized for graph processing, traversals and search, machine learning, and data-analytics. Specific engines can be included, such as engines that are optimized for swarm optimization and spatial computing and that are specifically integrated in support of collective, coordination, and orchestration tasks for networks of applications, devices, internet of things (IoT), and autonomous devices and/or systems. The compute module 114 subsequently stores sub-graphs of the CPS-G dataset (in-memory 118 or persistent storage database 128) or streamed to the parallel real-time data/model generator 116 (or another module of the data processing system 100).

The compute module 114 is configured to apply one or more analysis models to the CPS-G dataset. The models can include machine learning models or other computing algorithms as subsequently described in relation to FIGS. 12A-12B. The results of the compute module 114 can include a data classification, a data score, rankings, weighting values, a transform of the data (such as encryption or a hash result), a statistical profile, an identification of a semantic relationship, and so forth. In some implementations, a combination of these and other similar processing steps can be performed.

The parallel real-time data/model generator 116 receives outputs from the compute module 114 and transforms them into one or more target data-models and respective datasets into the target data-models for use by clients 122a, 122b, and 122c (collectively clients 122) of the system. In an example, the target data models can include data configurations expected or specified by clients 122. For example, the compute module 114 may output a classification result for some data from the CPS-G model, and the model generator 116 can transform the classification result into a data record entry that can be appended to an existing data record stored by a client. In another example, the classification data can be converted into a data message that is packaged into an expected data protocol (e.g., TCP/IP, SMS, and so forth). The mapping between the CPS-G model that is generated and the target data-model for a given client is configurable, and a mapping relationship is specified (e.g., by a client 122). Because the data processing system 100 can output data as a stream of real-time data in the form of messages and events, in batch, or interactive access patterns, the generator module 116 and data stores 118, 128 store outbound datasets in both in-memory and persistent database formats in the target data-model format. The generator module 116 is described in further detail in relation to FIG. 13.

The data processing system 100 workflow includes a real-time transport and message queues module 120 and clients 122, including the real-time streaming clients 122a, the real-time publish/subscribe clients 122b, and the interactive/batch clients and systems 122c. In an example, the real-time streaming clients 122a can include clients who send and receive data from the data processing system 100 as a real-time stream. In some implementations, the real-time publish/subscribe clients 122b can include clients using real-time publish-subscribe protocol (RTPS), which includes a protocol for best effort and reliable pub-sub communications over unreliable transports, such as unstructured data packets (UDP), in either or both unicast and multicast. In an example, interactive/batch clients and systems 122c include device that request data processing by the data processing system 100 as a part of a non-real-time stream, such as a batch request for data or as part of a service call. These clients 122a-c are examples, and other client types are possible.

The real-time transport and message queues module 120 has direct access to the in-memory database 118, and is designed to accept real-time streaming messages and send them to the specified targets. In some implementations, the message queues module 120 determines a destination for incoming data from the model generator 116. The module 120 acts as an interface to send the incoming data to the desired destination. For example, the data can be sent over a flexible set of transports and delivery methods including message oriented (publish/subscribe), event oriented, and multicast distribution. New transports can be easily added as the transport distribution functionality is modular and extensible by design. Concurrently, support for non-real-time message distribution is also supported through interactive and batch oriented access using standard TCP/IP based protocols, transport types, and interfaces such as HTTP delivery, IP protocol based message delivery, or specific connectors introducing customized interface transports and protocols defined by third-parties.

As previously described, the modules 102, 104, 106, 108, 110, 112, 114, 116, and 120 form end-to-end workflows for the data processing system 100. The data processing system 100 design is based on stream-oriented dataflow pipeline of the modules 102, 104, 106, 108, 110, 112, 114, 116, and 120 that plug into one another (e.g., by individual interfaces). Each of the modules 102, 104, 106, 108, 110, 112, 114, 116, and 120 can be independently configured and utilized. Each of the modules 102, 104, 106, 108, 110, 112, 114, 116, and 120 can included independent processing hardware or can share a collective processing hardware, operating as individual logic engines. While specific examples (e.g., of data models) are provided for illustration of the operation of the data processing system 100, other examples are possible for use in a similar processing workflow. For example, the CPS-G data-model is optimized for real-time streaming data analytics, and distributed coordination, orchestration scenarios for networks of IoT and autonomous devices. However, the CPS-G data-model and its implementation by the CPS-G data model updater 112 (configured for data-model, database, and data model sub-graph generation) can be replaced with other data-models and/or database paradigms. The data processing system 100 is similarly flexible with respect to other module implementations, including similar logic for adaptive windowing, for ETL, target model computation, and so forth.

Figure 2:
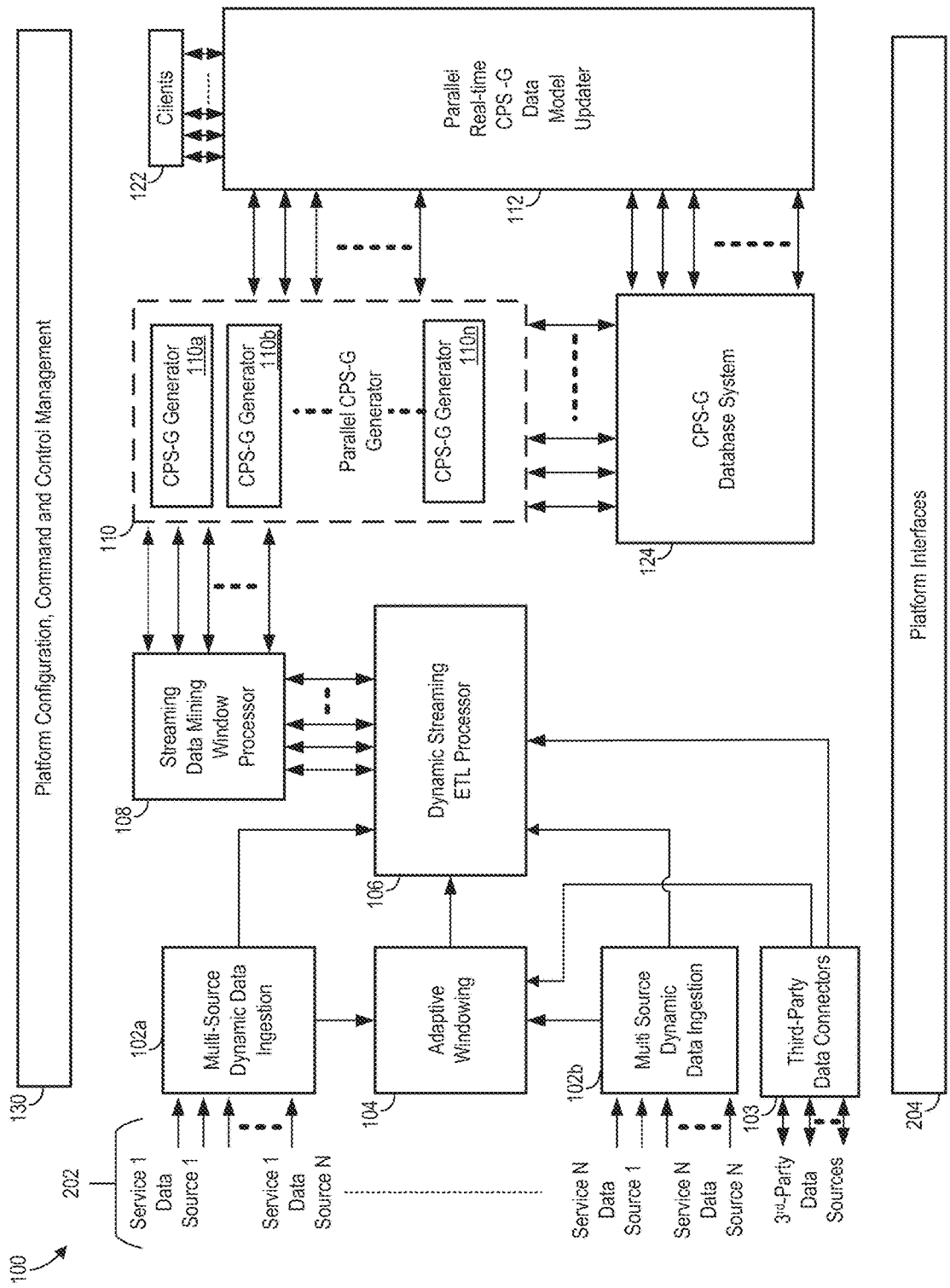
FIG. 2 is a schematic diagram illustrating ingestion for multi-source datasets across multiple service originators.

FIG. 2 illustrates an embodiment of the data processing system 100 of FIG. 1 whereby the multiple data sources 202 are associated to one or more services that logically group a set of data sources by the corresponding service originator. For example, service 1 has data sources 1 through N, service 2 has additional independent data sources 1 through N, and so forth until service N has additional independent data sources 1 through N. In an example, data semantics (e.g., the computational data model) of these services and their associated data sources are maintained throughout the system pipeline. In some implementations, the data semantics are aggregated into a new set of service-to-data source mappings under the control of the dynamic streaming ETL processor module 106. A service originator (not shown) may include one or more systems, applications, devices, platforms, third-party connectors, interfaces, API, or service providers and service-oriented platforms that produce, publish, generate, or distribute at least one data source. Instances 102a and 102b of the data ingestion module 102 are shown in FIG. 2; these instances can be performed in the same module 102 or separate modules.

In the example of FIG. 2, outputs from the data model updater module 112 are directly accessible by clients 122, without further processing by modules 114, 116, previously described. In some implementations, the internal structure of the parallel CPS-G generator module 110 can include multiple CPS-G processing modules 110a, 110b, and 110c, where each CPS-G generator manages the generation of the CPS-G graph model as a parallel processing activity. Module 110 is described in additional detail in relation to FIG. 7.

Figure 3A:
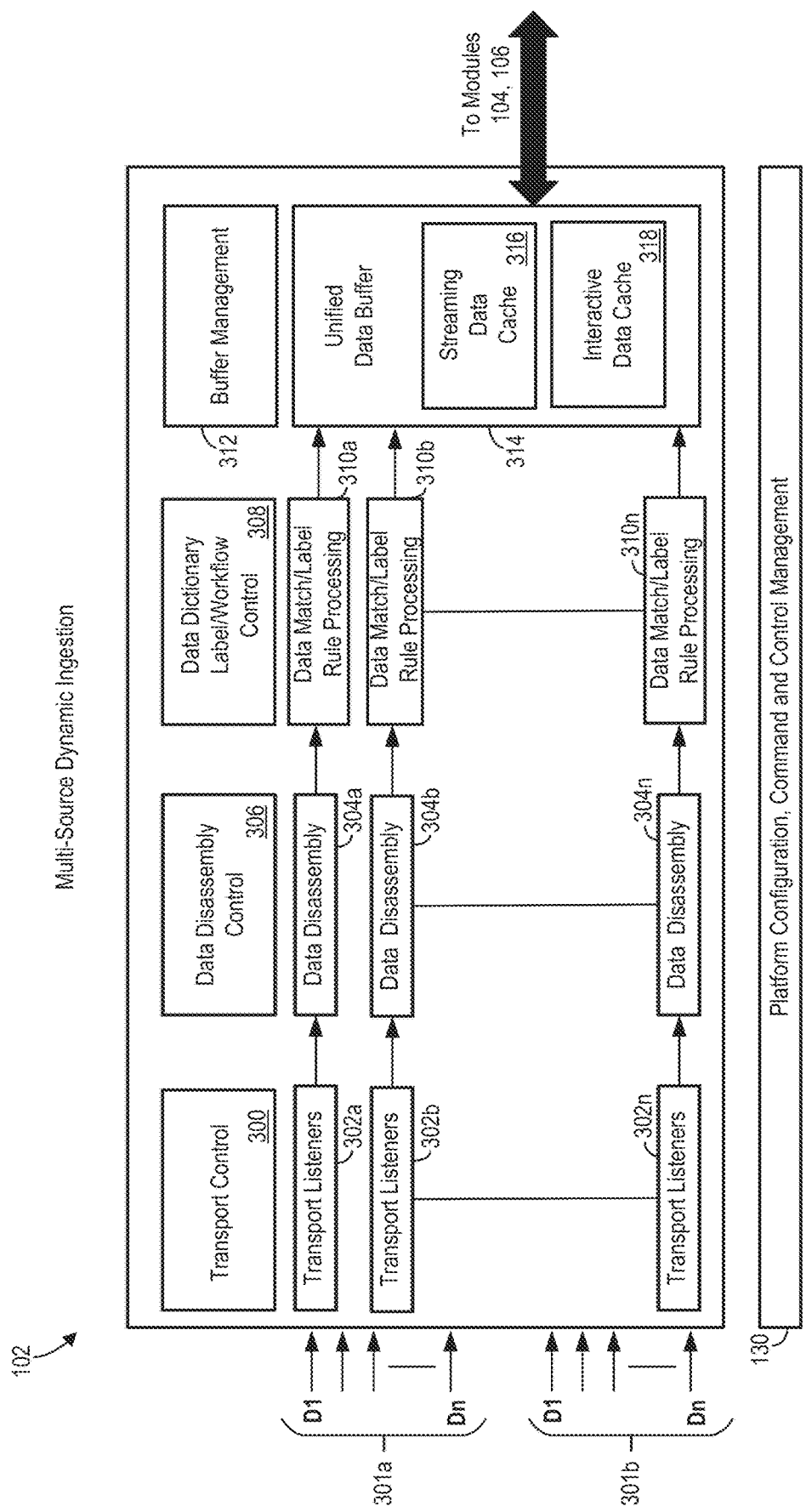
FIG. 3A is a block diagram illustrating an example module for dynamic multi-source message and data ingestion.

FIG. 3A illustrates an internal design architecture of the multi-source dynamic ingestion module 102 of FIG. 1. In the example shown in FIG. 3A, the module 102 is configured for processing of source data (e.g., raw message data), such as real-time data generated from remote devices, IoT devices, and autonomous devices or systems. Generally, for each incoming connection, associated with one or more data sources 301a, 301b mapped to one or more service originators, multiple messages are received. A message arrival rate can differ between any of the data sources. The messages may be asynchronous to one another. There is no assumption on the time alignment relative between any two messages or any two data sources.

The ingestion module 102 listens for incoming connections through transport listener processes 302a, 302b . . . 302n, supporting one or more independent transport types which may include UDP/IP, TCP/IP, multicast, wireless, Bluetooth, or more complex transport protocols built from more fundamental network standards. A transport control element 300 configures and establishes the number of instances of transport listeners 302a-n and their protocol handling capabilities. Incoming messages generally include both delivery envelope, message headers, and payload where the actual data resides. However, useful metadata can exist within both the delivery envelope, message headers and payload.

The module 102 disassembles the message into elemental components to extract useful information from the message. This is performed by data disassembly processing elements 304a, 304b . . . 304n, managed by control 306, and data match/label rule processing elements 310a, 310b 310n, managed by control 308. For each message received, the data disassembly process deconstructs the streaming message structure into elemental data elements including message and payload headers. The elements 304a-n tag the incoming data as real-time or non-real-time to support data velocity analysis, rate buffering, and compute message processing prioritization.

The stream of elemental data is directly fed into corresponding data match/label rule processing components 310a, 310b, . . . 310n, which each enrich the data elements by matching their structure and providing labels where required such as timestamps and workflow identifier metadata. The components 310a-310n receive the disassembled messages from the data disassembly components 304a-n. The components 310a-n execute logic of one or more preconfigured rules for generating labels for the disassembled data. The rules for labeling the disassembled data are configurable and are selectable based on the source of the data. In one embodiment, the matching logic utilizes the data dictionary and provides a match based on regular expressions or fuzzy logic based expressions. In another embodiment, the matching logic can utilize machine learning methods to predict the optimal match based on prior history of data and associated matches performed. For example, if a source IP address is X, then the system labels the data with Y and assigns to workflow ID 123. In another example, if a byte X is at field position 2 has a value of Y in message location at Z, then the system labels the data as String ABC.

The labels are generated based on metadata received with the incoming data from the data sources in conjunction with the data match/label rule processing components and data match/label dictionary. For example, data from a particular data source (e.g., a first drone in a plurality of drones) are labeled with an identifier associated with that drone, and are assigned to a particular workflow (and thus assigned a same workflow identifier). Other labels can include timestamp data, data domain identifiers, and so forth.

The enriched, disassembled data are sent to a rate-aware buffer 314 that provides both streaming data (continuous dataflow emitted) and non-streaming access to the same data through interactive interfaces for next module stage processing in the workflow. The buffer 314 can be controlled by a buffer management 312 controller and can include several caches, such as a streaming data cache 316 and an interactive data cache 318. The streaming data cache 316 allows real-time/near-real time data movement. For example, the streaming data cache 316 operates as memory with a messaging bus as an output buffer for message publishing in outbound direction (e.g., a message broker). The interactive cache 318 includes memory with an HTTP or similar request/response API (socket server) interface on the outbound side.

Figure 3B:
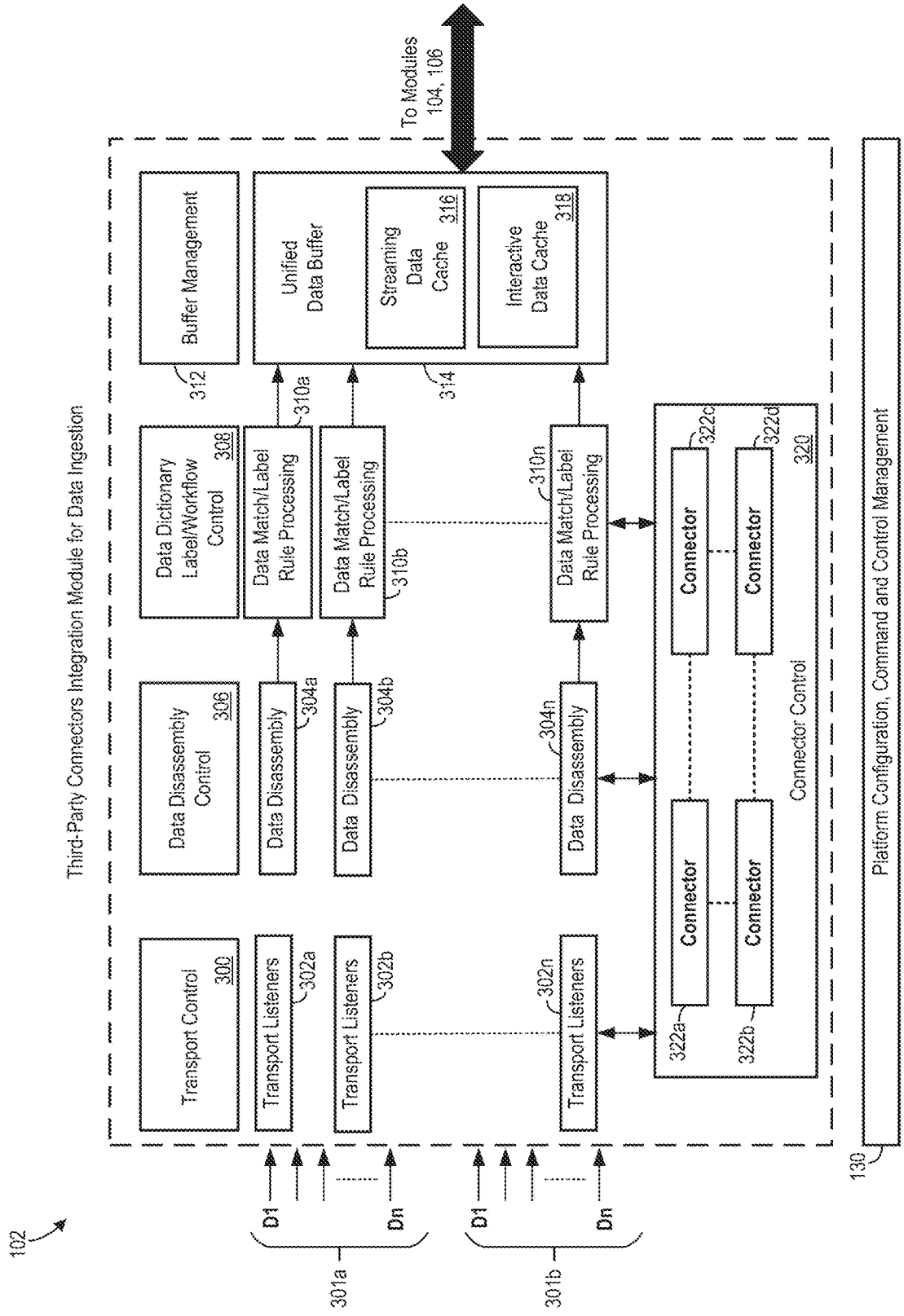
FIG. 3B is a block diagram illustrating an example module for dynamic multi-source message and data ingestion including third-party connector processing elements.

FIG. 3B illustrates an embodiment of module 102 where additional support for third-party specific connectors 322a, 322b, 322c, and 322d are available. In this example, a connector architecture 320 enables adaptation of third-party specific interfaces that include multi-state business logic for message processing. The design of the connector is domain-specific, meaning that the particular rules implemented are particular to the use case of the client 122. The connector architecture 320 is independent of the third-party connector. The output of the connector architecture 320 is equivalent to the input transport and message types provided to the data disassembly components 304a-n by the transport listeners 302a-n. The connectors 322a-d are each configured to interface the ingestion module 102 with specific platforms. For example, the connectors 322a-d each include logic based on an API or other interface of the data source(s). The connectors 322a-d each are configured to cause the remote data source to provide data to the data processing system 100 so that the data processing system is able to process the provided data in the workflows as described herein.

The buffer 314 includes several data stores, such as a streaming data cache 316 and an interactive data cache 318. The caches 316, 318 are configured to store the output of the data ingestion module 102 until downstream modules (such as the adaptive window module 104) are ready to receive the ingested data. In real-time implementations, the buffer is configured to stream the output of the ingestion module 102 to the windowing module 104. For example, the data are transferred through the workflow with negligible delay (e.g., other than OS/system level queueing). Generally, messages move in real-time or near-real time from module to module with minimal delay, other than queuing latency, transport overhead, etc. In contrast, the interactive model is based on a request-response model with push or pull where the client must ask a server process for a message explicitly.

Figure 4A:
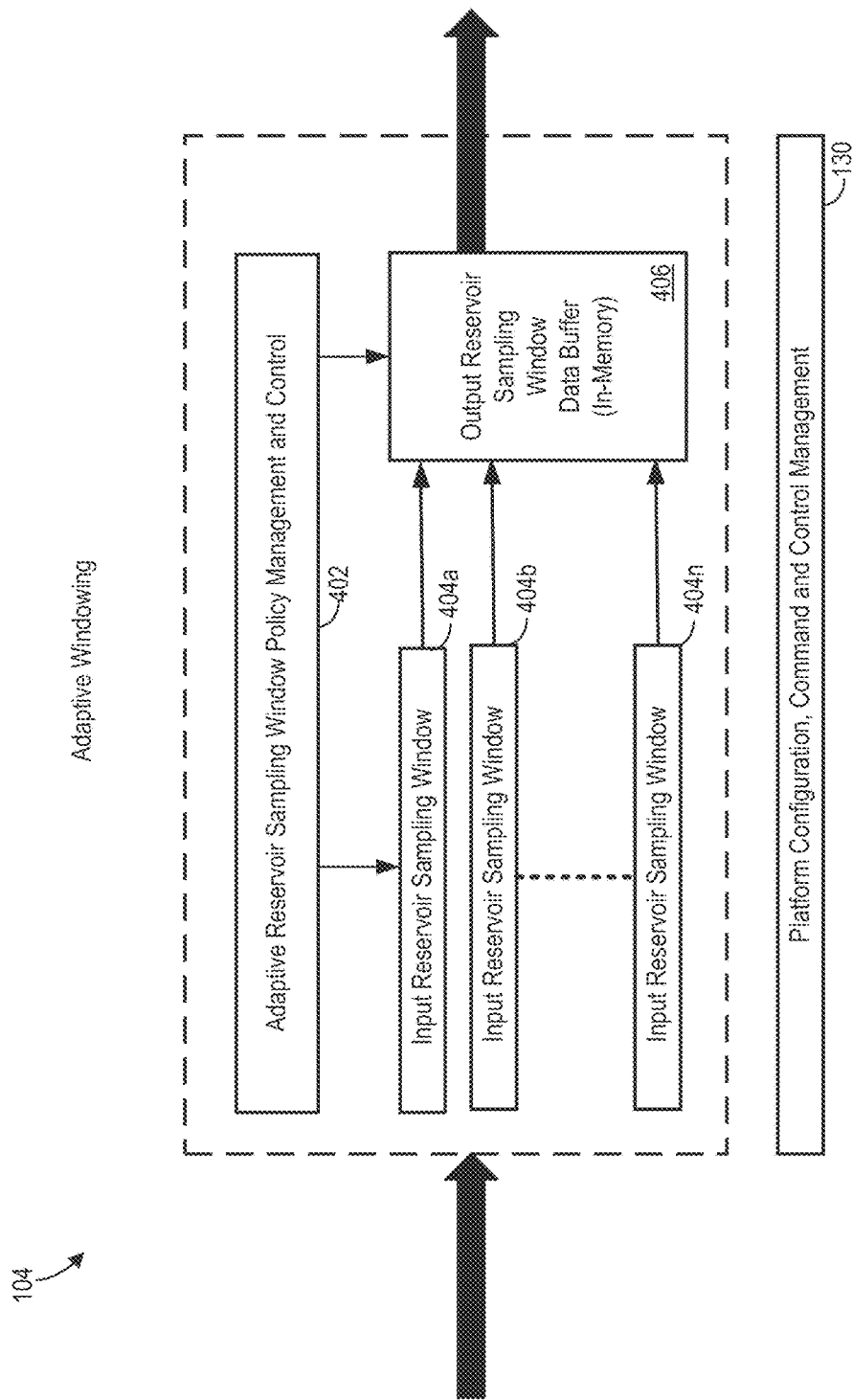
FIG. 4A is a block diagram illustrating an adaptive windowing module configured to provide real-time messaging buffering and data relevancy selection to optimize ingestion of real-time messages and associated data.
Figure 4B:
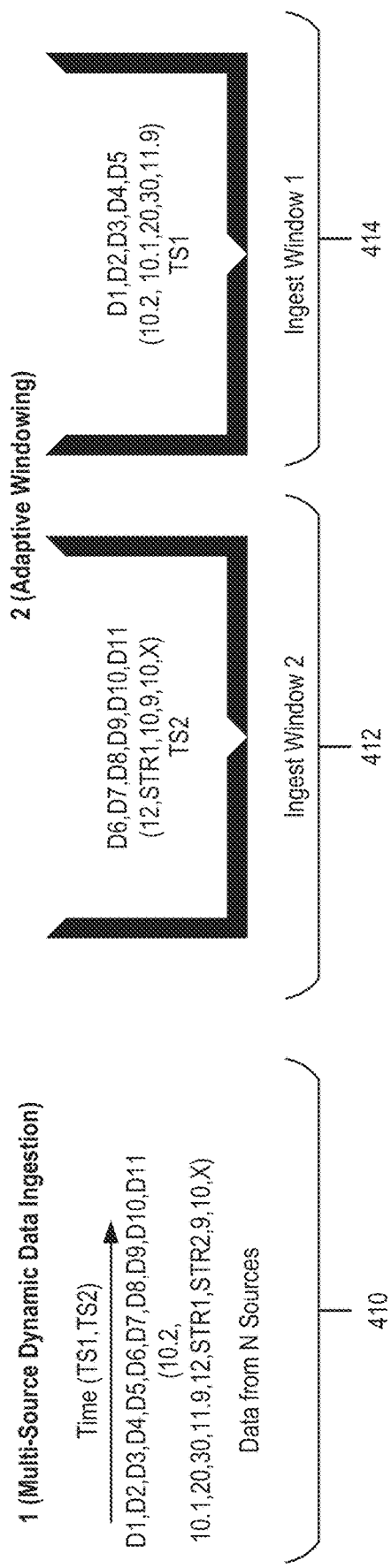
FIG. 4B illustrates an example of a message stream ingestion across two adaptive windows.

FIGS. 4A and 4B illustrate designs of the adaptive window module 104. The adaptive window module 104 configured to process real-time streaming data. In an example, the adaptive window module 104 performs weighted reservoir-based sampling. Each incoming dataset fills a time window or reservoir to a fixed sample size (e.g., of dataset elements). The adaptive windowing module 104 maintains a weighting across different window elements. As each new message or dataset arrives, the adaptive window module 104 determines (e.g., based on a weighting probability function), whether the new dataset is to be included in the reservoir and some other dataset included in the reservoir is removed, or whether this does not occur. The windowing module 104 makes this determination based on a randomly decided, uniformly selected element. This procedure ensures that the windowing module 104 maintains a uniform sample distribution and reservoir size for each window. The details of example algorithms for weighted reservoir sampling in real-time data streams as described in Ghatage, *Frequent Pattern Mining Over Data Stream Using Compact Sliding Window Tree & Sliding Window Model*, International Research Journal of Engineering and Technology (IRJET), vol. 02, issue 04, July 2015; Efraimidis, *Weighted Random Sampling over Data Streams*, arXiv:1012.0256v2, July 2015; Al-Kateb, *Adaptive-Size Reservoir Sampling over Data Streams*, 19th International Conference on Scientific and Statistical Database Management (SSDBM), 2007; and Tangwongsan, *Parallel Streaming Random Sampling*, arXiv:1906.04120v1, June 2019, each of which is hereby incorporated by reference in entirety.

The adaptive window module 104 can use different windowing algorithms for different workflows. An adaptive window policy management and control component 402 controls which particular windowing process is performed by the windowing module 104. During configuration or operation of the data processing system 100, the windowing procedure definition can be updated, replaced, and/or modified with a new windowing procedure definition. The adaptive window module supports both adaptive and weighted reservoir-based sampling methods. In an example, each workflow is assigned an independent reservoir implementation. The adaptive window module 104 supports the configurable execution of any such type of algorithm, including the examples described in M. Chao, *A general purpose unequal probability sampling plan*, Biometrika, 69(3):653-656, 1982 and P. S. Efraimidis and P. G. Spirakis, *Weighted random sampling with a reservoir*, Information Processing Letters. 97(5):181-185, 2006, the contents of each of which are hereby incorporated by reference in entirety. In an embodiment, the chosen algorithm for a given workstream is dynamically changed/swapped out by evaluating the quality of the output in terms of an error metric, and iteratively searching for the best algorithm required for the given workflow Parallel reservoir windows 404*a*, 404*b*, and 404*n* are a first input stage for the windowing module 104. Each parallel reservoir window 404*a-n* performs a widowing process on received data. A second reservoir called an output reservoir 406 aggregates the windows processed by the parallel reservoir windows. A relatively high degree of adaptive window scalability is enabled by the two-step windowing process. In some implementations, scalability is achieved in the first layer where there are N parallel windows in front of the inbound messages spread horizontally. The aggregation layer accepts the most relevant sketch-of-sketches from the first layer, funneling N windows to 1 output window.

As an example of a windowing operation of module 104, FIG. 4B illustrates datasets 410 emitted from the data ingestion module 102 across two time periods spanning TS1 and TS2. FIG. 4B illustrates the mapping of said datasets to two reservoirs: window 1 (labeled window 414) and window 2 (labeled 412) in temporal order. The windows 412, 414 are each generated by input reservoir sampling windows 404*a-n*. The output stage reservoir 406 emits window sketches of windows 412, 414. In addition to aggregating distributed input windows 412, 414, the output from the second stage reservoir 406 aligns and time synchronizes the streaming output rate to the input for the streaming ETL processing module 106 in FIG. 1, which is the next module in the workflow.

Figure 4C:
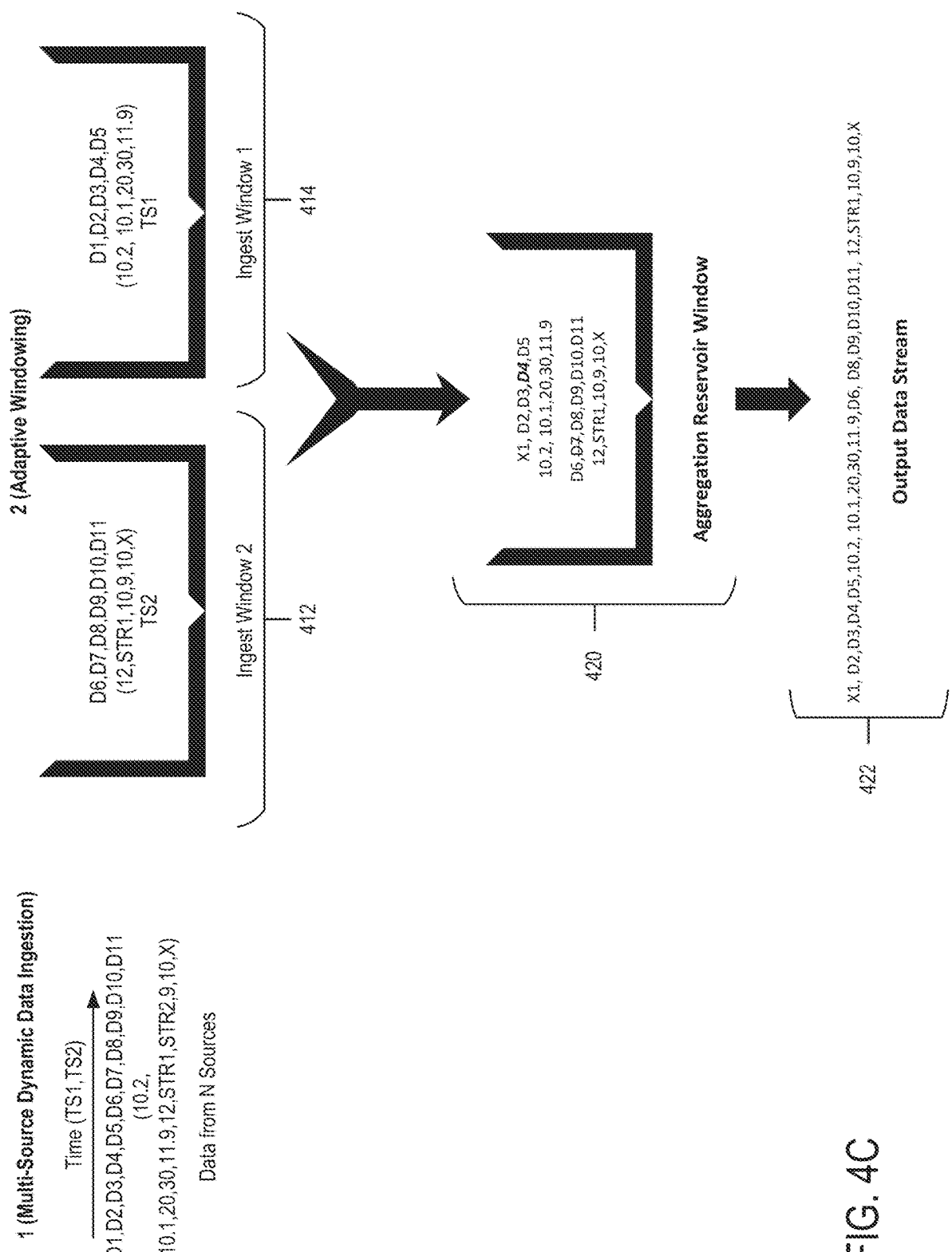
FIG. 4C illustrates an example of a message stream ingestion across two adaptive windows for parallel adaptive windowing.

FIG. 4C illustrates an example of an aggregation reservoir 420 generated from the windows 412, 414. FIG. 4C shows two windows in operation with an aggregation layer (e.g., reservoir 420) and shows an example of dynamic reservoir processing. Based on the sampling algorithm chosen, data element D1 is removed from the reservoir 420 and X1 is emitted. Further, when windows 412 and 414 output their data to the second layer or aggregation reservoir, the reservoir sampling algorithm removes data element D7 and keeps element D4. The final set of data elements are streamed out as shown in the output data stream 422. Generally, different reservoir algorithms process the windows differently and make different determinations on how to process the data within each data window frame. Therefore the data sketch produced is dependent on the particular sampling algorithm selected. As previously described, the data processing system 100 is configured for dynamic algorithm configuration (e.g., selection of a sampling algorithm based on the data being ingested. The data processing system 100 optimizes the output based on iterative evaluation and reduction of a mean error of the workflow, such as based on a predefined objective function defining the desired output.

FIG. 5A illustrates components of the streaming ETL processor module 106. Module 106 transforms incoming data of the aggregated windows 412, 414 from the windowing module 104 (in a real-time data stream) or the disassembled data (for a non-real-time context) from the ingestion module 102. The module 106 transforms the stream to a target data-model that can be included or represented in the CPS-G data structure (or a similar data model).

One or more listener processes 502*a*, 502*b*, 502*c* ... 502*n* accept either real-time streaming data or interactive batch data from the adaptive window module 104 or multi-source dynamic data ingestion module(s) 102 respectively. The data representation is enriched with metadata from the multi-source dynamic ingestion module 102 including semantic metadata and tagged datasets describing the input data-model and respective data entities. The metadata describing the input data model describes aspects of the input data such what communication protocol is represented, which data types are included, what the data represent (e.g., a semantic label), and similar metadata. For example, the metadata can indicate that the input data was received using TCP/IP, that the data represents navigation telemetry including velocity and altitude of a drone, a drone identifier, and a timestamp. Other similar labeling is possible. The labeling is comprehensive to enable the transformation process of the module 106 to complete deterministically.

The module 106 passes input data (windowed data stream data or otherwise) into the in-memory data store (e.g., through buffer 504). A real-time data-model mapper and transform processor 506 operates under the orchestration of the workflow engine 518 that specifies the transformation task-graph executed by the real-time data-model mapper and transform processor 506. The task graph indicates which series of processing steps occurs for transforming the input data to data for the CPS-G data model based on the labels of the metadata added by the ingestion module 102. The configured rule sets are stored in a local ETL rule/model database 510 that is part of a memory of the module 106. The rule sets specify patterns for a pattern matching analysis. The pattern matching analysis identifies the data in the stream and enables selection of the transform logic to transform the data for including in the CPS-G data structure by modules 112, 114. In this way, the real-time data-model mapper and transform processor 506 utilizes the database 510 to match incoming data-model representations utilizing the metadata and the data itself to pattern match input data (or an input data model) to a known data model.

The module 106 is configured to perform a process for transforming the input data to the output data model (e.g., the CPS-G data model) as follows. In an embodiment, the ETL processor module 106 performs a sketch of the data elements in a data window received from the windowing module 104. The ETL processor module 106 includes a semantic layer that is configured to determine how incoming data fits into a given data model structure. For example, the ETL processor module 106 can be configured for pattern matching or to recognize features, labels, or tags in the metadata. Generally, incoming data elements have enough annotations such that ETL processor module 106 may match the data elements associated to one or more target data-models (e.g., a CPS-G data model). The ETL processor module 106 uses the metadata to generate annotations for the output data model (e.g., a CPS-G data model). The annotations enable the downstream CPS-G generator module 110 to generate a set of graph nodes for the CPS-G data model during generation/updating of the CPS-G data model. The ETL processor module 106 transforms the input data model and associated entity datasets to data that can be added to the output data model based on transform rules or patterns stored in the database 510 and specified by the interface 508.

The ETL processing module 106 generates, for the input data, node labels, node properties data, data model labels, and/or command and control labels. As subsequently described, the GPS-G generator module 110 receives these metadata labels/annotations as inputs along with the transformed data from the ETL module 106. The generator module 110 generates a graph structure and the data structures within each node (e.g., pointers and tensors).

Generally, the output data (e.g., output data model or transformed data) from the ETL processor module 106 is different than the input data model (e.g., input data or incoming data stream). The ETL processor module 106 is configured to restructure and prepare the windowed data to facilitate the implementation of the output data model (e.g., the CPS-G structure) by generation of the annotations that categorize the entities by type, group, association to a given data-model, and so forth. The transformation is performed for incoming data differently for each workflow.

The ETL processor module 106 transforms or restructures the enriched incoming data. Restructuring data includes adding or removing portions of the data so that the data has the expected information that is needed for adding that data to the CPS-G data model. The ETL processor module 106 plugs in missing data for a data template of the CPS-G structure using the rule set received from database 510. These rules, as previously stated, match input data to the particular data model (e.g., the CPS-G data model). However, in some implementations, the ETL processor module 106 may not make any changes to the data elements if none are needed. In some implementations, the module 106 does not change the data model, but instead finds patterns and forwards them to remove highly redundant data. In some implementations, a module 530 for intelligent data and/or data model validation and error detection and/or error correction is included to handle input data including errors and correct that data for inclusion in the CPS-G data model. For example, errors in the data can include data quality errors, missing data, incorrect formatting of the data, invalid data (e.g., data out of a required range or including impossible values), and so forth. For example, erroneous data may include data from a saturated sensor or data that is clearly out of range, such as some velocity data values for a drone exceeding a possible speed. The validation and error correction module 530 receives rules data (such as pattern templates or trained models data) from the ELT rule/model and validation and correction database 510 and performs validation and error detection/correction. Error correction is further described in relation to FIG. 5C.

The rules can include business rules or explicit mapping rules. The rules can be changed during processing of the workflow. The rules can be different for each workflow. For example, the ETL processor module 106 accesses rules and models from the database 510 to assert immediately. In a use case, a fleet of drones are from different manufacturers. Each workflow reads sensor data obtained from the drones in different formats (e.g., different SDKs) and represents the data in common way for a common analysis. To handle the different formats, different transform rules are applied for each workflow. Depending on the labels added by the ingestion module 102, the format of the received data for each workflow is known. The ETL processor module 106 retrieves the appropriate rule set for each respective workflow from the database 510 and applies for transforming the data. As a second example, a network of portable medical device sensors and portable NMR/Multisensor based detection analysis systems generate data streams in different formats from a variety of manufacturers. The ETL processor module 106, using labels/metadata provided with the sensor data, extracts relevant data received from each device using a respective ruleset for handling each format from the different manufacturers. This process can be part of a workflow to normalize all sensor data as part of distributed healthcare diagnostics, geo-spatial pathogen detection, or pharmaceutical drug trials. The output of the ETL processor module 106 results in data that can be added to a common data model (such as a CPS-G data model) for data from each of the different sensors, even though the data initially are received having different formats. In an example, the ETL processor 106 is configured to ensure that all received data represent the same units (e.g., all units are use meters rather than feet).

The execution flow of the data transformation by the ETL processor 106 is defined as a streaming task-graph of map/transform operations that is generated by the real-time data model mapper and transform processor 506 based on the inputs from the ETL rule/model database 510. In addition, rule and data-model definitions are received through the control interface 508. As previously described, the interface 508 provides a mechanism for rule-based, relational, algebraic, and other definitions for the mapping and transformation operation rules to apply within the executing task-graph of the data-model and transform processor 506. The transform processor 506 performs stream computing if required.

However, a non-streaming oriented architecture for the data-model mapper and transform processor 506 is also possible. In this embodiment, a deterministic state machine is programmatically defined and implemented by the interface 508. In some implementations, the transform processor 506 utilizes fixed mapping and transformation rules.

The operation of transform processor 506 is also controlled by the workflow engine 518. The workflow engine 518 controls the lifecycle runtime state of the overall module 106, including instantiation, configuration, process control, coordination, and orchestration of module functions previously described. An additional function of the workflow engine 518 is to enable reconfiguration of the module components. This enables changes to the operation of the module to take effect in real-time (e.g., immediately) with no loss of data or interruptions to workflow continuity.

As input data-models processed through the appropriate task-graph where map/transform operations are executed, the resulting output data-model and accompanying datasets are moved (e.g., by the workflow engine 518 control and orchestration) to an output buffer 512. The buffer 512 is where one or more transport processes 514*a*, 514*b*, and 514*c* . . . 514*n* stream resulting datasets to the data mining module 108. The buffer enables integration between the module 106 and the module 108.

In embodiments, the order of operations for transforming the incoming data model by the module 106 are represented as a graph. Each node of the graph represents a transformation. The order is represented by the graph topology. The graph specifies to the data mining module 108 how to process the data and when to perform processing operations. The graph represents which data of the output data model depend on which other data. This is a semantic level mapping, which shows how sets of data are organized or structured. The output data model is associated with a transform template. The output data model is a combination of the input data models.

The ETL module 106 is able to directly integrate in multiple ways to subsequent modules (e.g., modules 108, 110, or 112 of FIG. 1). For example, the dynamic streaming ETL processor 106 can directly integrate with interfaces to third-party systems (e.g., of clients 122) or others by directly streaming output datasets and their semantic data-model representation to those clients through integration interfaces or directly (such as shown in FIG. 16C). In the case of non-real-time or streaming targets, the transport processes feed through a database interface 516 to an external database for interactive or batch-oriented access. These last two embodiments are subsequently described in greater detail, such as in relation to FIG. 14.

FIG. 5B illustrates an example of dynamic ETL whereby there is an input data-model split across two windows, including window 520 and window 522. The data transform shows a mapping/transformation operation to a target dataset 524 from a source dataset 526 and data-model representation. Additionally, the two output windows 520, 522 become the input windows for the next stage, or data mining module 108.

FIG. 5C shows an example of the module 530 for intelligent data and/or data model validation and error detection and/or error correction described in relation to FIG. 5A. The module 530 includes a data-in interface 532 for receiving data and a data-out interface 534 for sending data to other modules of the system. Received data can be analyzed by two modules: the data-model template validation comparator 538 and/or the data-entity template validation comparator 540.

The comparator 538 is configured to validate data models of the data received. This can be done by analysis of the structure of the received data (e.g., relationships of the data to other received data). A model-entity machine learning engine 536 is trained to recognize and classify the data as belonging to a particular data model. Errors are reported to an error logger 544a (e.g., if no model is found, or if the classification is a bad fit). The error logger 544a can report that there is no matching data model or indicate how the input data is mismatched to an existing data model. Correction can be an iterative process. If the model is correctable or correct, the model identifier or model data itself are sent to a data/model integrator 542 for integration with corrected data from comparator 540.

Similarly, the comparator 540 is configured to validate data itself that is received to determine that the data matches a predefined template or is correctable to match what is known to be non-erroneous data. This can be done by analysis of the received data (e.g., a format of the data or other expected feature of the data). A data-entity machine learning engine 542 is trained to recognize and classify the data as having particular features. Errors are reported to an error logger 544b (e.g., if no matching data are found, or if the classification is a bad fit to expected data). Correction can be an iterative process. The error logger 544b can report that correction cannot be performed, or show what corrections are performed for given data. If the data are correctable or correct, the data are sent to a data/model integrator 542 for integration with corrected data from comparator 538.

Figure 6:
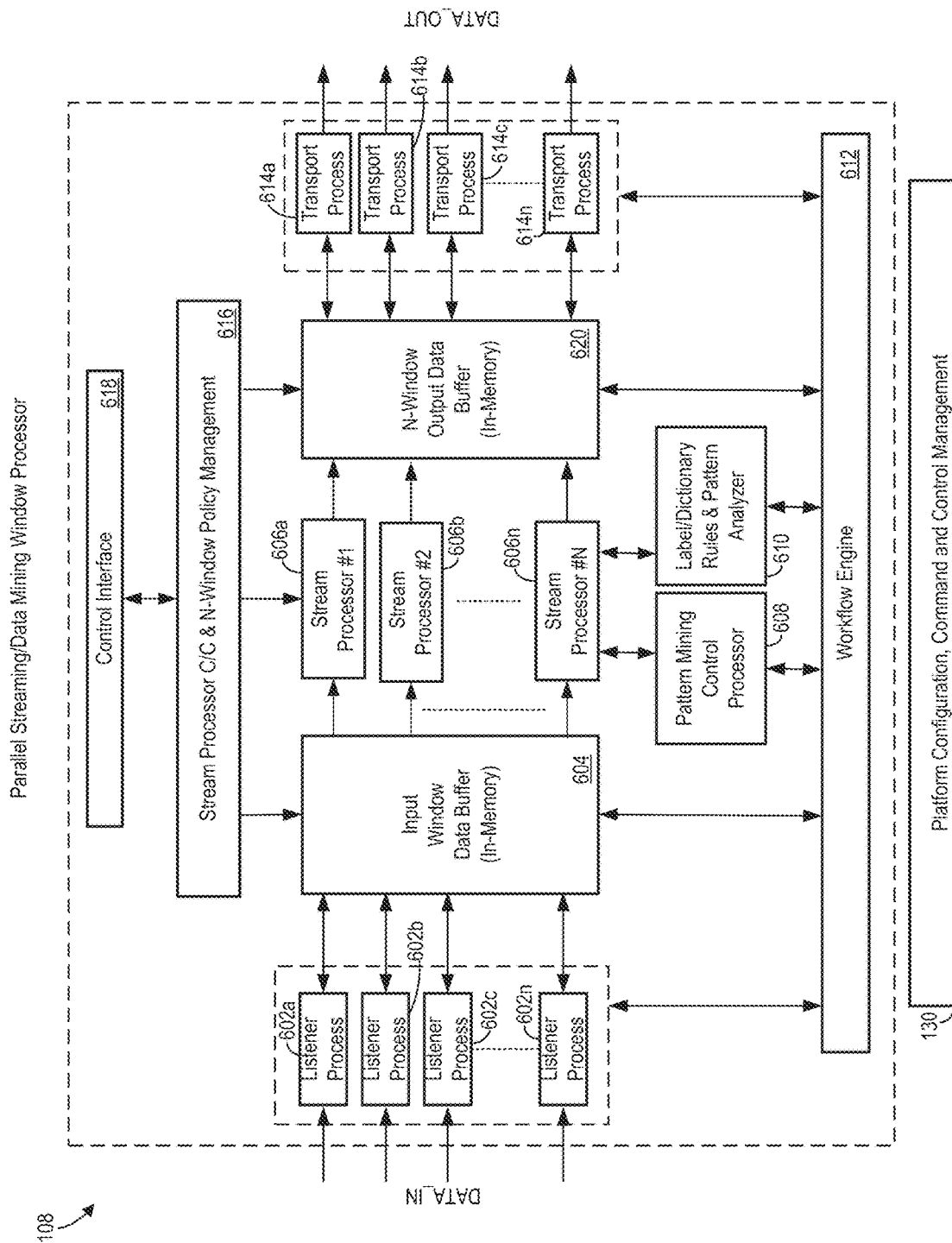
FIG. 6 is a block diagram illustrating the design of a data mining window processor module configured to determine meaningful patterns from received or ingested data.

FIG. 6 shows an example of a data mining module 108. The output of the module 106 includes one or more virtual workflow streams. Each stream includes a unified dataset of relevant data that is extracted and labeled during ingestion by the ingestion module 102, and transformed into a target data-model (e.g., for including in a CPS-G data structure). The data are ready for higher-level processing, which includes adding the transformed data to the data structure (e.g., the CPS-G data structure). The transformed data have a unified form, so that all data received by the module 108 is optimized (e.g., a particular data model) for including in the data structure (e.g., the CPS-G data structure). The data mining module 108 is configured to extract meaningful patterns from the data, which has been transformed to a particular data model. The data mining module 108 is configured to eliminate redundant information or irrelevant information (such as noise). The data mining module 108 is configured to extract only the meaningful patterns within the data for including in the CPS-G data structure. The data mining module 108 is configured to discovering interesting correlations in the data. These functions are higher-level functions that are performed on the transformed data, rather than on the raw data. The module 108 performs these functions on the transformed data because the transformed data has a consistent, error free format, as erroneous data have been removed by the ETL processor module 106, and the data have been transformed from many formats to a unified format by the ETL processor module.

A meaningful pattern is defined in terms of utility and pattern structure. Utility can be characterized using one or more data mining methods including algorithms for frequency itemset mining, high utility itemset mining, and sequence or pattern-based mining. The data mining operation may yield a specific dataset pattern, a subset of datasets matching a pattern, or each of the datasets if the pattern matching criteria is so defined. The objective of streaming data mining-window processor is to find patterns within streaming datasets that match specified criteria based on utility and pattern structure. The portions of those datasets are output to the module 110.

Referring to FIG. 6, the mining module 108 includes one or more independent listener processes 602a, 602b, 602c ... 602n that receive data from the ETL module 106. The processes 602-n can each handle a workflow in parallel. The processes 602a-n send the received data from the ETL module 106 to an in-memory buffer 604 representing at least one window of the virtual workflow.

Stream processors 606a, 606b ... 606n each execute any one of stream mining data mining algorithms previously described. These algorithms are instantiated and configured under the coordination/orchestration of the workflow engine 612 within the stream processors 606a, 606b ... 606n. In other words, the mining algorithms are instantiated to process the data from the ETL module 106 in response to receipt of the data from the ETL module 106. Two control processor functions, including a pattern mining control processor 608 and a label/dictionary rules and pattern analyzer 610, control selection of the pattern mining algorithm for use in processing the data. The pattern mining control processor 608 is responsible for algorithmic operation of the stream processors 606a-n. The label/dictionary rules and pattern analyzer 610 is responsible for instantiating the dictionary of pattern templates to extract the high-utility, meaningful or relevant pattern streams out of the library of patterns that are predefined. The stream processor command and control (C/C) and N-window policy management module 616 is responsible for configuring the input-output window buffers, stream processors, as well as the workflow engine. Like other modules (e.g., module 106), the workflow engine 612, through the control interface 618, manages the runtime processing of the various components within module 108.

As the stream processors 606 complete their mining tasks, high-utility pattern streams are emitted and reassembled into an n-window output data buffer 620. In the buffer 620, the streams are transported by one or more transport processes

614*a*, 614*b*, 614*c* . . . 614*n* for each workflow. Because each streaming workflow may be independent of one another, the transport processes 614*a-n* operate in parallel to maximize the throughput of the overall system. The output of transport processes 614 includes one or more parallel data streams that will undergo transformation into the CPS-G data-structure for further high-performance processing based on the requirements of the particular 3rd party application requesting the processing by the data processing system 100.

In an embodiment, the module 108 receives data from the ETL processor 106, the data having a unified data model and being error free. The module 108, in a set of parallel workflows (in some implementations), performs data mining to extract patterns of interest from the data using algorithms that are selected based on the data model output by the ETL processor 106. The data mining algorithms identify relevant data for including in the CPS-G data structure. The relevant data are sent to the downstream module 110 for including in the CPS-G data structure. The irrelevant data can be discarded.

Figure 7:
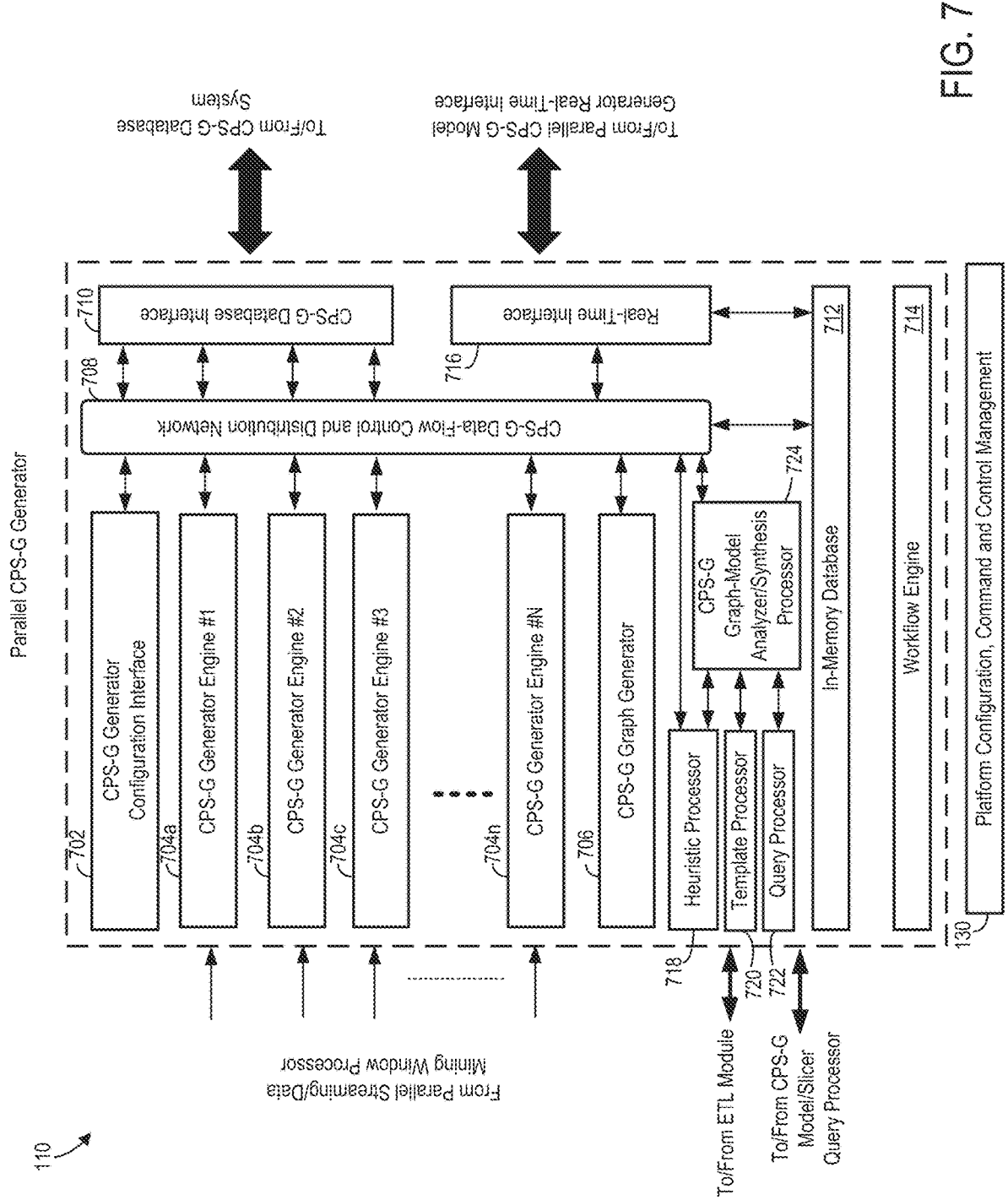
FIG. 7 is a block diagram illustrating the design of a compact pattern stream (CPS) data module configured to transform relevant streaming data into a compressed representation.

FIG. 7 illustrates an internal structure of the parallel CPS-G generator module 110. The CPS-G generator module 110 is configured to create, manipulate, and update one or more CPS-G data structures (e.g., of FIGS. 8A-10) as part of a graph-based database construct. The module 110 generates a data structure (e.g., a CPS-G data structure) for storing the data received from the data sources in a particular way. The way that the data are stored from the data sources enables higher level processing (such as execution of machine learning algorithms) to occur on the data in a manner that is efficient (e.g., relative to data that has not been preprocessed by modules 102, 104, 106, 108, 110, and 112) and comprehensive (e.g., inclusive of data from all data sources).

The module 110 stores the data streaming from the module 108 into the CPS-G in-memory database 712. The CPS-G data structure represents the extracted patterns in of the relevant data of the incoming data streams. The CPS-G data structure stores this data in a compressed format across multiple workflows, such as parallel workflows corresponding to respective data sources (e.g., drones in a swarm). In addition, the CPS-G data structure enables higher-level processing (such as machine learning) on data included in the CPS-G data structure (or other chosen data structure). For the CPS-G data structure, a prefix tree unit (e.g., a data processing primitive) represents a base unit for encoding a single compact pattern stream (CPS) dataset over many windows of received data. In other words, the prefix tree is a primitive CPS element structure that enables many windows of data from the data stream to be represented in a common data structure that is continuously updated as additional data are received. CPS prefix primitives are utilized to build up more complex prefix structures that include Forests of CPS prefix structures as well as complete graphs with one or more CPS prefix structures embedded. In some embodiments of a graph, CPS prefix structures may share common nodes in cases where nodes or sub-graphs are adjacent.

Figure 8A:
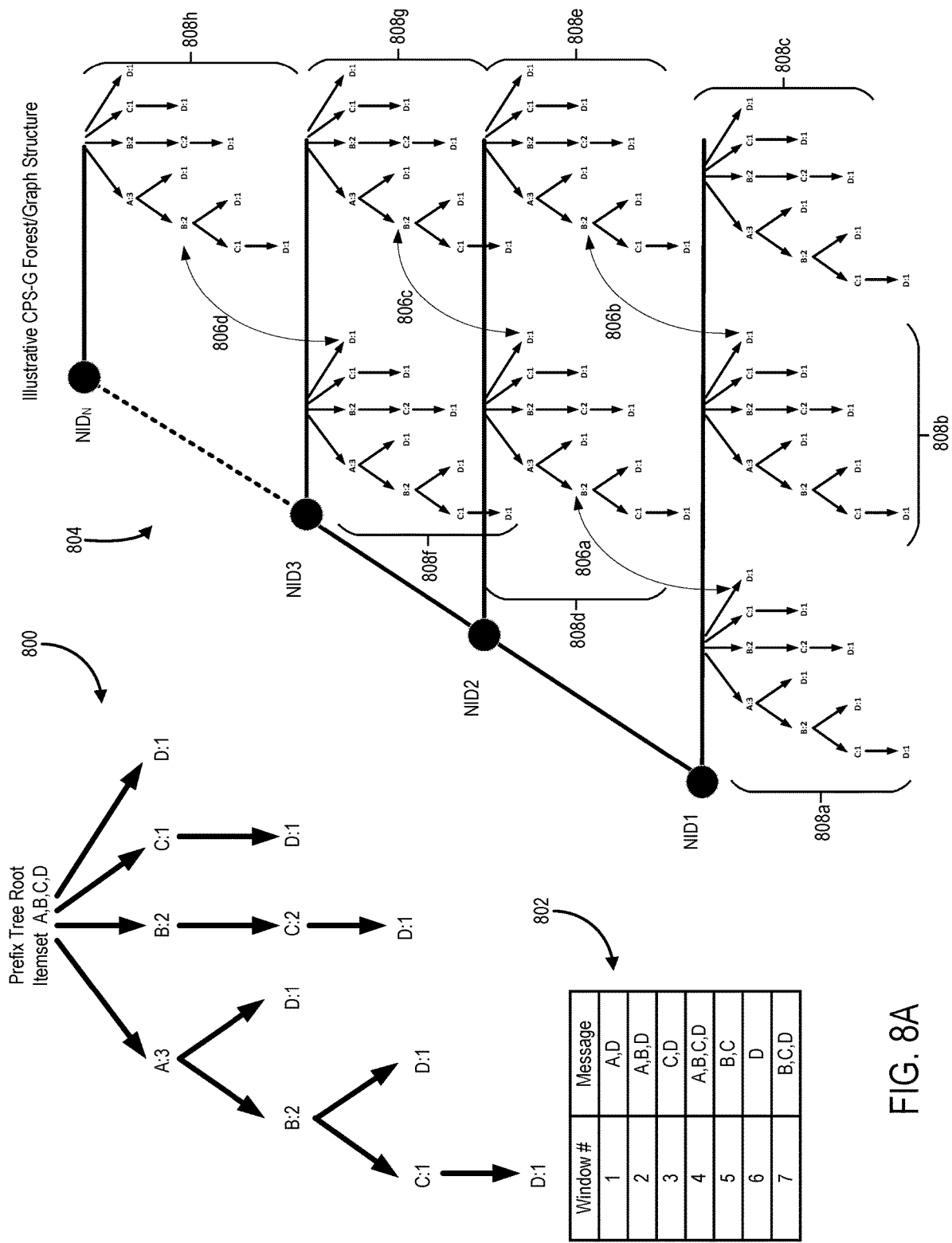
FIG. 8A illustrates a representative CPS graph (CPS-G) prefix tree data structure implementation including a frequent dataset prefix tree and a generalized graph and forest-based, multi-dimensional structure representation.

The module 110 receives data from the data mining module 108 including relevant, error-free data that conforms to a pre-defined data model. The module 110 further transforms this data to prepare the data to add to the CPS-G data structure. The module 110 builds a graph data structure including a prefix trees, as shown in FIG. 8A. The graph structure is a data structure that includes associations between nodes that each represent data elements of the data stream received from the mining module 108. The associations are represented by edges in the graph. The edges connect the nodes. The nodes and edges are arranged into the target graph topology model and one or more CPS prefix graph structures, wherein locations of the nodes within the graph indicate what data element(s) are represented by each respective node. The CPS prefix graph structure is traversable by beginning at a root of the given CPS prefix structure and iterating through each of the nodes based on the edges of the CPS prefix tree structure. Roots of prefix-based graph structures can also be connected by edges to form a forest data structure, a DAG, or any form of complete graph topology structure with one or more embedded CPS prefix structures for a plurality of CPS prefix structures. Each prefix structure represents a unit of the forest, DAG, or graph, and more generally a sub-graph of a complete graph. As each window of data arrives from the data mining module 108, an additional CPS prefix structures (also called a CPS prefix sub-graph) is added or updated in the graph representing the dynamic graph data structure. Generally, an empty data structure is generated (e.g., at module 110) prior to receiving data from the upstream modules (in some cases, prior to data processing). This empty graph structure is subsequently populated by the module 110 as data arrives at the module 110. The graph data structure is efficient to search and extract data from by subsequent modules in the data processing system 100. The graph data structure enables high level processing because the data in the data structure are stored in a predictable way that allows subsequent algorithms (e.g., machine learning algorithms) to be optimized to receive input data into the graph data structure.

The initial graph instance is stored in the database 712 and is populated as data arrives from the module 108. The instantiated graph can be an empty graph structure including a graph template. As data arrives, the module 110 builds CPS prefix structures. Empty nodes are built that represent the data model being streamed in and assigned to a workflow. These are filled with data as additional data elements are received from the data stream (e.g., from module 108). The graph structure is known because of the ETL information provided to it when the workflow is instantiated. The ETL processor module 106 generates an internalized view of what the data structure should look like and which can evolve over time (e.g., dynamic ETL).

Turning briefly to FIG. 8A, a CPS prefix tree structure concept 800 with an example dataset pattern is mapped to the instantiated structure of the CPS prefix tree as the most primitive CPS graph structure type. As each window of message dataset 802 is received, the message is mapped to a path within the tree 800 and to a count of the entity seen thus far. Therefore, each node (e.g., nodes A:3, B:2, C:1, etc.) includes both the data itself (e.g., A for node A:3) and a count (e.g., 3 for node A:3), also referred to as support, of the number of times that data entity occurs. In this method, pattern streams of data (also referred to herein as itemsets) can be efficiently encoded. The actual growth and population of the data structure can be performed using well-known and conventional algorithms, such as a frequency pattern (FP) growth algorithm. While the FP growth algorithm is one approach for processing and maintaining the CPS-G data structure, other algorithms are possible. The FP growth algorithm handles streams of data encoded into a prefix tree; the CPS-G generator module 110 can extend the algorithm to graphs containing Forests, DAGs, and arbitrary graphs containing multi-dimensional data and types (described in relation to FIGS. 9A-9G, below).

The CPS-G generator module 110 is configurable and may dynamically utilize these specific algorithms and any such embodiments for compact pattern stream graph construction within the CPS-G overall graph. The CPS-G generator module 110 is configured to embed the CPS FP growth algorithm into an arbitrary graph construction whose model may be predefined or evolve dynamically to implement arbitrary graph structures realizing a unique CPS-G algorithm. The CPS-G generator model extends CPS encoding methods from processing a strict prefix tree into a complex structure by enriching the CPS-G data structure with additionally entities (such as pointers to other graphs, representing multiple dimensions as in complex data structures like tensors matrices). The CPS-G generator module embeds the enriched data structure (e.g., CPS prefix graph structure) including one or more of a forest of CPS prefix graph structures, DAGs, and a complete arbitrary graph where nodes can be pointers or tensor data structures containing data, pointers or tensor data structures that include graph cycles. A second embodiment of above is the CPS-G algorithm ability to handle the association of CPS-G to one or more streams and workflows. A third embodiment of the CPS-G algorithm implementation includes the parallel implementation of the above, whereas compact pattern stream graph construction is partitioned by workflow or sub-graph level or both. This enables the implementation/processing to be divided among multiple virtual processing and memory systems (e.g., Cloud), or distributed over a network for increased performance and scalability.

Specifically, the CPS-G data-model includes a data-structure realization for real-time stream-based processing and computation. An exemplary generalized graph structure 804, arranged in a forest of graphs or sub-graphs, is developed representing both compact pattern streams and complex data-models associated to the pattern streams across one or more workflows. Each graph node (NID1, NID2, NID3 . . . NIDN) can further implement (encapsulate) a multi-dimensional tensor structure (e.g., structure 10000 of FIG. 10) containing data or pointers 806*a*, 806*b*, 806*c*, or 806*d* to other sub-graphs (e.g., graphs 808*a*, 808*b* . . . 808*h*). For example, each graph node may contain additional metadata related to the data represented by that graph node or shared nodes where two graph nodes share common CPS prefix sub-graph structures. The metadata can be for individual elements or related to a set of data. The metadata includes information such as timestamps, spatial information, sensor data, images, video, media-content, device or application information, third-party data, virtual workflow metadata, pointers to other graph structures including other CPS-G structures, or references to other non-CPS-G data structures that enable those structures to interface into a complete CPS-G graph structure representing the data from the data sources.

The generic CPS-G graph 804 includes each of the graph nodes NID1-NID$_N$ as identifiers for device identifiers and in this example represented as a Forrest graph structure. Each sub-graph 808*a-h* is made up of one or more CPS prefix structures, some of which have node pointers 806*a-d* to other sub-graph structures to facilitate efficient graph traversal. This embodiment enables the support of high-performance search and computation across selected sub-graph node entities without having to process, traverse, or search through unrelated node entities. A second embodiment leverages the CPS-G data-model for efficient data analysis, analytics, and machine learning applications (described in further detail in relation to FIGS. 9A-9D, below). A third embodiment leverages CPS-G data-model for coordination, orchestration, and command/control of networks of devices and applications (described in further detail in relation to FIGS. 9E-9G, below). These embodiments are described in relation to FIGS. 9A-9G, below.

Returning to FIG. 7, a CPS-G prefix tree node (e.g., node NID1) is initially created by the CPS-G forest/graph generator 706, with additional node creations instantiated forming a forest data-structure. The CPS-G forest/graph generator 706 provides scheduling, operating, and coordination to the one or more CPS-G generator workflow processes 704. Actual construction of each CPS-G tree occurs during execution of the FP growth algorithm (or a variant of it) for CPS-G based data-model for each dataset event window consumed by one or more CPS-G generator engines 704*a-n*. Each CPS-G generator engine 704*a*, 704*b*, 704*c* . . . 704*n* receives its assigned input window streaming datasets associated to a workflow, constructing the corresponding CPS-G tree sub-graph structures that are linked in the CPS-G forest data structure 804. The subgraphs (e.g., prefix trees) can be generated in parallel. Each sub-graph (including associated multi-dimensional data structures or tensor data models) is configured for storing both metadata and pointers to other graph nodes. In an example, for N different workflows and M different CPS tree root node sub-graph identifiers, there will be no less than N*M CPS-G tree root nodes that are collectively grouped within the forest data-structure 804. The CPS-G forest/graph generator 706 generates the initial graph structure for one or more CPS-G tree sub-graph nodes and associated linkage among graph nodes making up the total CPS-G graph data-model. The CPS-G forest/graph generator 706 defines the overall graph template data-model and its configuration, handing of worker tasks to the CPS-generator engines 704, whereas each CPS-Generator engine 704*a-n* builds individual CPS-G prefix trees and any associated additional sub-graphs as datasets are streamed into the CPS-G generator module 110.

In an aspect, the CPS-G graph data model is defined in a combination of ways. The CPS-G model generator 110 receives metadata annotations/labels, as previously described, from the ETL module 106 and a CPS-G model query processor. The CPS-G generator module 110 includes several sub-modules configured to process this data for generation of the CPS-G sub-graph for each workflow in parallel. A heuristic processor 718 is configured to analyze pattern data and annotations provided by the ETL module 106 and/or the data mining processor module 108.

The analysis indicate which data are to be represented by each node of the sub-graphs. The CPS-G prefix structure grows or evolves in accordance with incoming data-streams as previously described in relation to FIG. 8A. For the complete graph itself, there are two processes executed by the heuristic processor 718 and the template processor 720, respectively. The template processor 720 uses a pre-defined by input into the model generator, with the model representing the node/edge relationships. The heuristic processor 718 uses a generative process where the graph evolves dynamically starting from an initial state and grows over time. Data to cause this process is received from the streaming datasets or the initial model definition (for processors 720 and 722). There are methods for this learning process including predictive methods where the graph evolves based on one or more neural network learning processes divided into three types: Variational Autoencoders (VAEs), Generative Adversarial Networks (GANs), and Deep Auto-regressive Models.

A template processor 720 is configured to process graph definitions that include templates for the graph generation. The template processor arranges the nodes of the graph based on the template. For a CPS-G data structure, the graph is arranged based on the model for the graph inclusive CPS prefix graph structures, as previously described. The query processor 722 is configured to process query data (e.g., from a client) to cause the GPS-G model generator to output a sub-graph that satisfies that query. This process occurs for scenarios in which the data structure or graph is being output to a client 122 directly, rather than being processed further (e.g., by modules 112, 114, and 116). The request specifies a particular device identifier, timestamp, time period, workflow identifier, and so forth to request particular data of the data structure. The module 110 outputs at least a portion of the data structure to satisfy the query. The query definition itself may include any combination of entities defined or created through the modules and workflows described, with each query defined through a standard grammar and syntax defining either graph traversals or pattern matching methods to return graph entities of interest. Supported formats include the Graph Query Language as well as other implementations including initiatives such as Gremlin and the Cypher Query Language.

The GPS-G model analyzer 724 is configured to receive the results data from each of the heuristic processor 718, the template processor 720 and/or the query processor and, if needed, combine the results data indicative of requirements for the GPS-G data model into a single valid model definition. This combined definition is then passed to the CPS-G data-flow control network 708 for use by generator engines 704. In an example, the CPS-G graph data model is generated from a direct template. An application or domain controller specifies the topology in conjunction with the ETL module 106 metadata (node labels, node properties, etc.). Alternatively, or in combination, the definitions are received from dynamic queries which induce the relationships required (e.g., processed by query processor 722 as previously described). In another example, the definitions are inferred or learned from data-streams themselves (e.g., by heuristic processor 718) in conjunction with the ingestion, ETL labeling, and query inputs.

Interconnection among CPS-G generators 704*a-n*, CPS-G forest/graph generator 706, and external interfaces 702, 710, and 716 is accomplished through a meshed inter-process communications (IPC) network 708 in hardware (multi-core, server processors, or within integrated circuit, system-on-chip (SoC) realizations, software, or standard high-speed network based wired and wireless methods. Access to CPS-G datasets are available through the two input/output interfaces 710, 716 for access in either streamed real-time output, or from persistent storage or CPS-G database 712. Orchestration of the CPS-G components is managed by the module workflow engine 714. The workflow engine 714 manages the configuration and runtime execution of components including managing the storage processing of persisting the in-memory database 712 structures to persistent CPS-G database storage. In this way, datasets for long term time periods are available in addition to the in-memory data. An embodiment of the data processing system 100 enables the CPS-G database implementation in several platform methods including relational, object based, NoSQL, and optimally given the CPS-G data-model, by a graph database platform. The CPS-G generator engines 704, CPS-G forest/graph generator 706, and workflow engine 714 can be implemented on individual processor blades, multi-core processors, virtual machines, or a combination of each.

Figure 8B:
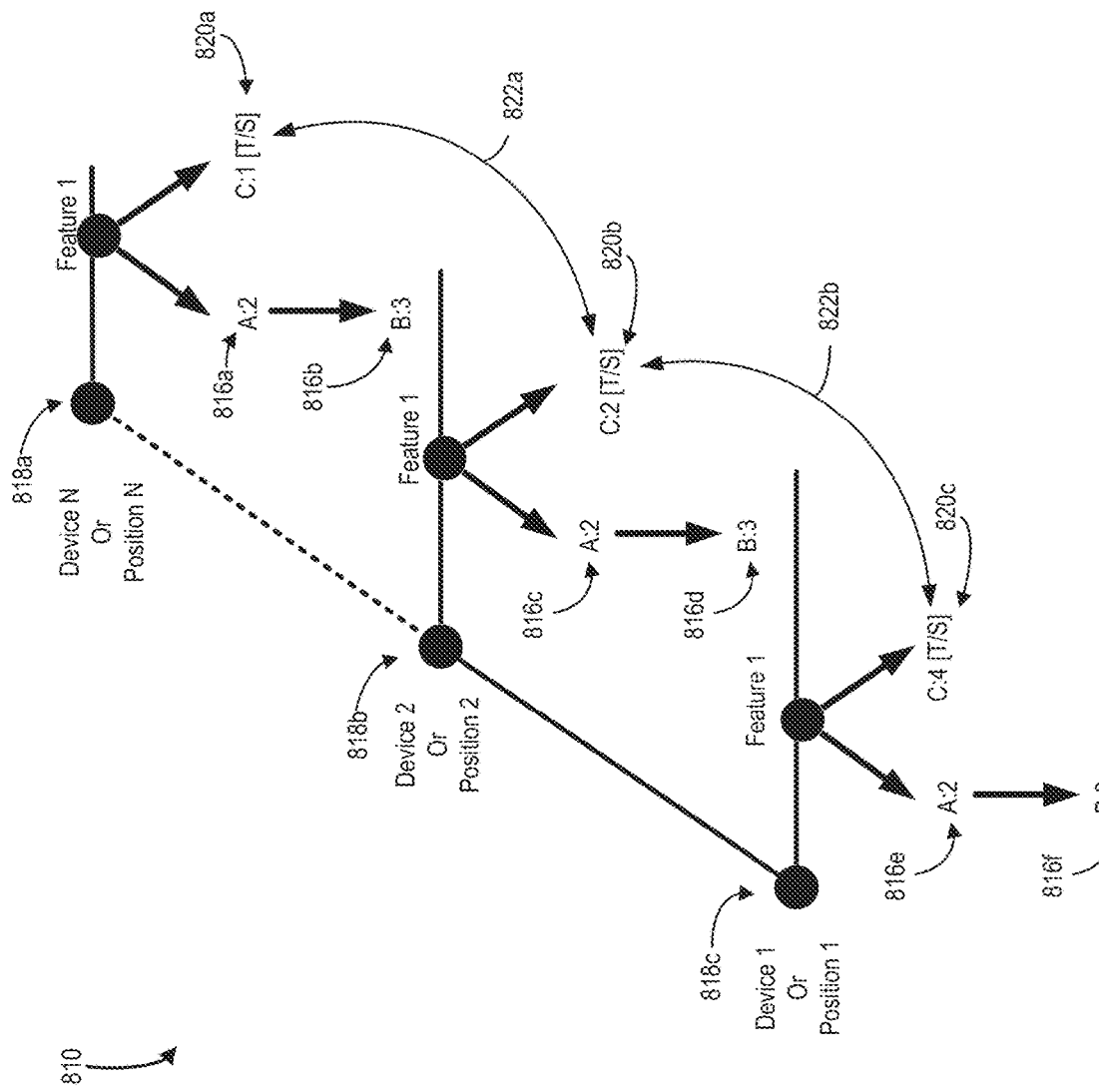
FIG. 8B illustrates a representative CPS-G structure.

FIG. 8B illustrates a generated CPS-G data structure 810 including a forest of simple trees. For the data structure 810, each root node 818*a-c* of the forest represents a device or positional identifier, and three relevant pattern streams and a pattern timestamps are encoded and stored in the graph structure by pattern entities representing some feature of interest (feature 1), the individual data elements (A, B, C, timestamp), stream patterns (A, AB, C), and frequency or occurrences (2, 2, 3). Examples of devices (or positional identifiers) include identifiers for each of the data sources, including sensors, autonomous vehicles, computing devices, and so forth of the data sources. Examples of features include identified patterns in the data stream, outlier data, data having particular values, data having particular data types, and so forth as identified by the mining processor module 108. The features are defined by the data elements 816*a-f* included in the prefix trees for those features. For example, a pattern A:2-B:3 can define feature 1. The data elements include items of data in the data stream, as previously described, including packet payloads, sensor values, time stamps, and so forth. A stream pattern includes an identity of data elements, the order of those elements, and the frequency of the occurrence of the elements. Frequency or occurrence refers to how often a data element is present in a data stream for a given time period (e.g., a window generated by the sampling module 104). The data structure 810 thus shows a representation of the data in the data stream over time.

Each timestamp node 820*a-c* is a 2-dimensional tensor or array including timestamp data (e.g., [T/S]) and pointers 822*a-b* to other graph nodes that are related by the data element (in this case, element C). A workflow might include a processing step whose goal is to compute the data for nodes or their locations within a given timestamp range. The data structure 810 enables an application to determine how many devices were active (N devices) and what their state of operation is at a given time (e.g., for node 820*a*) or range of times, represented by nodes 820*a-c*.

The parallel real-time CPS-G data model updater module 112 updates the CPS-G data structure as more data are received, and can generate the CPS-G data model that summarizing the data structure 810. Data input to this module 112 include instances of data structure 810 or portions of the data structure, either directly from CPS-G generator module 110 in-memory database or the persistent CPS-G database 124. A sub-graph is generated that represents the data structure (or portions of the data structure) based on a model definition. The model definition indicates which aspects of the data structure are important for further analysis, and can include a specification of particular features, patterns, time periods, and so forth.

Figure 8C:
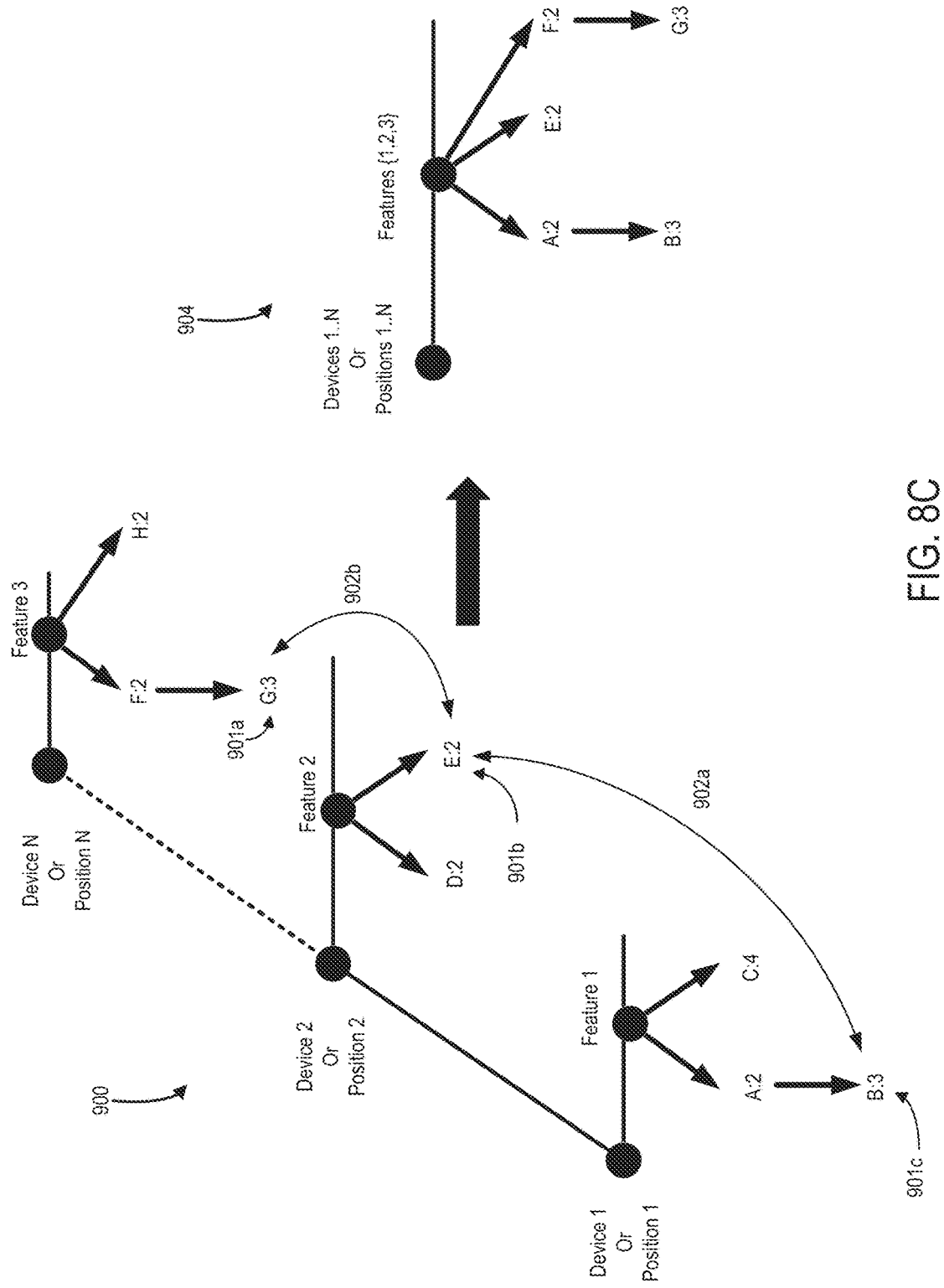
FIG. 8C illustrates a representative CPS-G including a forest of either device or spatial CPS tree structures representing different feature pattern datasets and a generated CPS-G model view.
Figure 8D:
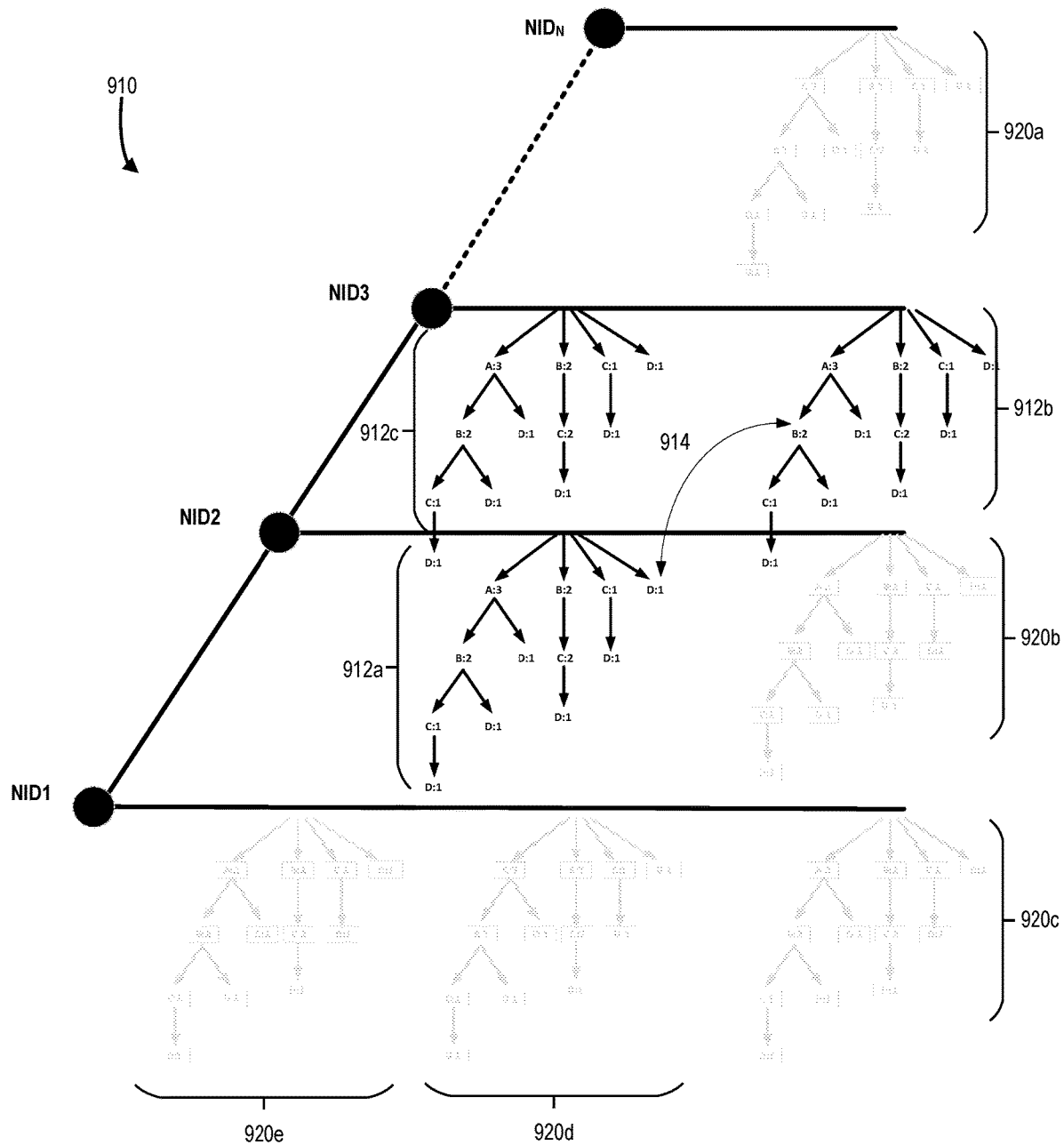
FIG. 8D illustrates an example of two CPS-G model sub-graphs whereby one or more clients specify the data-model view of interest resulting in two sub-graphs (forest of trees) of the CPG-G defined by the highlighted prefix tree areas.

FIGS. 8C and 8D provide two illustrative examples of the output of the updater module 112. The examples of FIGS. 8C and 8D are provided based on the graph query languages (GQLs) previously described. A GQL enables one to specify a pattern or entity of interest, and the platform engine goes off to return the nodes or sub-graphs (slices) that match the query. FIG. 8C illustrates a CPS-G graph 900 with N devices and/or positional descriptions, including pattern stream encodings corresponding to three different features (features 1, 2, and 3) and associated pattern datasets for each feature. Feature 1 includes patterns A, AB, C. This indicates that feature 1 includes data elements A, B, and C. Here, it shows that element B is dependent on element A, but that elements A and C are independent of other data elements. Feature 2 includes patterns D, E. Here, feature 2 includes each of elements D and E, but both elements D and E are independent of other elements. Feature 3 includes patterns F, FG, H. Here, feature 3 includes data elements F, G, and H. Element G is dependent on element F, and elements F and H are independent of other elements in the data stream. Tail nodes 901a-c including elements B, E, and G include a tensor structure containing pointers 902a, 902b to each of the nodes implementing a spatially defined prefix tree across nodes 901a-c. Additional meta-data information are encoded in those nodes, such as timestamp data. The pointers indicate a relationship between the nodes that are linked by the pointers. For example, they may be related to an instance of a sensor of for each device (e.g., a GPS sensor for autonomous devices). The nodes can represent a particular data value of interest for an application. The nodes can each represent a data element received at a particular time (e.g., a last data element for each window). Other relationships are possible.

A sub-graph 904 is formed by the module 112 based on a client template or rule set, or based on other configurable logic. In some implementations, no sub-graph is generated. In some implementations, each CPS prefix tree is a sub-graph. In some implementations, a rule set defines a sub-graph such that it includes only elements from features 1, 2 and 3; entities A, B, E, F, and G; and a summary of patterns A, E, F, AB, and FG. The sub-graph can be any configuration desired for later use in machine learning models, generations of visualizations, or other applications. Once the graph 900 is generated, the sub-graph 904 is generated based on a utility of particular data or other processing goal of the data processing system 100. In some implementations, the sub-graph is generated based on a query of the client 122, as previously described. For example, a client may request all data in the data structure related to a particular device or including a particular feature (e.g., a specific pattern). The module 112 generates a sub-graph including the desired data. The sub-graph is generated by the module 112, shown in greater detail in relation to FIG. 11.

The represented CPS-G model slice 904 is associated with at least one workflow. The workflow can define the sub-graph 904 structure of contents. The sub-graphs are generated periodically as the data structure (e.g., data structure 900) is continuously updated. Sub-graphs are generated for downstream processing (e.g., by modules 114, 116), but also in response to client 122 queries. The sub-graphs are generated so that only data needed for those specific use-case are processed. Because the sub-graphs are generated as needed, they represent the data as it currently is in the data processing system 100, enabling high performance visualization of selected datasets.

FIG. 8D illustrates a CPS-G model sub-graph 910 example. In this example, three CPS-G subgraphs 912a, 912b, and 912c corresponding to some set of features across two selected device identifiers (NID2 and NID3) are selected by the updater module 112 (e.g., based on a client query) and represent the effective CPS-G subgraph for further processing. The module 112 can identify the features for further processing based on requirements defined by a 3$^{rd}$ party application. Given the specification of the CPS-G model sub-graph 910, the graph nodes and access to their respective datasets that are not required are automatically not included in the CPS-G model generated, as shown by sub-graphs 920a-e. When the computation or processing module (parallel streaming compute engine 114) accesses the datasets defined by the CPG-G model sub-graph including a specified feature, only references to model specified datasets (e.g., in subgraphs 912a-c) are returned because they include that feature.

Figure 9A:
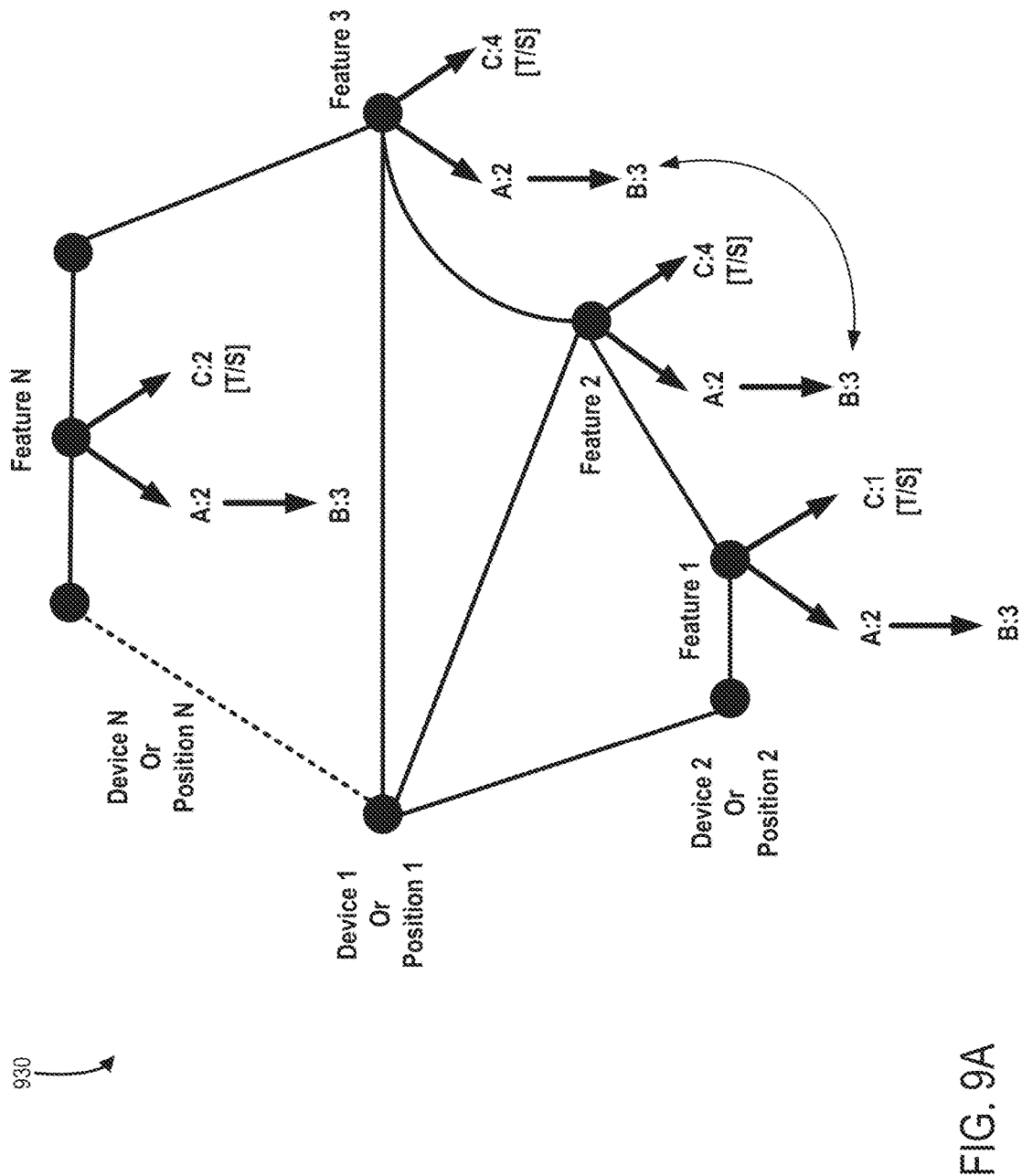

FIG. 9A shows an example graph 930 which is a CPS-G in a non-Forest structure. This is a more general graph structure than a Forest graph structure previously discussed, and models both entities and relationships between each entity. Examples include networks, social networks, chemical, molecular, biological structures with corresponding dynamic interactions, visual reasoning, as well as other dynamic systems and structures that may evolve. The general graph includes nodes/vertices and edges that are either directed or undirected. The topology of the graph 930 may exist with or without cycles and represents most any model or set of interactions. For example, in graph 930, relationships among features 1, 2, 3 . . . N are shown, as well as the relationships among those features and devices 1, 2, . . . N. Graph 930 is built by the GPS-G model generator in a manner similar to that described in relation to FIGS. 8A-8D, but the topology is more general than that described in relation to FIGS. 8A-8D.

Figure 9D:
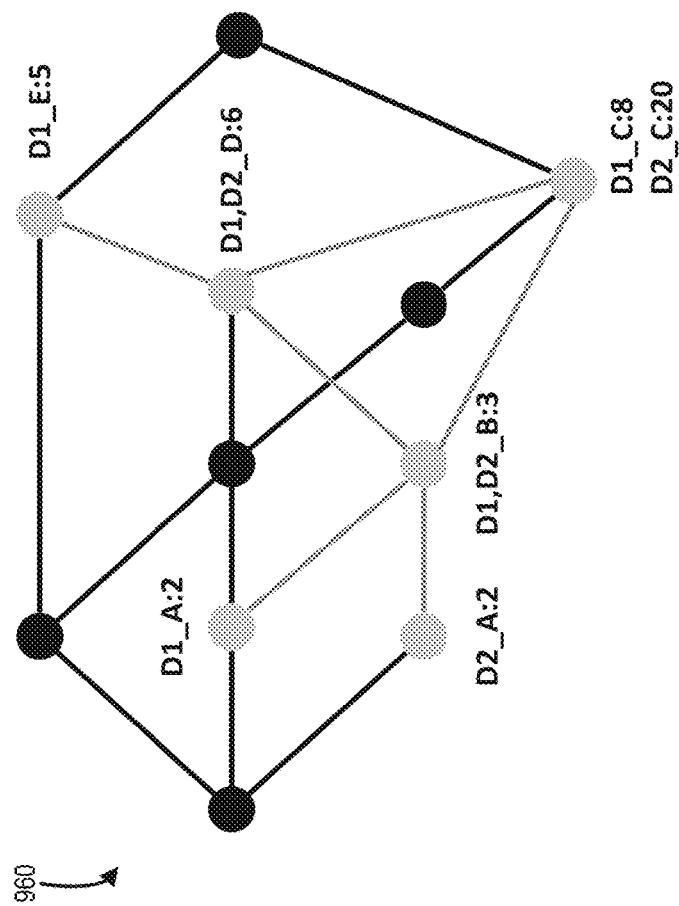

FIGS. 9B, 9C, and 9D each illustrate an example graph 940, 950, and 960, respectively, representing a process for embedding of a prefix sub-graph within the complete graph. FIG. 9B shows a structure as an embedding of the CPS sub-graph tree 942 within 3 non-adjacent nodes 944a, 944b, 944c, each with a set of feature entities, of the general graph structure. FIG. 9C illustrates a graph 950 including instances 954a, 954b of an embedded CPS sub-graph 952. Two CPS sub-graphs 952a, 952b are adjacent and contain a common CPS set of entities (shown with different values). This situation is indicated by the two nodes 952a, 952b sharing a 952cline 952c connecting each node to one another.

Both the feature N node 952a and feature M node 952b share a common prefix tree entity B, shown inside the dashed circle. However, two or more adjacent feature nodes may share a sub-graph of arbitrary complexity in terms of CPS topology structure. In this example, the implementation comprises the instantiation of a virtual sub-graph or one entity (B:X) representing the sub-graph CPS prefix structure shown, containing a data structure pointed to by feature N and M graph nodes, each with a graph pointer to the data structure comprising the B:X entity. The values are the same in this example, and therefore a single entity variable suffices. In cases where the CPS graph nodes share common prefix structures, but with differing values, the data structure comprises a vector data structure (one for each shared entity). In the case of multiple variables and/or values in multiple dimensions, the implementation of the virtual sub-graph comprises a tensor data structure.

FIG. 9D illustrates a graph 960 including two embedded sub-graphs (shaded light and dark) making up the complete graph 960, where the prefix sub-graph nodes define the graph model. In the graphs 940 and 950, a CPS prefix structure was attached to each graph node. In graph 960, the CPS structure composes the complete graph, along with other graph nodes.

In applications where the CPS-G is implementing one or more Graph Neural Networks (GNN), the embodiment of both CPS-G topologies and implementation of shared entities using virtual sub-graphs improves the performance (reduced training time and ML execution time) of training and executing machine learning operations (such as classification or prediction) against the GNN. The performance gain is attributable to the concurrent use of compression (CPS summarization) and sharing of data (Virtual sub-graphs) within the CPS-G virtual sub-graphs, whereby computations (where CPS encoded, or summarized graph data represents pre-computed results) may be executed local to the virtual sub-graph node data structures without the need to perform one or more graph traversal operations.

Figure 9E:
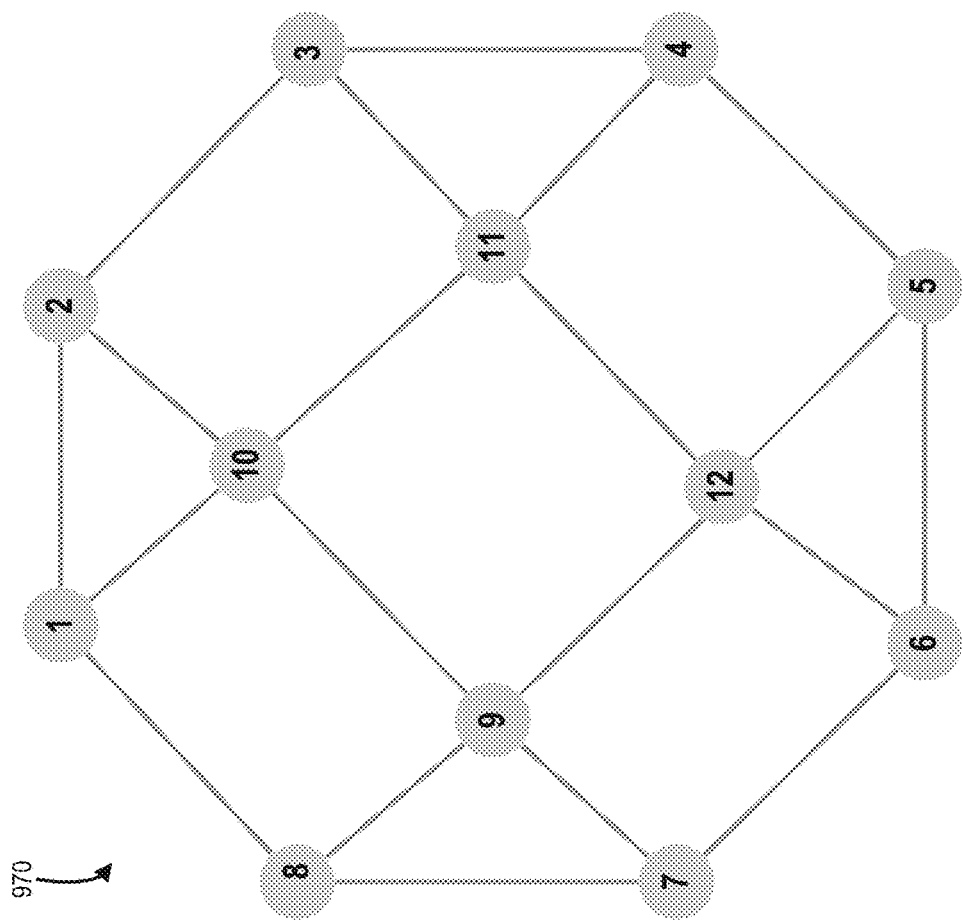

FIG. 9E shows an example graph 970 illustrating a general graph structure in which all nodes 1-12 are part of at least one CPS prefix sub-graph. In this example, many possible CPS sub-graphs are embeddable within the complete CPS-G, including overlapping and non-overlapping spanning trees starting from any of the 12 node positions in the topology. Examples include 1-2-3-4; 1-10-11-4; 1-8-7-9-12; 2-10-11-3; 6-12-9-8; and so forth. There are $N^{N-2}$ or $12^{10}$ possible CPS sub-graphs within the graph shown.

Figure 9F:
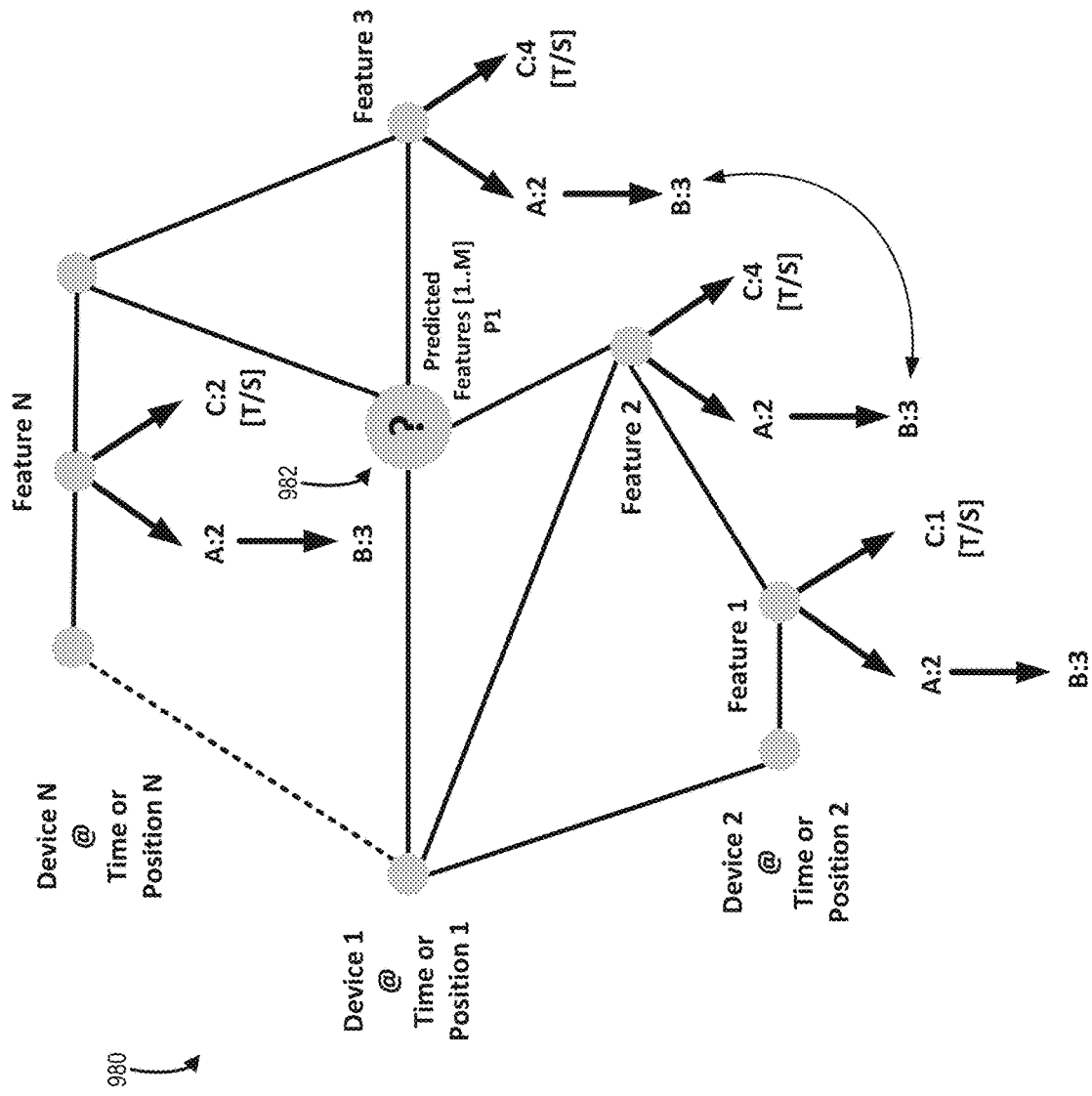

FIG. 9F shows an example CPS-G model graph 980 representing a network of devices whose characteristics or behaviors change in time and/or position. The CPS-G implements a GNN with a learning goal to predict node P1 Feature vector [1 . . . M]. One or more GNN learning algorithms may operate (executing within the parallel compute engine) across the CPS-G data model datasets to compute the P1[1 . . . M] predicted values, represented as node 982.

Graph 980 depicts a ML use-case of leveraging the CPS-G in the implementation of a Graph Neural Network. (GNN). To illustrate these embodiments, and as a further embodiment whereby the CPS-G and platform herein implements data analysis and analytics from streaming data (suitably ingested, transformed and pattern mined), as well as supporting the coordination and orchestrate (control the location movement of each device) of autonomous or semi-autonomous network of devices. An example of this process is described in relation to FIG. 9G.

Figure 9G:
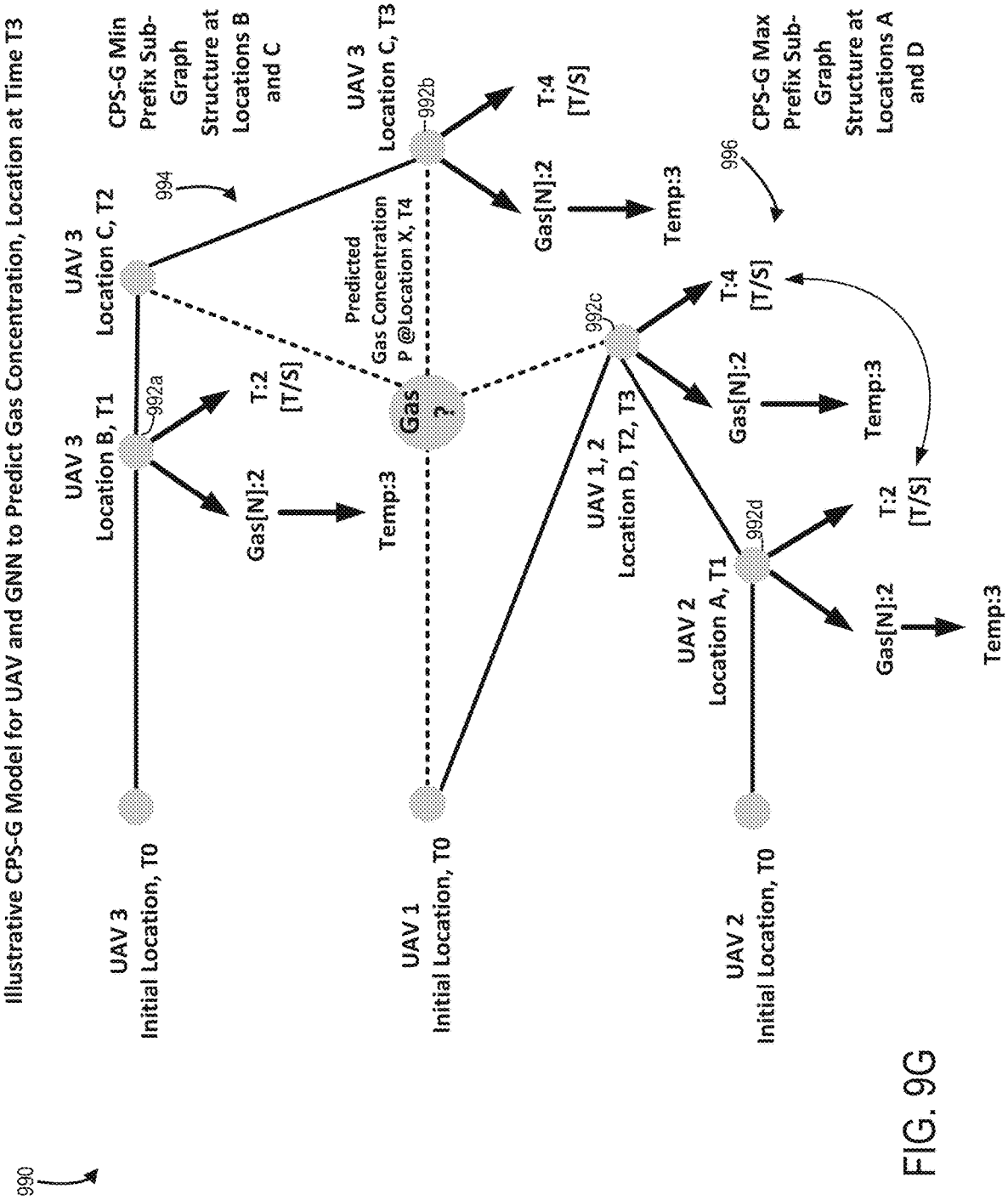

FIG. 9G shows an example graph 990 illustrating a ML use-case of leveraging the CPS-G in the implementation of a Graph Neural Network (GNN), as previously described. FIG. 9G illustrates a representative example where a CPS-G graph models the movement of three UAV devices (labeled UAV 1, UAV 2, and UAV 3) in a geographical region with some arbitrary initial location, with each UAV measuring gas concentration levels and ambient temperature. A GNN is implemented as part of the CPS-G graph to drive the UAV trajectories and to utilize the collective intelligence learned from the CPS-G graph model and measurements to predict an unknown gas concentration, time and location shown in the CPS-G node P in the middle of the figure. Measurements of data are sampled by each device a configurable number of times per second. Referring to the graph illustration, nodes 992*a*, 992*b*, 992*c*, and 992*d* encode a prefix structure containing the current location, multiple gas and temperature measurements, and time stamps of each measurement-set for the given location. The edges connecting the graph nodes 992*a*, 992*b*, 992*c*, and 992*d* encode the temporal/spatial changes in coordinates and time from location to location, illustrated in FIG. 9G as location A, B, C, D and the initial location across time-events T0, T1, T2, T3 and T4. The graph 994 in FIG. 9G illustrates a Min Prefix sub-graph structure associated to UAV3, whereas UAV 1 and UAV 2 share a common set 996 of CPS data structures (since the nodes are adjacent to one another) and therefore have common prefix structure minimizing required graph traversal operations. The graph 990 evolves from an initial T0 state to a final state at time T4. During each time event, each of the UAV devices move to a different location, A, B, C, and D measuring both gases and temperature. The prefix structures associated with nodes 992*a*, 992*b*, 992*c*, and 992*d* are updated accordingly and the GNN is updated to reflect changing values within each of the min-or-max prefix sub-graph structures 994, 996. The results of the GNN update operations provide: 1) CPS-G UAV node level predictions that are used to drive real-time information to a UAV domain controller which instructs the UAV devices to move from location-to-location as illustrated, and 2) CPS-G graph level prediction of the gas concentration maxima, location and at T4 of a virtual node (node P) based on the GNN convergence and SWARM or collective convergence of the UAV devices as they explore the geographic region.

It should be appreciated that the UAV network provided is one example, and that other such examples are possible, including semi-autonomous or autonomous devices, networks of devices, IoT, sensor devices, wearable devices, and other systems including software processes and human interaction (as in content exploration and discovery, recommendations, intelligent ad targeted). Further examples include, hardware and software systems for chemical and drug discovery, environmental sensors, medical devices, portable NMR, networks thereof, can be geographically dispersed with measurements and data generated to detect, measure, analyze in a manner similar to the methods described whereby a CPS-G graph model represents the state and dynamic behavior and one or more CPS sub-graph structures as well as GNN structures are embedded within the CPS-G and computations and operations may be performed against the CPS-G to perform data analysis and analytics, coordination, orchestration, and command/control of networks of devices and applications.

Figure 10:
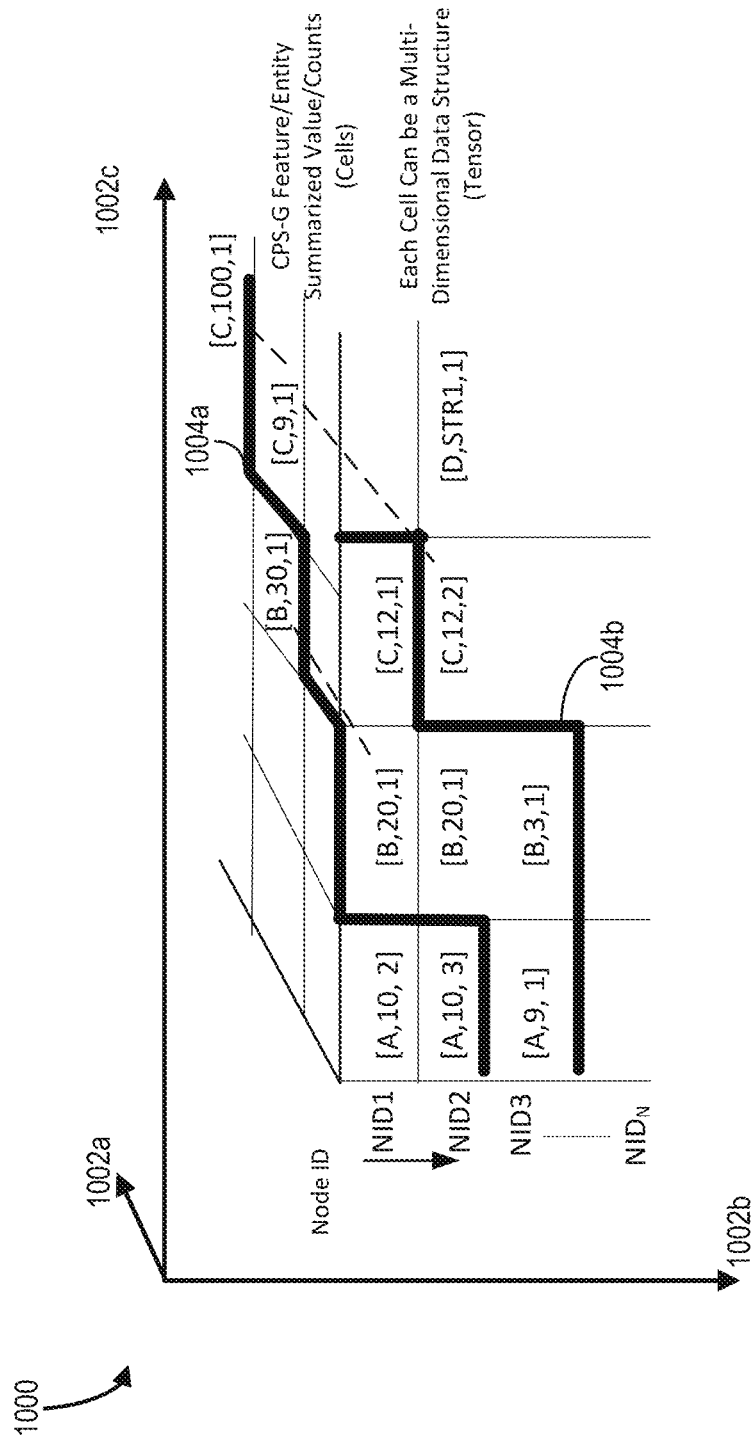
FIG. 10 illustrates an example of two CPS-G model sub-graphs including specific prefix trees within a specified selection of CPS-G nodes, represented in tensor multi-dimensional array form.

FIG. 10 illustrates a multi-dimensional grid or tensor view 1000 of two CPS-G model sub-graph nodes. In this example, the generative model can be visualized as specification of graph nodes (e.g., nodes NID1, NID2, NID3 . . . NID$_N$) that belong to a model set through two sets of sub-graph definitions that traverse in three-dimensional space (e.g., dimensions 1002*a*, 1002*b*, and 1002*c*) of an N-order tensor structure. This is the basis of the naming convention CPS-G model sub-graph. The graph nodes are arranged in a first dimension 1002*b*. Each CPS-G entity (similar to nodes of the GPS-G prefix tree) are arranged in a second dimension 1002*a* and a third dimension 1002*c*. Each cell of the grid is thus a multi-dimensional tensor structure including values that are used to populate that cell (similar to populating the prefix tree as previously described). A sub-graph of the CPS-G dataset can be one of the multi-dimensional tensors, and shown by the bolded lines 1004*a-b* in FIG. 10. Pointers can exist between values, such as a pointer linking [B,20,1] to [B,30,1] and a pointer linking [C,12,2] to [C,9,1] to [[C,100,1], denoted by dotted lines.

Figure 11:
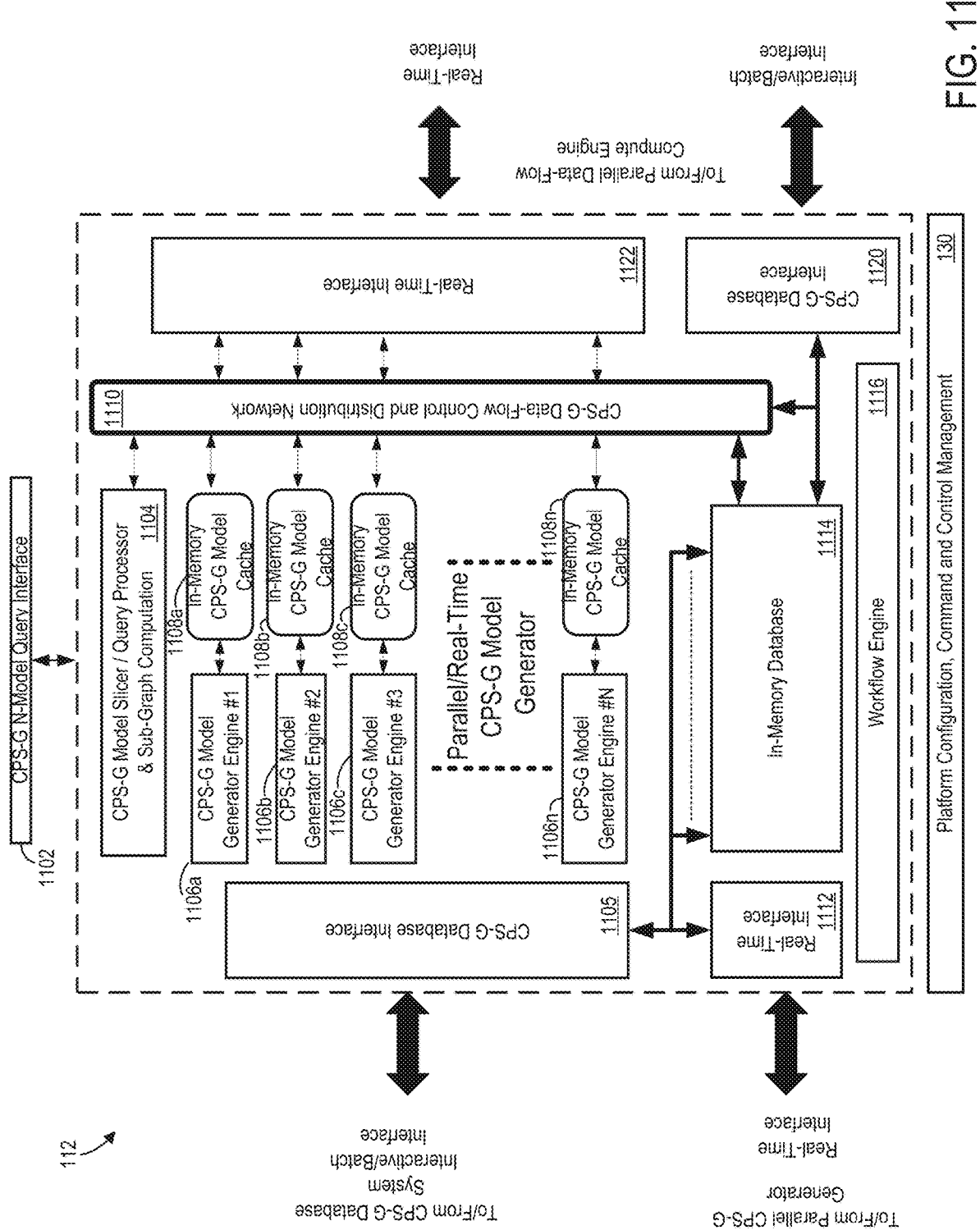
FIG. 11 is a block diagram illustrating the design of a (CPS-G) model generation module configured to construct a client specified data-model view for performance optimized processing and access across one or more, temporal, spatial, or other user defined dimensions embodied within the CPS-G data-model.

FIG. 11 shows a design of the parallel real-time CPS-G data model updater module 112. CPS-G datasets are available through both real-time streaming (e.g., from the parallel CPS-G generator module 110) or accessible from persistent storage, CPS-G database 124 as previously described. Module 112 includes a streaming architecture like previously described modules 102, 104, 106, 108, 110, including a CPS-G database interface 1105 to access data from memory or persistent storage, a real-time interface 1112 for receiving a stream, and a CPS-G data-flow control and distribution network 1110 to manage dataflows in the module 112. Outputs can be stored through CPS-G database interface 1120 or streamed directly to downstream modules through the real-time interface 1122.

In embodiments, when sub-graphs of the GPS-G model are generated, an analytics engine can generate visualizations of portions of the graph or particular workflows. This can allow a user to look at slices or sub-graphs, and enable a highly performant client application analyzing or visualizing portions of the graph. For example, the client can send the model generator a query, and the model generator can retrieve the required sub-graph and generate a cached view.

Client applications or domain controllers submit through the CPS-G n-model sub-graph interface 1102 (also called an n-model slicer) model definitions based on entities and programmatic constructs which define and generate the effective CPS-G model sub-graph. The CPS-G model sub-graph 1104 then assigns one or more CPS-G Model generator engines 1106*a-n* to construct the generative CPS-G model sub-graph and store the generated model and datasets in respective in-memory CPS-G model cache 1108*a-n* for distribution to either real-time or persistent storage. A configurable workflow engine 1116 manages the runtime and lifecycle activities of each of the module components. The generated CPS-G data models can be further processed for a range of low-latency, high-performance domain specific application use-cases, particularly those requiring real-time visualization of data, or low-latency, responsive command and control, orchestration and coordination use-cases.

Figure 12A:
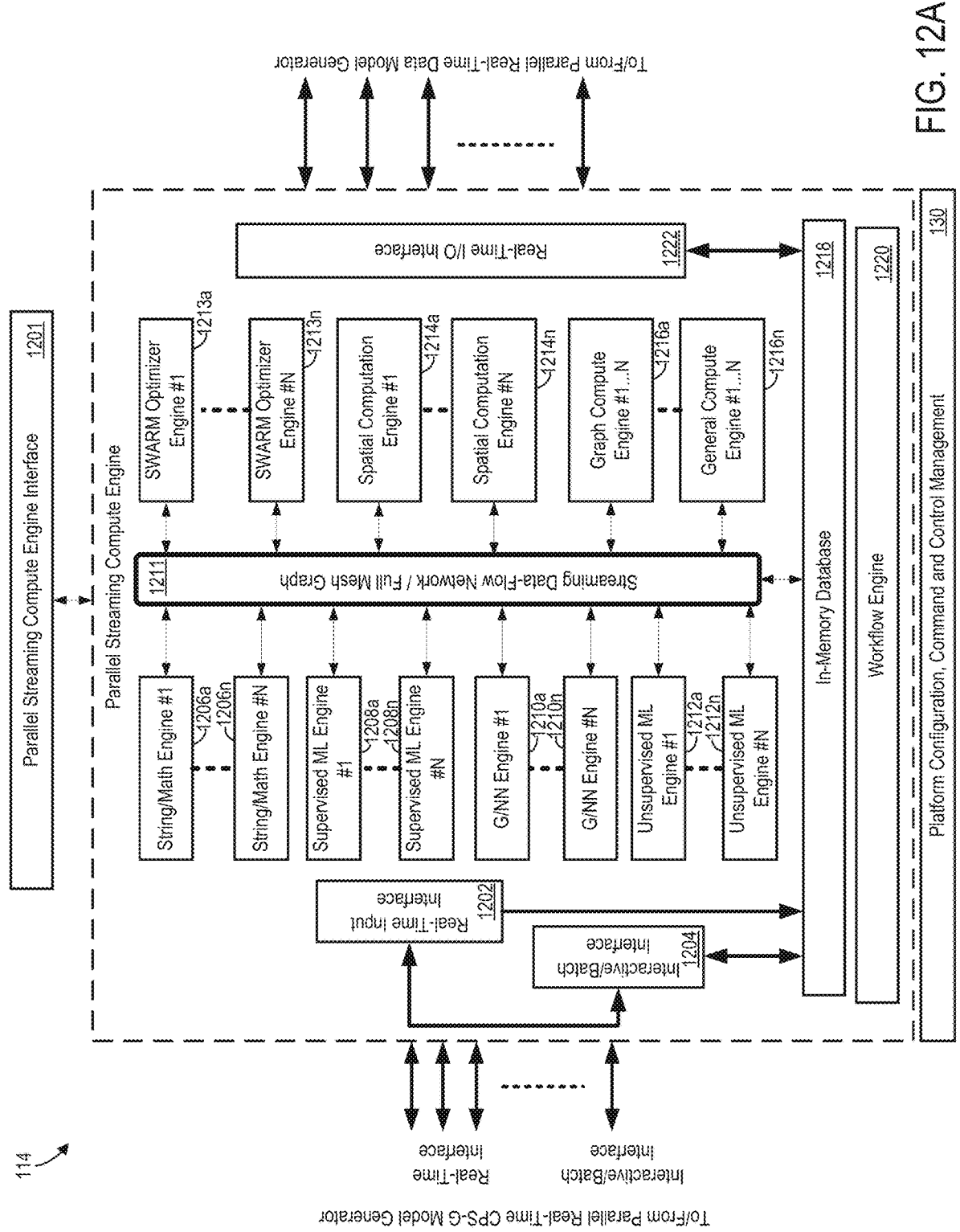
FIG. 12A is a block diagram illustrating the design of a parallel streaming compute engine network of processing systems configured to execute one or more algorithms using modules utilizing the compact pattern stream graph data-model as input and generation of computed or processed result as output.

FIG. 12A shows an example of the parallel streaming compute engine 114, configured for processing and computation on CPS-G datasets. The compute engine 114 is based on the dataflow, streaming computational model. Generally, datasets (e.g., CPS-G structures) are injected into the compute engine through one of two input interfaces. The first interface 1202 is for real-time streaming directly from one in-memory database to that of the compute engine in-memory database. The second interface 1204 is for data from the CPS-G persistent database to that of the compute engine in-memory database.

Under control of the workflow engine 1220, and platform configuration 130, command/control interfaces processing algorithms are dynamically loaded into each of the worker processes as needed for the domain specific use-case scenario. Execution proceeds in accordance to a task-graph based order, one for each workflow defined, with each compute engine (e.g., engines 1206*a-n*, 1208*a-n*, 1210*a-n*, 1212*a-n*, 1213*a-n*, 1214*a-n*, and 1216*a-n*) able to input or output to each other through fully IPC design. The compute engine interconnection design is implemented as a fully meshed IPC network 1211 in hardware (multi-core, server processors, or within integrated circuit, SoC realizations), software, or standard high-speed network based wired and wireless methods.

The compute engine 114 is configured with processing engines 1206*a-n*, 1208*a-n*, 1210*a-n*, 1212*a-n*, 1213*a-n*, 1214*a-n*, and 1216*a-n*. Each compute engine enumerated as 1 ... N; including, but not limited to string/math (1206), supervised and unsupervised machine learning 1208, 1212 (SVM, PCA, SVD, Clustering, Regression), neural networks (NN) and Graph Neural Networks (GNN) 1210, and optimization-based algorithms such as SWARM engines (1213), Particle Swarm Optimization, ANT Colony, and simulated annealing as well as genetic, and evolutionary learning algorithms. For distributed application and network devices, especially geospatial, coordination and orchestration use-cases, compute engines specialized collective optimization engines and support spatial based computing algorithms (such as engines 1214). There are also graph and generic compute engines 1216. The compute engines can operate upon CPS-G datasets, with one embodiment enabling each compute engine dynamically unrolling summary or compact CPS graph data-node in real-time during execution run-time of the given algorithm.

Figure 12B:
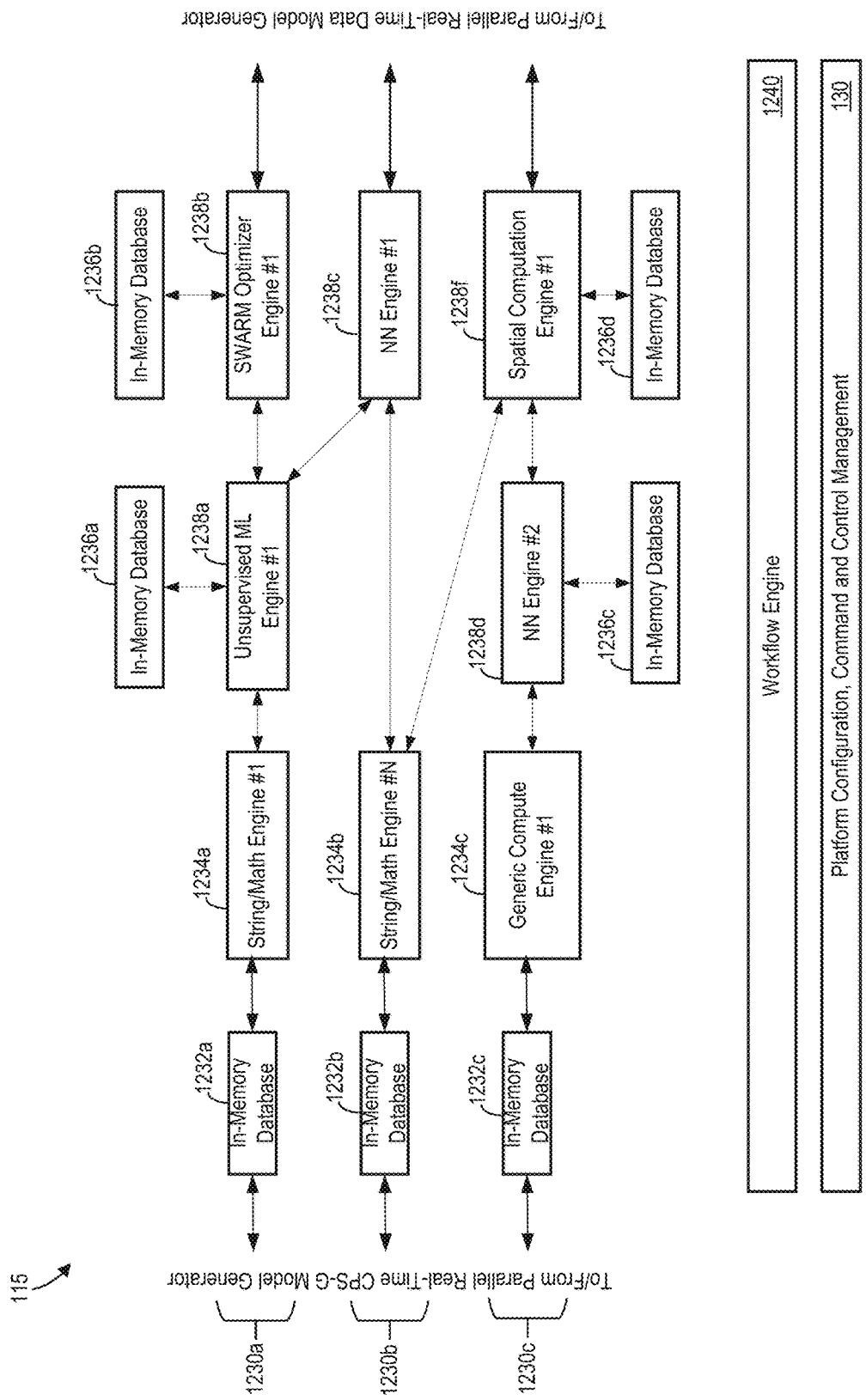
FIG. 12B illustrates an operation of parallel stream compute engine executing a parallel set of computations based on a specified execution task-graph.

FIG. 12B illustrates one instantiation of the parallel compute engine 115 where three parallel workflows 1230*a*, 1230*b*, and 1230*c* are defined in terms of a task-graph of executing compute engines 1234*a-c* and engines 1238*a-f*. Note from the task-graph that intermediate results are stored within the in-memory caching database portions 1236*a-d*. Second, two of the workflows (e.g., workflows 1230*b*, 1230*c*) each depend on intermediate results of compute engines (e.g., engines 1238*a* and 1234*b*) within other workflows. This demonstrates an embodiment efficiency where that CPG-G datasets can be processed with intermediate results reused across multiple streaming computation workflows.

Figure 13:
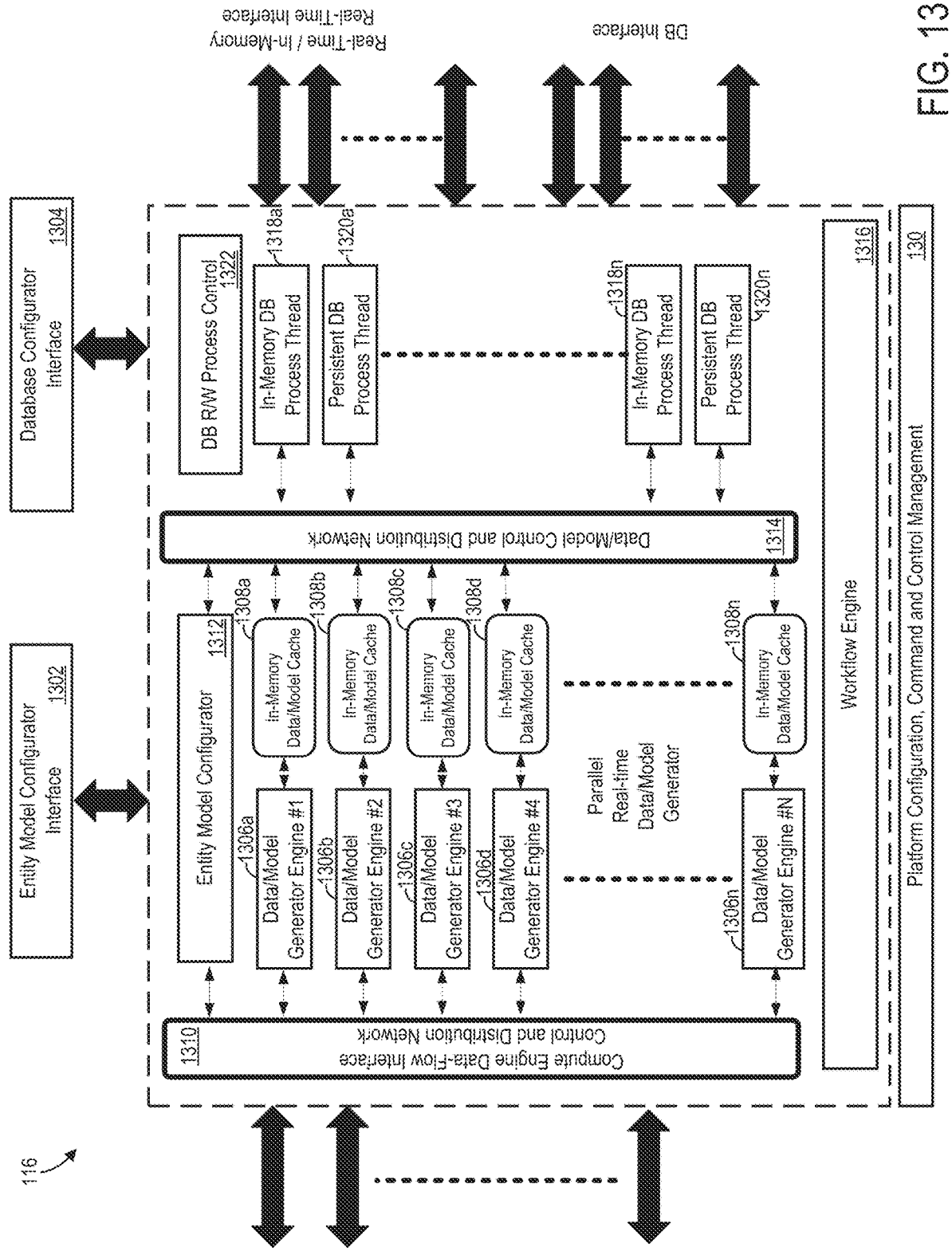
FIG. 13 is a block diagram illustrating the design of a parallel real-time data-model generator module configured to transform in real-time input data-models into dynamically configurable output data-models representations for direct utilization by client applications and devices.

FIG. 13 shows a block diagram of the parallel real-time data/model generator module 116. Module 116 transforms results of computation module 114 and processes the results into target data-model representation individually for each workflow. Module 116 thus converts the processed dataset outputs to a target dataset and data-model for clients or systems integrated to the data processing system 100. Two configuration interfaces 1302, 1304 allow for programmatically defining a data-model template and transformation operations. The interfaces 1302 and 1304 enable definition of how target data-model is to be represented in the persistent storage database. To perform the actual transformation, one or more data/model generator engines 1306*a-n* perform entity/model transformation on streaming results from the parallel streaming compute engine module 114 and rewriting into a local in-memory cache 1308*a-n*, respectively. Concurrently, as data/model transformations complete, one or more database writer processes (a first process 1318*a-n* for in-memory database and a second process 1320*a-n* for persistent database systems), controlled by a read/write controller 1322, read said completed data/model transformations and write each one respectively into each target, cached in-memory or persistent. The operation of the module 116 is controlled by a workflow engine 1316 which coordinates and orchestrates operation of internal module processes based on input from the two configuration interfaces 1302, 1304. As previously described with respect to module 114, a control and distribution network 1310 is configured to network the data model engines 1306*a-n* to distribute data among the workflows as needed.

Figure 14:
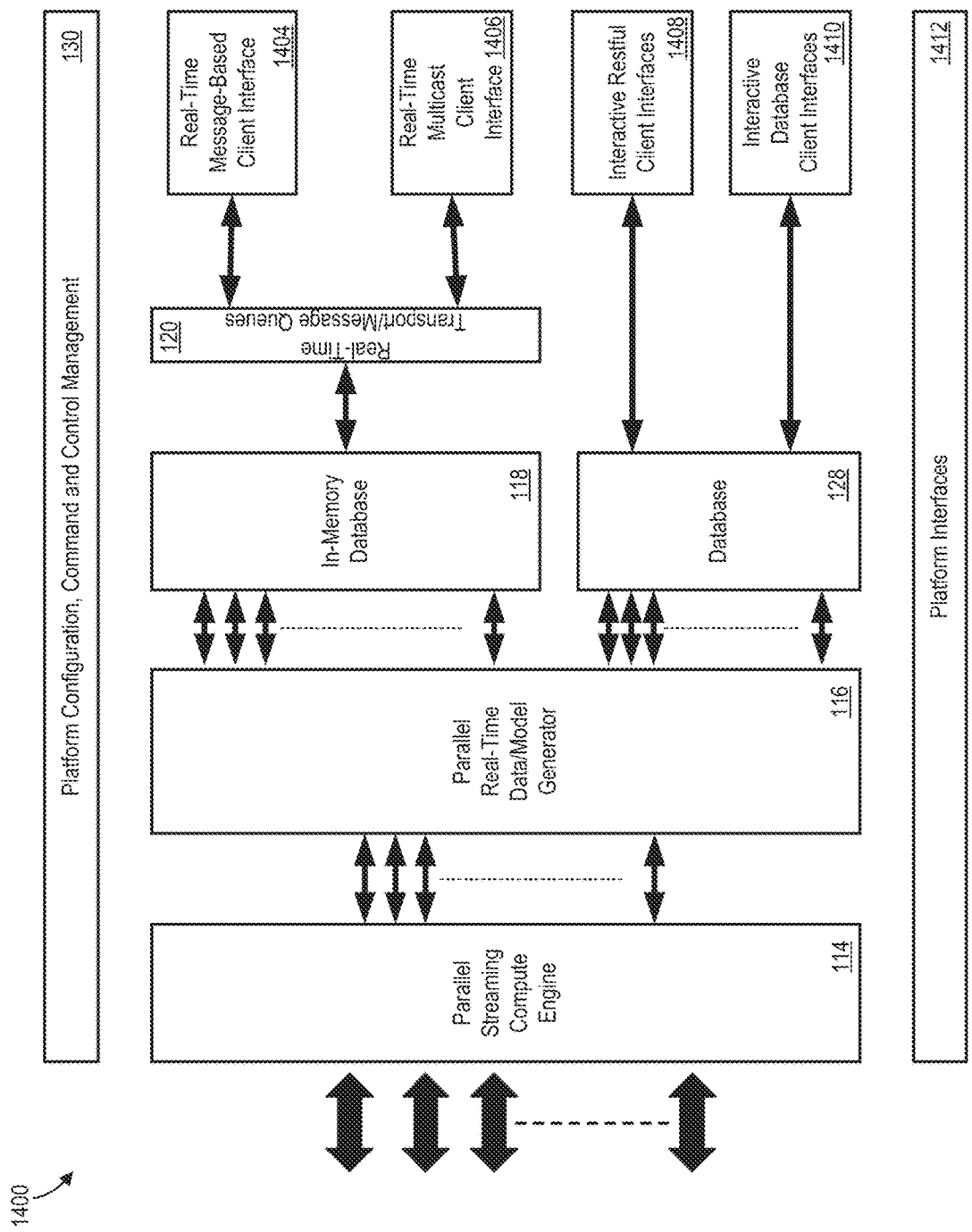
FIG. 14 illustrates the schematic of the data processing system modules for enabling integration with external systems, applications, or devices.

FIG. 14 illustrates a system design block diagram for elaboration of the set 1400 of post-processing data processing system 100 pipeline modules. As previously described, data output from the parallel streaming compute engine 114 flows directly into the parallel real-time data/model generator module 116. Module 116 transforms internal dataset representation into a final target format, storing into both an in-memory database 118 for real-time streaming clients and persistent database 128 for interactive or batch-oriented client access over multiple transports that can operate concurrently and independent of one another. The following integration points to the data processing system 100 are represented as modules 120 and 122 in FIG. 1. Real-time clients 1404, 1406 may access the in-memory database 128 multiple ways. Real-time data can be streamed or delivered over multicast network transports or delivered over message queues 120 as publish/subscribe based messaging network models. In the second case, platform configuration sets up one or more message queues for subscribing clients to receive message events containing the datasets, workflows, of interest. For interactive or batch-oriented clients 122*c*, a second set of interfaces 1408, 1410 providing either access to the persistent database in accordance with the database platform access API 1412, or alternatively a restful interface (e.g., using uses HTTP requests to access and use data) that provides similar access patterns. It should be noted that the data processing system 100 is not limited to the access methodology, and other access methods are possible including custom and proprietary connector oriented interfaces which may be built over those that are defined and illustrated to the system design and module 122 components.

The data processing system 100 and each of its corresponding modules has been described in detail. The data processing system 100 is modular by design, and different modules can be organized into different ways to create one or more embodiments that achieve a multitude of application or domain specific implementation scenarios. The data processing system 100 design, methods, and implementation has been described in order to facilitate the optimal implementation of workflows or use-case scenarios. The use case scenarios include dynamic data model transformation and distribution, as described in relation to FIGS. 15-16C below. The use case scenarios include implementation of streaming data and real-time analytics application system where the data model of interest can be dynamically modified in real-time with the resulting streaming data workflow for analysis and analytics further processed in real-time enabling high-performance application or visualization of analyzed datasets, as described in relation to FIG. 17 below. The use case scenarios include implementation of distributed coordination, orchestration, and command/control processes associated to distributed applications or devices, as described in relation to FIG. 18 below. In this last scenario the data processing system 100 is utilized to independently or collectively enable networks of individual software processes, agents, applications or devices operating to execute a specified task, function or goal achievement as part of a given closed loop system including networks of IoT devices, mobile devices, and intelligent autonomous devices such as drones, robots or vehicles.

Figure 15A:
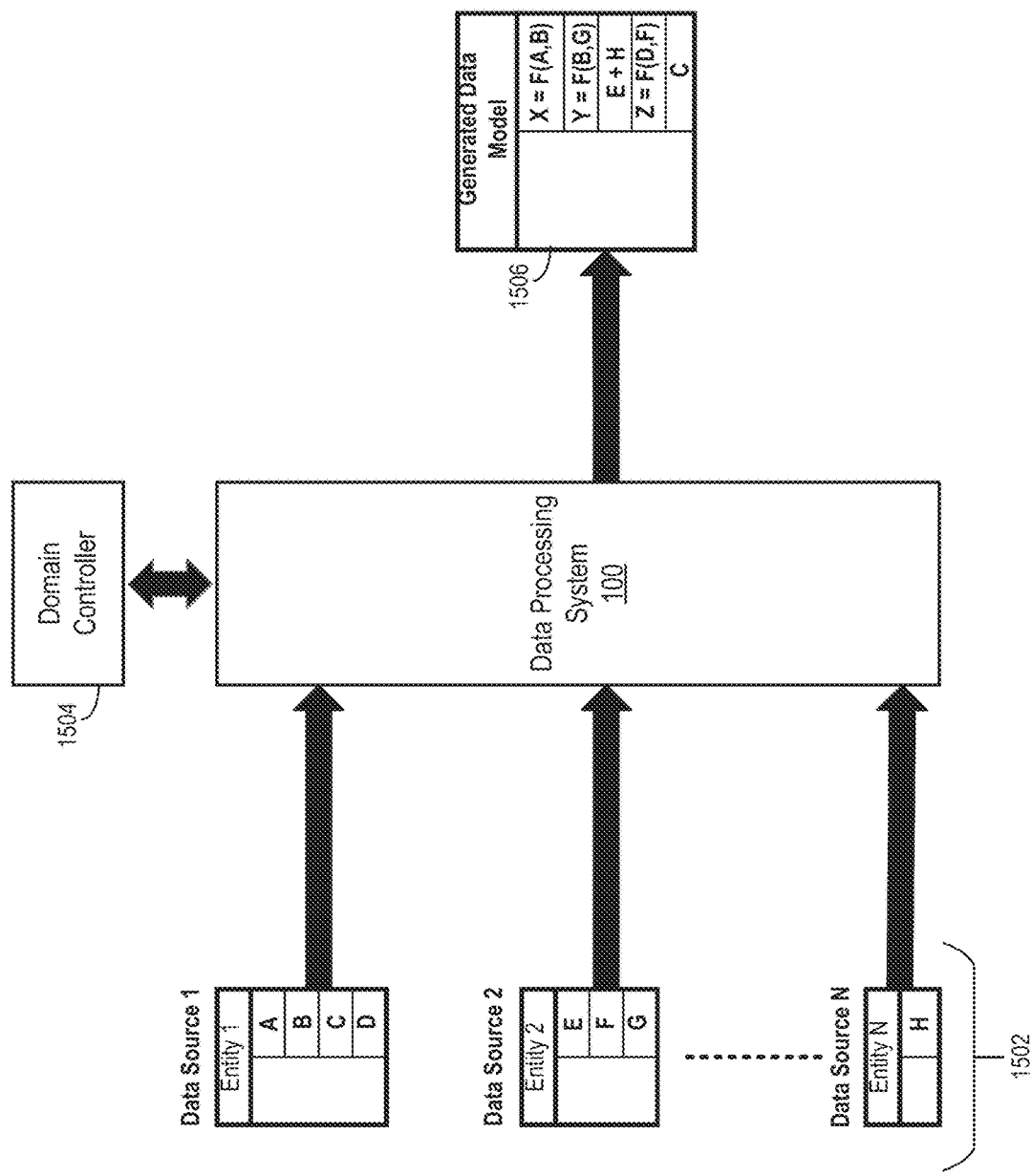
FIG. 15A illustrates an example data processing system configured for message and data ingestion organized in one format or data-model and transforming the ingested data to a target data-model utilizing configurable and programmatic rules or constructs defined by a domain specific controller.

FIG. 15A illustrates an exemplary use of the data processing system 100 in implementing a dynamic data-model transformation system. Multiple data sources $D_1$-$D_N$ 1502 are indicated, each with a source data-model and dataset. Data sources are input (mapping to one or more workflows) and processed in parallel by the system 100. The data processing system 100 transforms the one or more data source feeds and accompanying datasets 1502 into a resultant target data model 1506 and set of datasets as shown that can be processed further by the target system. The data processing system 100 pipeline is under the control of a domain specific controller 1504 that defines the both configuration and module workflow to achieve the desired execution and operational parameters.

Figure 15B:
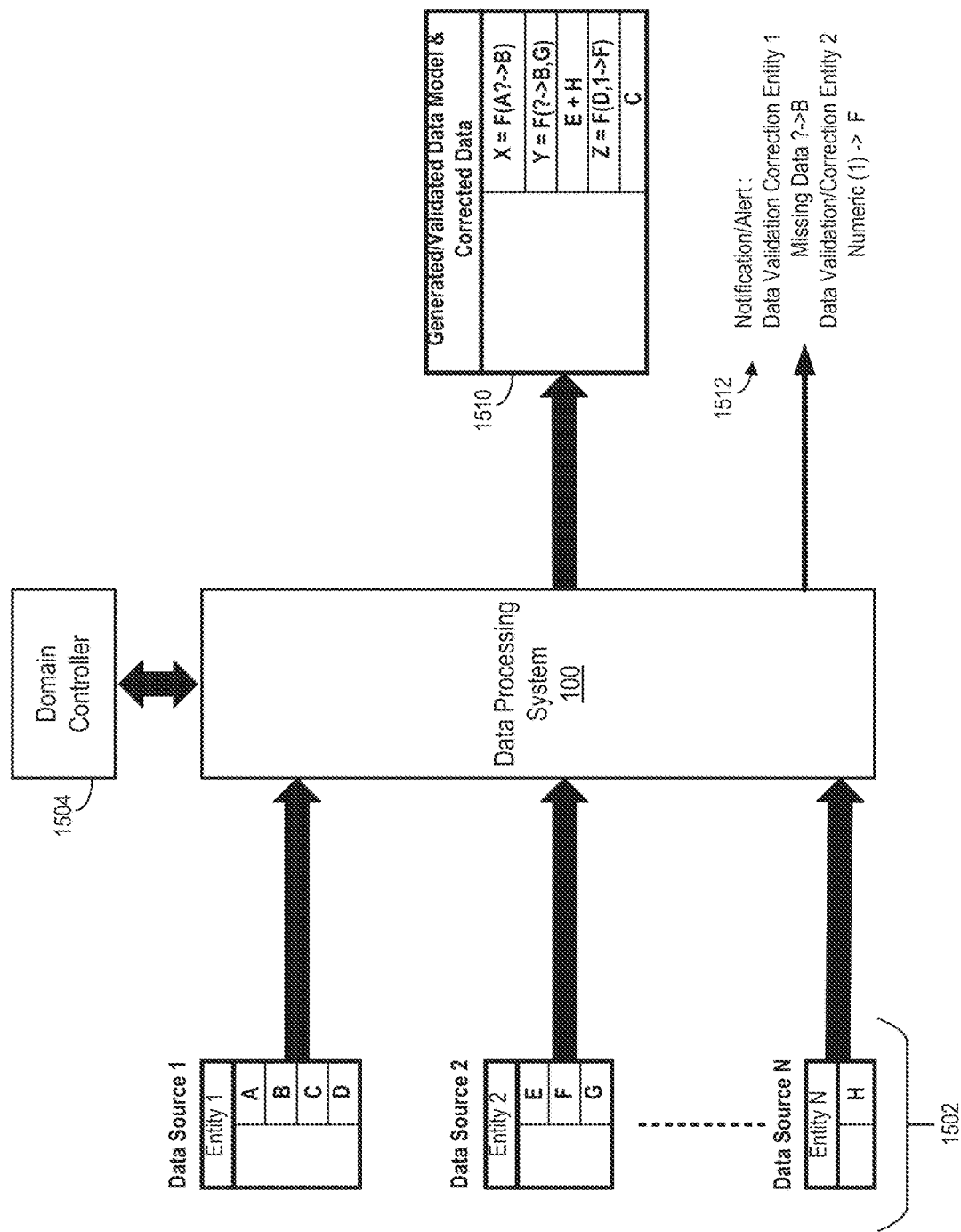
FIG. 15B illustrates an example data processing system configured for intelligent data validation, error detection and correction in accordance with ingestion and target data-model and data requirements. The system is configured to achieve a deterministic target state data-model and data-set output, additionally generating a notification event detailing the occurrence and processing associated to validation, errors and correction scenarios.

FIG. 15B shows illustrates the data processing system 100 configured for intelligent data validation, error detection and correction in accordance with the ingestion and target data-model and data requirements as previously described (e.g., in relation to FIG. 7). The data processing system 100 generate a deterministic target state data-model and data-set output 1510. The output data model 1510 is validated to ensure the requirements imposed have been satisfied, including logical consistency, data checks, referential integrity (if applicable), and so forth. As shown in FIG. 15B, data checks are performed on various entities of the data model. If errors are found, a notification event 1512 is generated to report it to the user. For example, the entity 1 includes missing data, and entity 2 includes data of an unexpected data type. The notification event 1512 thus details the occurrence and processing associated to validation, errors and correction scenarios.

Figure 16A:
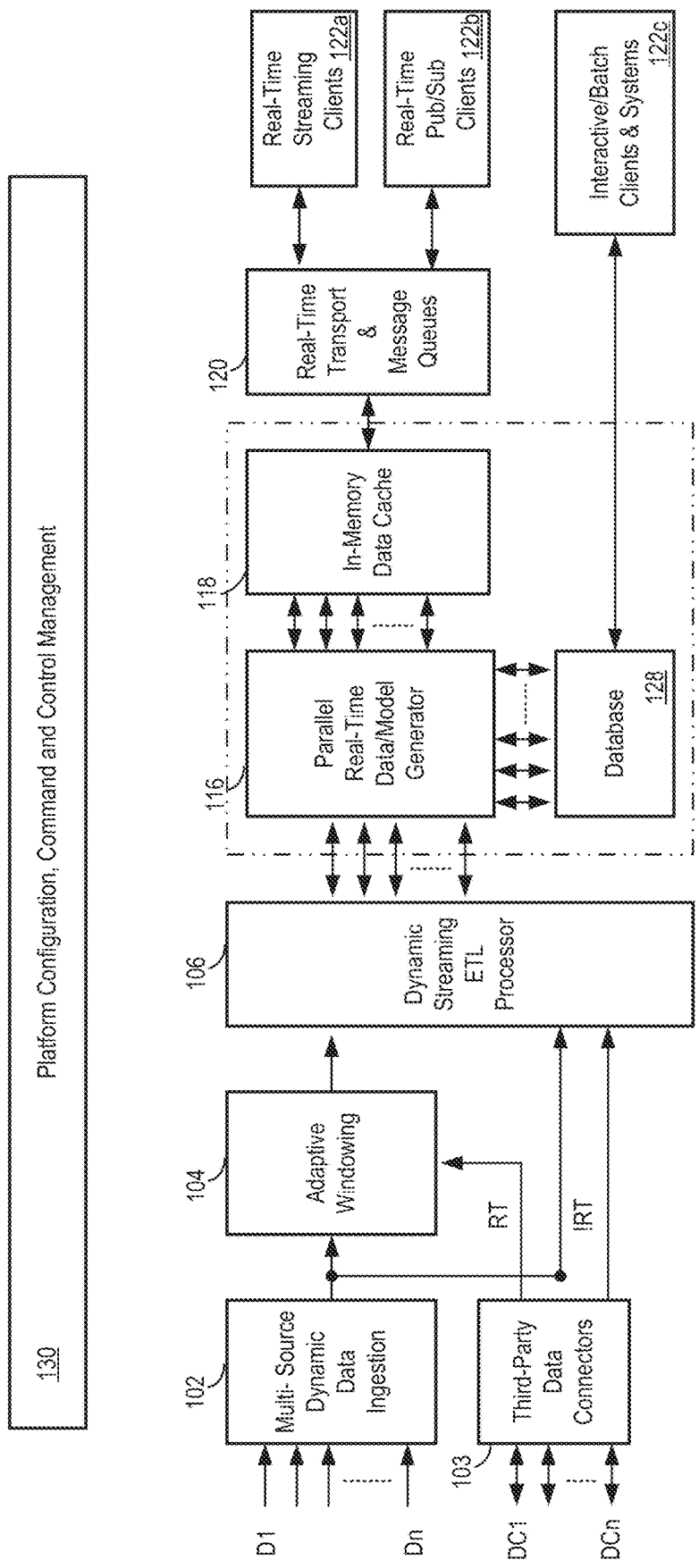
FIG. 16A describes a data processing system including a set of modules configured for multiple phases of data-model transformation comprising data-model transformation and target data-model model generation in real-time, followed by integration to one or more external systems.
Figure 16B:
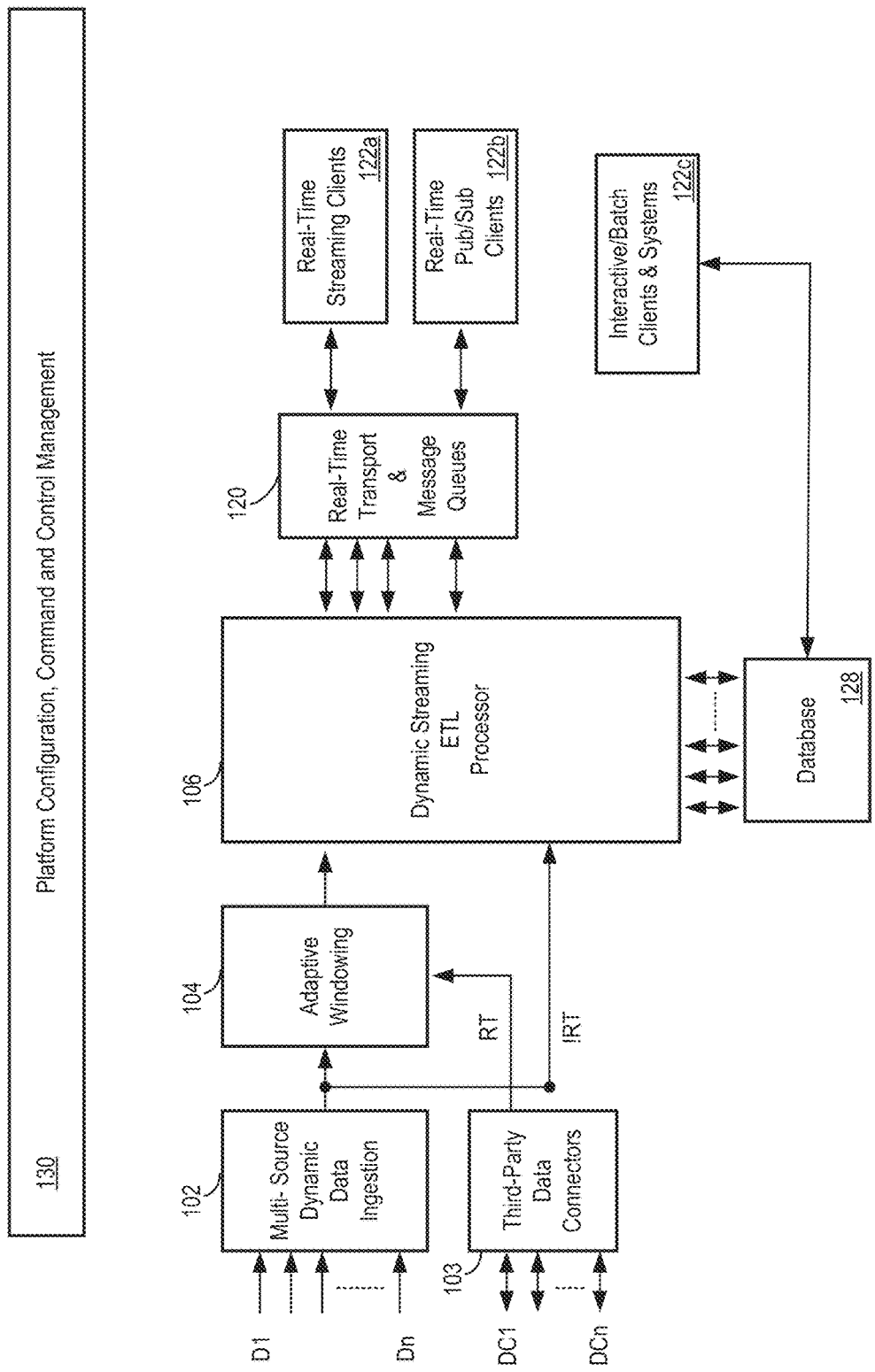
FIG. 16B describes a data processing system including a set of modules configured for dynamic data-model transformation in real-time, followed by direct integration to one or more external systems.
Figure 16C:
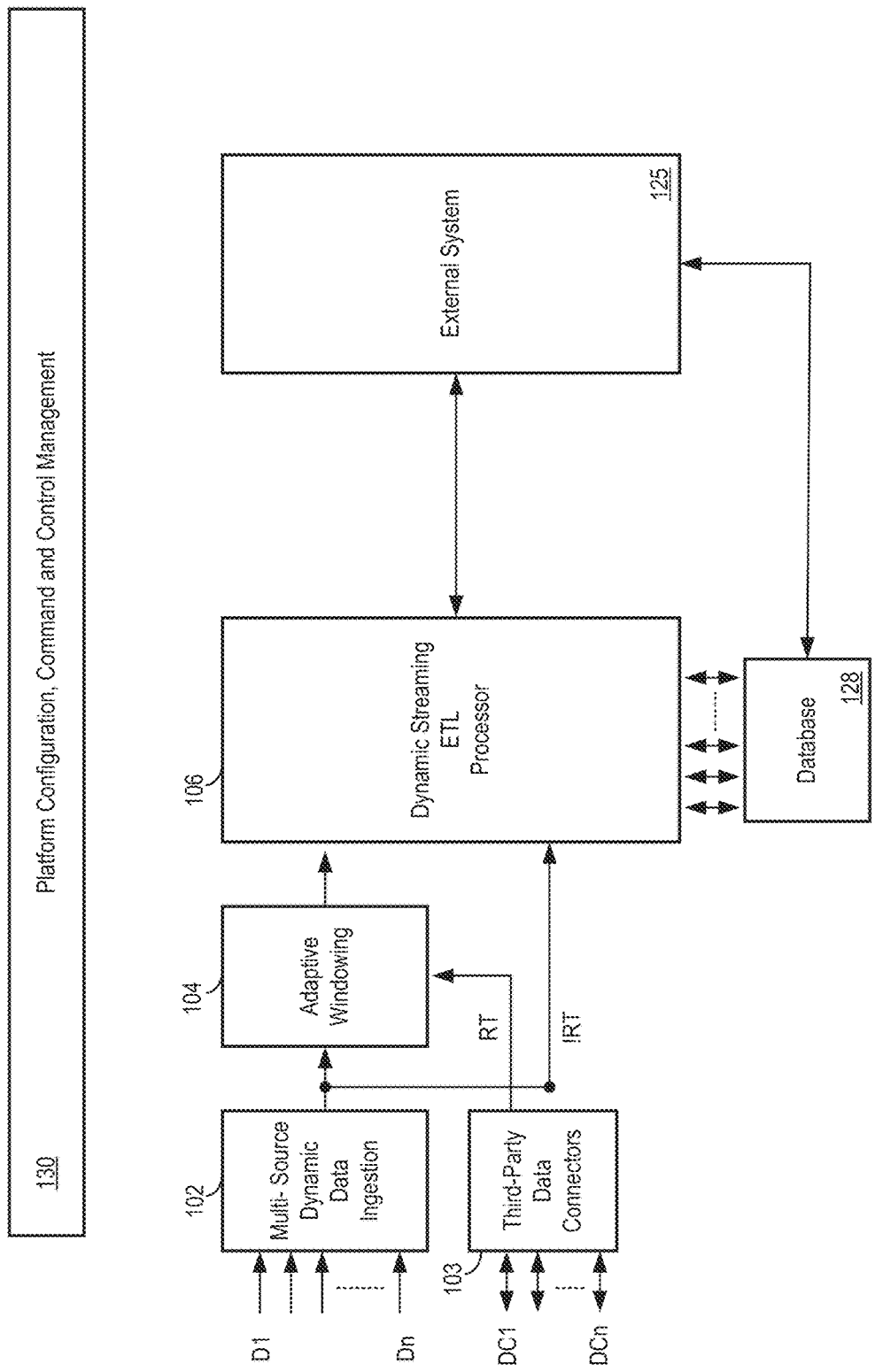
FIG. 16C describes a data processing system including a set of modules configured for dynamic data-model transformation, validation, error detection and correction and direct integration to one or more external systems.

FIGS. 16A, 16B, and 16C illustrate the data processing system 100 for an exemplary use case in which a subset of system modules is utilized to achieve the result described in relation to FIGS. 15A-15B, inclusive of dynamic data-model transformation. In FIG. 16A, output of the dynamic streaming ETL processor module 106 is further transformed by a second domain specific data/model conversion. In comparison, FIG. 16B illustrates a scenario where the ETL processor module 106 is made directly available to clients 122. FIG. 16C shows the data processing system 100 including the set of modules configured for dynamic data-model transformation, validation, error detection and correction (previously described) followed by direct integration to one or more external systems 125. The external system 125 can be a third-party system. The external system 125 is configured to receive the CPS-G data model annotations/definitions and data model from the ETL processor module 106 directly, rather than through an interface like the message queues module 120.

FIGS. 16A-16C show how the workflow shown in FIG. 2 is not static, but how modules of the data processing system 100 can communicate with several different other modules or directly with client systems. In an example, the client systems can request intermediate data, such as sub-graphs of the CPS-G model, the ETL processor 106 output, the classifications or scores of the transform data model of the module 116, and so forth, rather than the packaged output from the message queues module 118.

Figure 17:
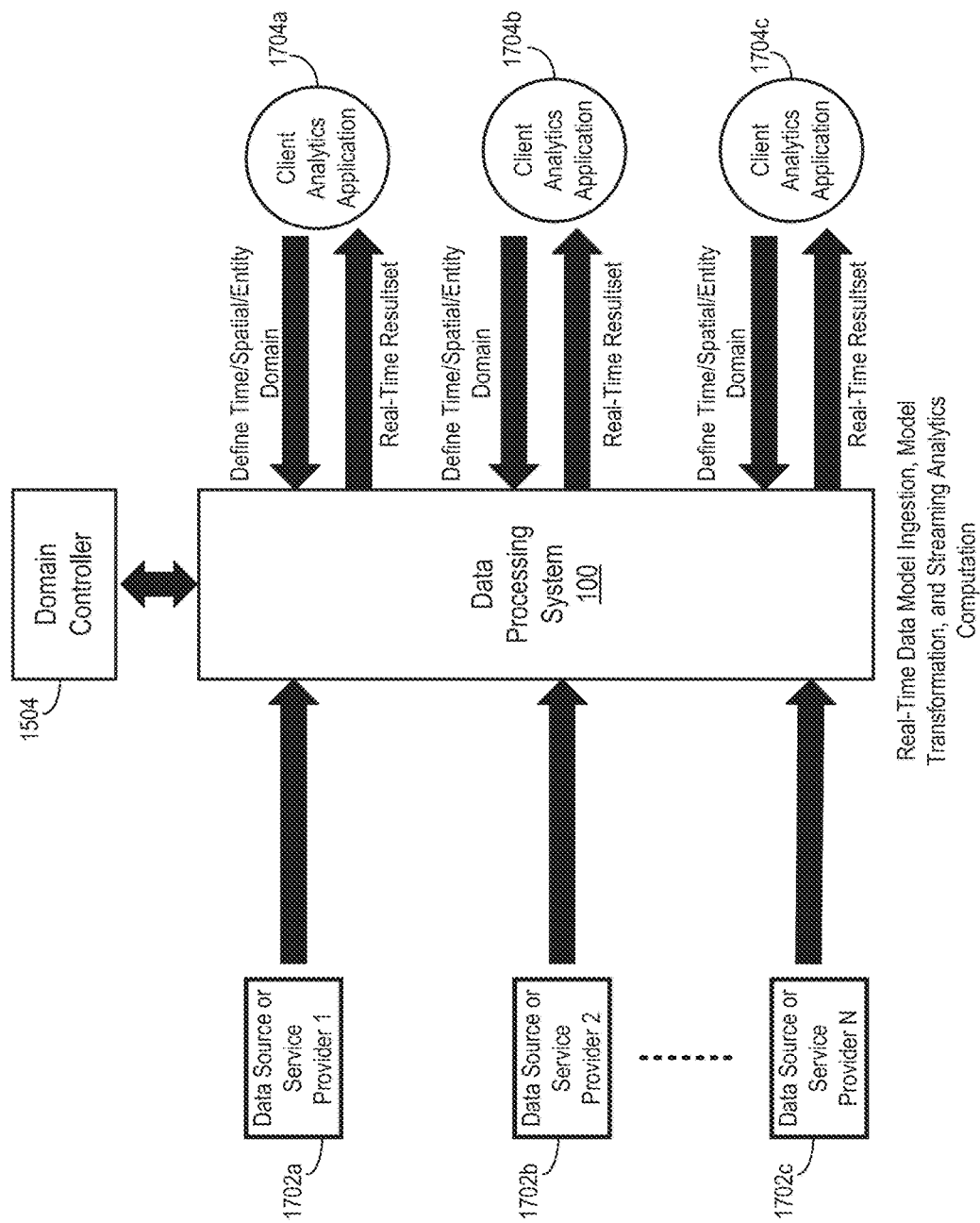
FIG. 17 illustrates a data processing system configured as a streaming data analytics and analysis platform managed by a domain specific controller.

FIG. 17 illustrates an exemplary embodiment for use a case scenario including implementation of streaming data and real-time analytics application system where the data model of interest can be dynamically modified in real-time with the resulting streaming data workflow for analysis and analytics further processed in real-time enabling high-performance application or visualization of analyzed datasets, the construction of a domain specific real-time streaming analysis and analytics platform. In FIG. 17 one or more data sources and/or providers 1702a-c deliver or stream datasets to the data processing system 100 platform. One or more client applications 1704a-c can define a combination of entities and data models of interest and retrieve real-time results based on the execution of one or more analysis or machine learning algorithms against datasets received. Since the data processing system 100 can manipulate and process datasets in real-time, visualization of said result sets can also be accomplished in a high-performance manner.

As a further example, multiple data sources 1702a-c may included collected viewership based on channel tunes or content selections across millions of consumer devices. In the implementation of viewership measurement, analysis, and targeted advertising, the implementation enables optimized real-time analysis, visualization, and prediction of consumer behavior of content consumption used for the generation of geo-aware, networks, systems, or device specific viewership analysis. Real-Time analysis and prediction enable enhanced insights for advertisers seeking highly precise time or behavioral relationships in targeting ad placement and scheduling of ad inventory. Here, an advertisement can include a content item delivered to devices including televisions, mobile devices, and/or web or broadband based devices including entertainment devices residing within autonomous systems such as self-driving automobiles.

As a further example, multiple data sources 1702a-c may include collected chemical or biological samples from a network of Multisensors and portable nuclear magnetic resonance (NMR/Multisensor) Multisensor device, or portable nuclear magnetic resonance (NMR) only device. Each Multisensor provides detection and/or collection of data representing one or more aspects of an environment of the Multisensor. For example, the Multisensor can include chemical, environmental, and biological sensors or monitoring and measurement devices for providing respective chemical, environmental, and biological data. For example chemical sensors include gases and liquid sensors that detect and measure the presence and concentration of gas and liquid atoms, molecules and compounds of both organic and inorganic composition. Environmental sensors include temperature, pressure, humidity and presence of elements of interest in detecting, measuring, and monitoring gases and liquids chemistries relevant to environment characteristics such as air quality and water pollution. Multisensors for biological and metabolic includes medical devices and sensors that detect, measure, and monitor a wide range of biological and metabolic processes including heart rate, EKG, blood-pressure, O2, temperature, blood chemistries, presence of viral and bacterial agents, as well as metabolic activities. A NMR/Multisensor device provides for a suitable sample collection unit that generates one or more pulse sequences (as example T1/T2) resulting in one or more chemical signatures (chemical shift) for various nuclei underlying the chemical or biological structure under sample analysis. Raw chemical signature data from N number of NMR/Multisensor devices represents multi-source data ingestion (the data ingestion module 102), that can be mapped to N workflows for each NMR/Multisensor device plus additional workflows representing sets or permutation relationships of the N devices (including one workflow to aggregate data across N devices for global analysis). Signature telemetry from the NMR/Multisensor devices can be transformed (the ETL processing module 106), data mined for key telemetry if required (data mining module 108), converted to CPS-G data models (module 110) and processed in real-time for analysis, (as an example, by utilizing machine learning compute engine modules for deriving correlation or predictive patterns of significance from a network collection of analyzed samples) then said processed data delivered suitable for visualization (modules 116, 118, 120, and 122) in accordance with the data processing system 100. An embodiment entails enabling a secondary workflow, whereby the visualization or client application may selectively modify the data-model of interest (module 112), to modulate specific CPS-G data-model sub-graphs and their respective data-entities, resulting in event propagation of real-time NMR/Multisensor device operating parameters that reflect dynamically, thus enabling a platform for dynamic real-time NMR/Multisensor device configuration and sample analysis scenarios, orchestrated and controllable from the data processing system 100.

Figure 18:
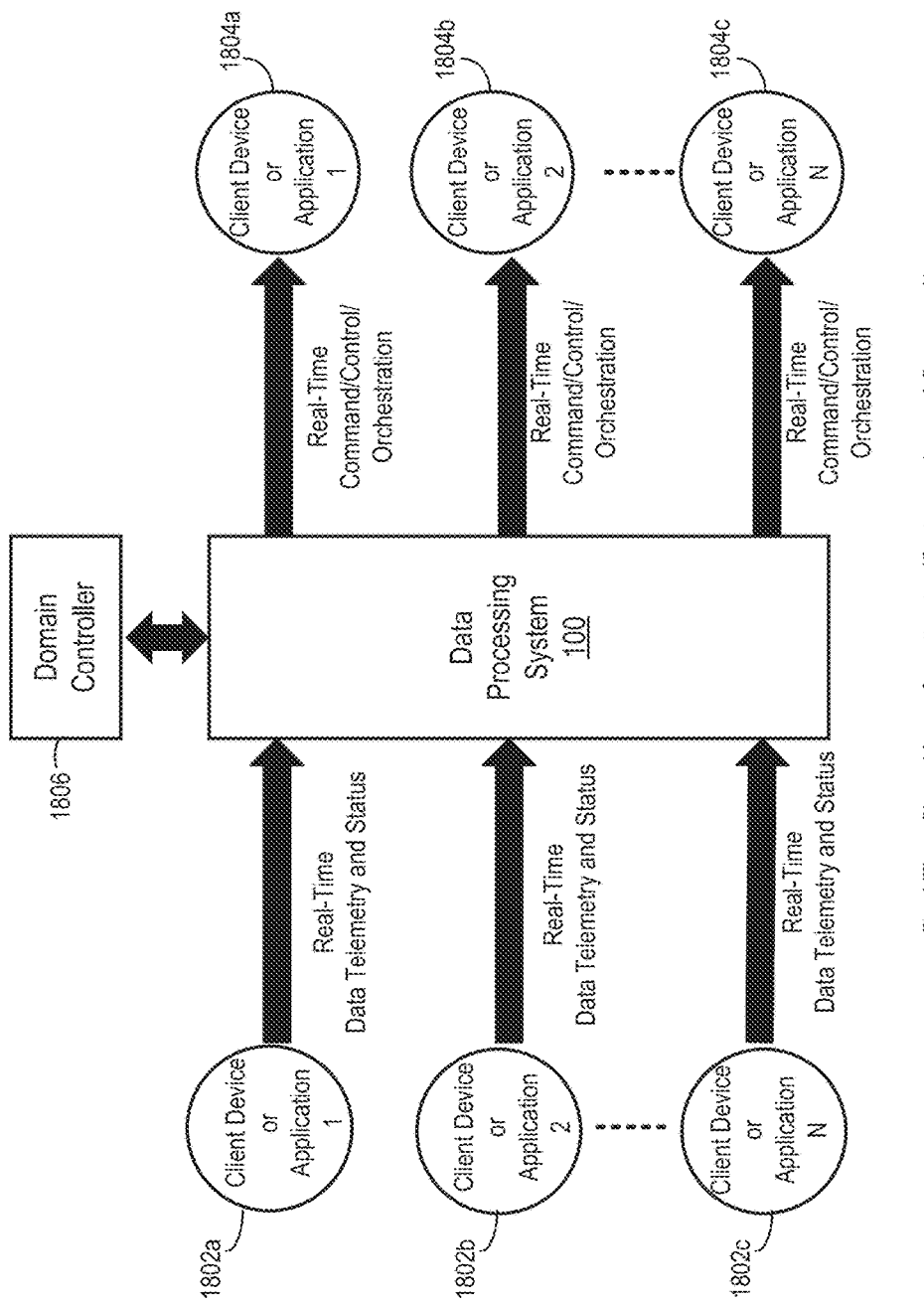
FIG. 18 illustrates a data processing system managed by a domain specific controller configured for managing one or more networks of distributed applications and devices.

FIG. 18 illustrates an embodiment for a use case scenarios include implementation of distributed coordination, orchestration, and command/control processes associated to distributed applications or devices. The use case includes implementation of a command/control, coordination, and orchestration for management of networks or collective operation of distributed applications and devices. A domain-specific controller 1806 configures both the platform modules and respective workflow operation to achieve execution of a desired scenario. One or more client devices or applications 1804*a-c* receive real-time command/control/coordination/orchestration messages in response to processed real-time data telemetry and status from the networks or collection of distributed applications and devices 1802*a-c*.

An example combines the use cases described in relation to FIGS. 17 and 18 above, whereby a global sample analysis system is implemented by a network of spatially distributed devices each device collecting telemetry as well as being orchestrated/coordinated by the data processing system 100. In this hybrid use-case, a fleet of aerial drones are directed to some distributed geographical region and variable altitude of study. Sensors mounted on the drone collect sample materials for chemical (biological, organic, inorganic, or environmental) analysis. For example, a portable NMR/Multisensor device especially designed and mounted on each drone with a suitable sample collection unit can generate the appropriate pulse sequences to generate a variety of chemical signatures for various nuclei. Chemical signature data can be collected across numerous networked drones and sent to the system platform (directly from the device, or indirectly through a base-station control unit or access point) for processing and distribution to subscribing client applications and systems as a first workflow.

Based on chemical analysis results, the data processing system 100 can execute a second workflow, for coordination and orchestration commands to the drone command and control interface to actuate the drone and NMR/Multisensor sensor (change trajectory, sampling parameters, increase or modify the NMR/Multisensor processing methodology) configuration and operating behavior. This might include use of at least one of the available machine learning algorithms executing on one or more compute engines to analyze the NMR/Multisensor sensor data. Results from the compute engine module 114 are further processed for visualization by subscribing clients, and additionally input to an optimization engine (swarm or spatial) to determine the optimal orchestration actions to actuate (through event propagation of processed data) from the system to the network of sensor drones, such as changing their trajectory, altitude or repositioning of the sample sensor system. In the above example, multi-source data including NMR/Multisensor sensor data and drone telemetry (current altitude, spatial coordinates) is received from multiple devices and applications (the data ingestion module 102) and dynamically transformed (the ETL processing module 106) into a CPS-G data-model (the CPS-G generator module 110) in a streaming data-model in accordance with the data processing system 100 modules. The compute engine module 114 performs NMR/Multisensor telemetry analysis, drone coordination and orchestration. This use-case scenario is not limited in application to NMR/Multisensor sample analysis, and can be applied to other sensor or measurement subsystems in autonomous, semi-autonomous, non-autonomous devices and systems; both a dynamic spatial and mobile use-case as described or fixed sensor scenario without loss of generality with respect to the data processing system 100 application or utility.

Figure 19:
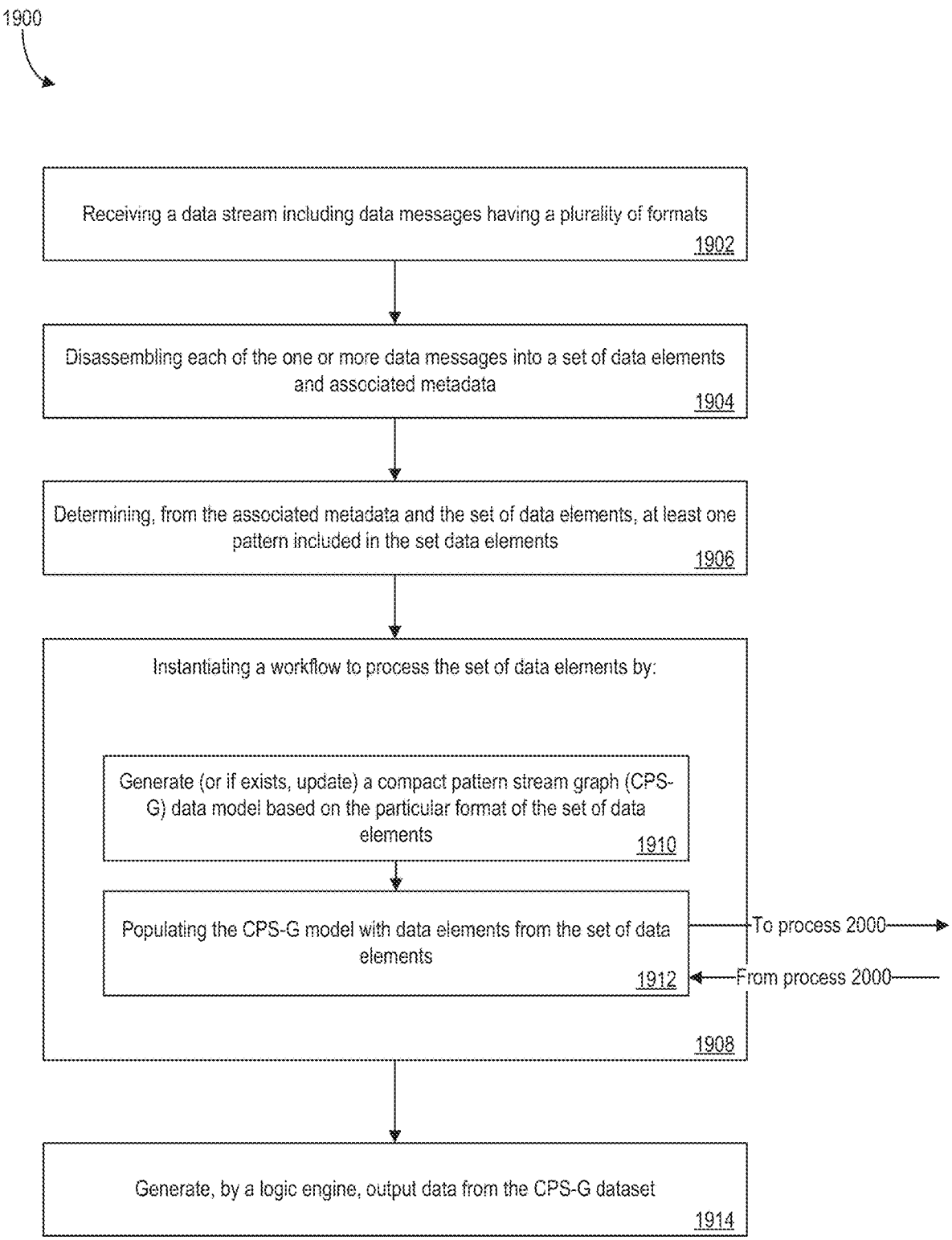
Figure 21:
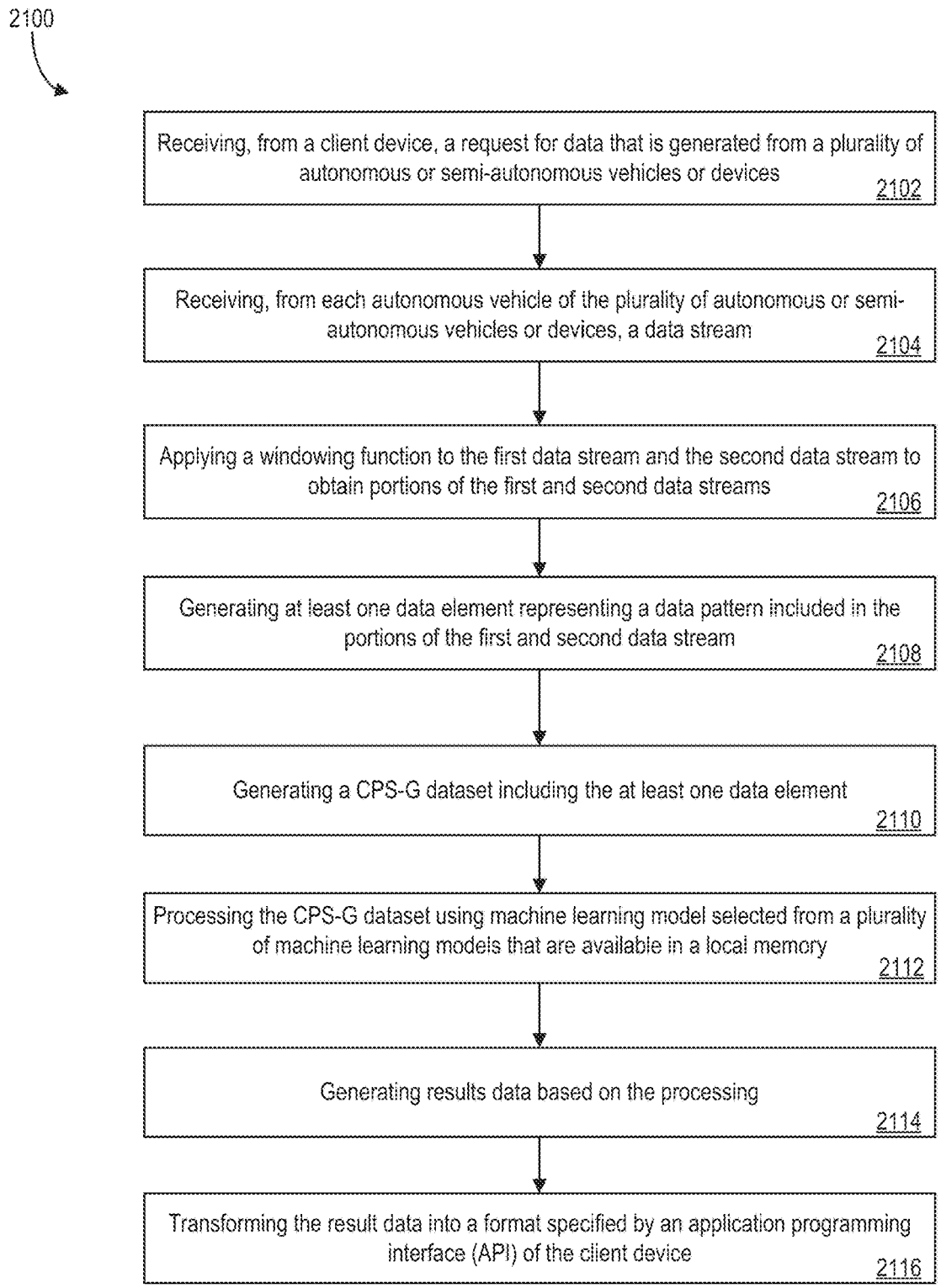

FIGS. 19-21 represent respective example processes 1900, 2000, and 2100 for processing data from a plurality of distributed data sources. Processes 1900, 2000, and 2100 are configured to be executed by one or more of the systems, devices, and modules previously described in relation to FIGS. 1-18.

Process 1900 includes receiving (1902) a data stream including data messages having a plurality of formats. Process 1900 includes disassembling (1904) each of the one or more data messages into a set of data elements and associated metadata. The set of data elements have a particular format. Process 1900 includes determining (1906), from the associated metadata and the set of data elements, at least one pattern included in the set data elements. Process 1900 includes instantiating (1908) a workflow to process the set of data elements based on the pattern. The workflow generates (1910) a compact pattern stream graph (CPS-G) data model based on the particular format of the set of data elements. In this context, configuring the CPS-G data model includes identifying whether there is an existing CPS-G data model. If the CPS-G data model exists, it can be updated or revised (including changing existing data or adding new data). If the CPS-G data model does not already exist, configuring the CPS-G data model includes generating a new GPS-G data model. The CPS-G data model represents processed data messages of the data stream. The workflow is configured to populate (1912) the CPS-G model with data elements from the set of data elements, the CPS-G data model being a CPS-G dataset when populated with the set of data elements.

As shown in process 2000 of FIG. 20, populating the CPS-G data model includes configuring (2002) a CPS-G model sub-graph to add to the CPS-G model that indicates the pattern represented by the set of data elements and one or more data elements of the set of data elements. Populating the CPS-G data model includes adding (2004) the CPS-G model sub-graph to the CPS-G model. A location of the CPS-G model sub-graph in the CPS-G model represents a relationship of the pattern of the data elements to other processed data messages of the stream.

Returning to FIG. 19, process 1900 includes generating (1914), by a logic engine, output data from the CPS-G dataset. The logic engine is configured to update the output data in real-time or near real-time when the CPS-G model sub-graph is added to the CPS-G model.

FIG. 21 shows a process 2100 for processing data from a plurality of distributed data sources. Process 2100 includes receiving (2102), from a client device, a request for data that is generated from a plurality of autonomous or semi-autonomous systems or devices. For example, one such system or device includes autonomous vehicles such as an unmanned aerial vehicles (UAVs) such as drones, unmanned ground vehicles, or aquatic vehicles. Semi-autonomous vehicles can include automobiles, drones, ships, and so forth. Process 2100 includes receiving (2104), from each autonomous device of the plurality of autonomous devices, a data stream. A first data stream of the plurality of data streams has a first format, and a second data stream of the plurality of data streams has a second format that is different from the first format. The first data stream is generally received from a first autonomous device, and the second data stream is generally received from a second autonomous device. Process 2100 includes applying (2106) a windowing function to the first data stream and the second data stream to obtain portions of the first and second data streams. The windowing function is based on a geographical location of the first autonomous device and the second autonomous device. The portions of the first and second data streams are associated with the geographical location.

Process 2100 includes generating (2108) at least one data element representing a data pattern included in the portions of the first and second data stream. Process 2100 includes generating (2110) a CPS-G dataset including the at least one data element. Process 2100 includes processing (2112) the CPS-G dataset using a machine learning model selected from a plurality of machine learning models that are available in a local memory. The particular machine learning model is selected based on the particular application, but a variety of machine learning models are available (e.g., any given machine learning model can be preconfigured for processing the data of the CPS-G data structure). The machine learning model can be configured for generating an output based on the particular application being performed, including classification of data elements, predictive analytics, feature discovery, and so forth. Process 2100 includes generating (2114) results data based on the processing. Process 2100 includes transforming (2116) the result data into a format specified by an application programming interface (API) of the client device.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the modules 102, 104, 106, 108, 110, 112, 114, 116, 118, 120, and 122 can be implemented using digital electronic circuitry, or in computer software, firmware, or hardware, or in combinations of one or more of them. In another example, the process 1900 and 2000, can be implemented using digital electronic circuitry, or in computer software, firmware, or hardware, or in combinations of one or more of them.

Some implementations described in this specification (e.g., the data processing system 100) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing system" encompasses all kinds of apparatus, devices, and machines for processing data, including by way of example a programmable processor, a computer, a system on a chip, or multiple ones, or combinations, of the foregoing. In some implementations, the modules 102-122 each comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The data processing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

The data processing system can serve in a role as a client, a network component, a server, a database, a persistency, or components of a computer system for performing the subject matter described in the present disclosure. The illustrated computer 402 is communicably coupled with a network 430. In some implementations, one or more components of the data processing system can be configured to operate within different environments, including cloud-computing-based environments, local environments, global environments, and combinations of environments. Other environments can include data-centers, distributed computing, virtual machines, cluster computing, and implementation in microservices (cloud), centrally or distributed over a network.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for real-time processing of a data stream using a graph-based data model, the method comprising:
receiving a data stream including data messages having a plurality of formats;
disassembling the data messages into a set of data elements and associated metadata, the set of data elements having a particular format;
determining, from the associated metadata and the set of data elements, at least one pattern included in the set of data elements;
instantiating a workflow to process the set of data elements based on the pattern, the workflow configured to:
configure a compact pattern stream graph (CPS-G) data model based on the particular format of the set of data elements, the CPS-G data model representing processed data messages of the data stream, wherein configuring the CPS-G data model comprises updating an existing CPS-G data model or generating a new GPS-G data model; and populate the CPS-G data model with data elements from the set of data elements, the CPS-G data model being a CPS-G dataset when populated with the set of data elements, wherein populating the CPS-G data model comprises:
configuring a CPS-G data model sub-graph to add to the CPS-G data model that indicates the pattern represented by the set of data elements and one or more data elements of the set of data elements, and
adding the CPS-G data model sub-graph to the CPS-G data model, wherein a location of the CPS-G data model sub-graph in the CPS-G data model represents a relationship of the pattern of the data elements to other processed data messages of the data stream; and generating, by a logic engine, output data from the CPS-G dataset, wherein the logic engine is configured to update the output data responsive to when the CPS-G data model sub-graph is added to the CPS-G data model; and receiving, at a compute module, the CPS-G dataset through a real-time streaming interface or from a data store;

selecting, based on the instantiated workflow, one or more logic engines for processing the CPS-G dataset, the one or more logic engines being selected from a set of logic engines, each logic engine including a logic model that is unique to that logic engine, the logic model configured for processing the CPS-G dataset; and generating, by the one or more logic engines, intermediate data from the CPS-G dataset, the intermediate data being transformable into one or more different target data models.

2. The method of claim 1, wherein the CPS-G data model comprises a graph organized as an assembly of sub-graphs comprising at least one of a prefix structure, forest, DAG, directed or undirected graph with or without cycles, or a sub-graph data-model structure comprising at least one graph node, and wherein the at least one graph node in the sub-graph data-model structure includes one of a dataset entity, a feature, or a platform.

3. The method of claim 2, wherein each sub-graph of the assembly of sub-graphs comprises another sub-graph, a node, or a prefix structure that configured to provide storage of datasets sorted by frequency of occurrence in a compact representation of dataset patterns or compact pattern stream trees.

4. The method of claim 2, wherein a graph node comprises a multi-dimensional data-structure or tensor data-model.

5. The method of claim 2, wherein a first sub-graph of the assembly of sub-graphs includes a pointer to a second sub-graph, the pointer enabling access to the second sub-graph for an application accessing the first sub-graph.

6. The method of claim 2, wherein a first sub-graph of the assembly of sub-graphs shares a node with a second sub-graph.

7. The method of claim 2, further comprising generating a virtual sub-graph or node to include one or more shared prefix structures among a plurality of sub-graphs.

8. The method of claim 1, wherein the CPS-G data model sub-graph represents a subset of the data stream over one or more of a configurable time-period window, spatial domain, data source, data type of the data stream, and a data pattern of the data stream.

9. The method of claim 1, wherein the data store comprises one of an in-memory data store or a persistent database, wherein the data store is configured to store the data messages, the data elements, or both the data messages and the data elements, and wherein the data store is accessible by a plurality of parallel workflows processing the data stream.

10. The method of claim 1, wherein the logic model is selected from a list comprising:
a supervised machine learning model, an unsupervised machine learning model, a support vector machine, a neural network, a clustering algorithm, a regression algorithm, a swarm engine, a graph neural network algorithm, a genetic learning algorithm, or an evolutionary learning algorithm.

11. The method of claim 1, wherein the one or more logic engines are configured to dynamically unroll the GPS-G dataset in real-time during runtime of the workflow.

12. The method of claim 1, further comprising:
receiving, at a particular data model generator that is designated by the workflow, the intermediate data generated by the one or more logic engines;
transforming the intermediate data into a target data model represented by the particular data model generator, wherein the particular data model generator is associated with a downstream application;
configuring the target data model to a data format specified by the downstream application; and
storing the target data model having the data format for sending to the downstream application.

13. The method of claim 12, wherein the data format is specified by an application programming interface (API) of the downstream application, and wherein the method comprises:
sending the target data model having the data format to the downstream application based on the API.

14. The method of claim 1, wherein the workflow is instantiated as one or more additional workflows each configured to process, in parallel, additional structured data models each generated from the data stream.

15. The method of claim 14, wherein one of the additional structured data models is associated with another domain that is different from a domain of the CPS-G data model.

16. The method of claim 1, wherein disassembling each of the data messages into a set of data elements and associated metadata comprises:
disassembling the data messages into a stream of both real-time and non-real-time workflows based on one or both of a rate analysis and a message velocity analysis, wherein each workflow is annotated with a respective workflow identifier, and wherein the data messages are associated with the respective workflow identifier.

17. The method of claim 1, wherein disassembling each of the data messages into a set of data elements and associated metadata comprises:
applying an adaptive windowing rule to the data stream to partition the data messages into a plurality of data windows, wherein one or more input reservoir windows are provided as a first input stage followed by a second output reservoir window.

18. The method of claim 17, wherein a first size of the one or more input reservoir windows together is equal or greater than a second size the second output reservoir window, wherein the input reservoir windows aggregate the data messages of the data stream.

19. The method of claim 1, further comprising:
receiving the set of data elements and associated metadata at an extract-transform-load (ETL) processor module comprising a semantic layer configured to identify one or more patterns in the set of data elements and the associated metadata;

determining, by the semantic layer, that the CPS-G data model is associated with the one or more patterns in the set of data elements and the associated metadata; and transforming the set of data elements to match a template of the CPS-G data model, wherein the CPS-G data model comprising the set of data elements is generated based on the transformed set of data elements that match the template.

20. The method of claim 19, wherein the ETL processor module is configured to transform the data elements from a first dataset of a first data model into a second dataset of a second data model within the workflow, and wherein first and second datasets are different, and wherein the first data model and the second data model are different.

21. The method of claim 19, wherein the one or more patterns match at least one relevance criterion, and wherein determining that the CPS-G data model is associated with the one or more patterns in the set of data elements and the associated metadata is based on the at least one relevance criterion.

22. The method of claim 1, comprising enabling, by one or more transports and integration interfaces, client access in accordance to a transport type, a protocol type, and interface specifications of each client application or device or network thereof.

23. The method of claim 1, further comprising providing, using the CPS-G data model, real-time viewership measurement, real-time analysis, or targeted digital content delivery based applications.

24. The method of claim 23, wherein the real-time analysis comprises targeted generation of content items for at least one of television, mobile devices, or web-based devices.

25. The method of claim 1, further comprising:
providing, based on the CPS-G dataset, a real-time viewership analysis of the data stream, a real-time visualization of the data stream, or prediction of consumer behavior of digital content consumption based on the data stream.

26. The method of claim 1, wherein the data stream is received from one or more data sources comprising collected chemical or biological sample datasets received from at least one network attached device comprising at least one of a Multisensor device, a nuclear magnetic resonance (NMR/Multisensor) device, a magnetic resonance imaging (MRI) device, an X-Ray device, or another multisensory device, whereby each NMR/Multisensor/MRI/X-Ray device provides a sample collection unit that generates a chemical signature based on at least one of NMR data, X-Ray data, MRI data, or sensor data for various nuclei, gases, liquids, solids, and image patterns as a sample dataset, and wherein a chemical or biological structure is included in the chemical or biological sample datasets, the method comprising:
generating a CPS-G dataset using the sample dataset or the chemical or biological sample datasets;
generating result data based on the CPS-G dataset; and
sending the result data to an application associated with the NMR/Multisensor/MRI/X-Ray device.

27. The method of claim 26, wherein the NMR or Multisensor device includes at least one of:
a gas sensor or a liquid sensors configured to measure a presence or concentration of gas and liquid atoms, molecules and compounds of both organic and inorganic composition;

an environmental sensor including a temperature sensor, pressure sensor, or humidity sensor configured to detect gases and liquid chemistries relevant to environment characteristics including air quality or water pollution; and a medical sensor configured to measure one or more biological processes including a heart-rate, an electrocardiogram (EKG), a blood-pressure, blood oxygen, a patient temperature, a blood chemistry, or a presence of viral or bacterial agents.

28. The method of claim 1, wherein
receiving the data stream including one or more data messages is a first data stream received from a first device, the method comprising:
receiving a second data stream from a second device that is different from the first device; and
wherein the CPS-G dataset is generated based on the first data stream and the second data stream.

29. The method of claim 28, wherein the first device comprises an NMR/Multisensor device or a Multisensor device, including a distributed sample analysis system, wherein the second device comprises an autonomous device, and wherein the first device is coupled to the second device.

30. The method of claim 1, wherein the data stream is generated by at least one autonomous or semi-autonomous system or device.

31. A method for processing data from a plurality of distributed data sources, comprising:
receiving, from a client device, a request for data that is generated from a plurality of autonomous or semi-autonomous devices;
receiving, from the plurality of autonomous or semi-autonomous devices, a plurality of data streams, wherein a first data stream of the plurality of data streams has a first format, and wherein a second data stream of the plurality of data streams has a second format that is different from the first format, the first data stream being received from a first autonomous or semi-autonomous device, and the second data stream being received from a second autonomous or semi-autonomous device;
applying a windowing function to the first data stream and the second data stream to obtain portions of the first and second data streams, the windowing function being based on a geographical location of the first autonomous or semi-autonomous device and the second autonomous or semi-autonomous device, wherein the portions of the first and second data streams are associated with the geographical location;
generating at least one data element representing a data pattern included in the portions of the first and second data stream;
generating a compact pattern stream graph (CPS-G) dataset including the at least one data element, wherein a first sub-graph of the CPS-G dataset is associated with a first geographical location of the first autonomous or semi-autonomous device or the second autonomous or semi-autonomous device, and wherein a second sub-graph of the CPS-G dataset is associated with a second geographical location of the first autonomous or semi-autonomous device or the second autonomous or semi-autonomous device;
processing the CPS-G dataset including the first sub-graph and the second sub-graph using machine learning model selected from a plurality of machine learning models that are available in a local memory;

generating results data based on processing the CPS-G dataset; and transforming the result data into a format specified by an application programming interface (API) of the client device.

32. The method of claim 31, wherein the first format comprises a first communication protocol and wherein the second format comprises a second communication protocol.

33. The method of claim 31, wherein each of the first autonomous or semi-autonomous device and the second autonomous or semi-autonomous device includes an NMR/Multisensor device or Multisensor device, wherein the data pattern comprises T1 or T2 Relaxometry-based chemical signatures for one or more nuclei, and one or more sensor measurements; and wherein the result data comprises a report of the chemical signatures, multiple sensor measurements, timestamps, and associated geographical locations.

34. The method of claim 33, wherein the result data is streamed to the client device in a real-time data stream.

35. A system for real-time processing of a data stream using a graph-based data model, the system comprising:
at least one processor; and
a memory storing instructions that, when executed by the at least one processor, cause the at least one processor to perform operations including:
receiving a data stream including data messages having a plurality of formats;
disassembling the data messages into a set of data elements and associated metadata, the set of data elements having a particular format;
determining, from the associated metadata and the set of data elements, at least one pattern included in the set of data elements;
instantiating a workflow to process the set of data elements based on the pattern, the workflow configured to:
select a compact pattern stream graph (CPS-G) data model based on the particular format of the set of data elements, the CPS-G data model representing processed data messages of the data stream; and
populate the CPS-G data model with data elements from the set of data elements, the CPS-G data model being a CPS-G dataset when populated with the set of data elements;
wherein populating the CPS-G data model comprises:
configuring a CPS-G data model sub-graph to add to the CPS-G data model that indicates the pattern represented by the set of data elements and one or more data elements of the set of data elements; and
adding the CPS-G data model sub-graph to the CPS-G data model, wherein a location of the CPS-G data model sub-graph in the CPS-G data model represents a relationship of the pattern of the data elements to other processed data messages of the data stream; and
generate, by a logic engine, output data from the CPS-G dataset, wherein the logic engine is configured to update the output data responsive to when the CPS-G data model sub-graph is added to the CPS-G data model;
receive, at a compute module, the CPS-G dataset through a real-time streaming interface or from a data store;
select, based on the instantiated workflow, one or more logic engines for processing the CPS-G dataset, the one or more logic engines being selected from a set of logic engines, each logic engine including a logic model that is unique to that logic engine, the logic model configured for processing the CPS-G dataset; and
generate, by the one or more logic engines, intermediate data from the CPS-G dataset, the intermediate data being transformable into one or more different target data models.

36. One or more non-transitory computer-readable media storing instructions for real-time processing of a data stream using a graph-based data model, the instructions causing, when executed by at least one processor, the at least one processor to perform operations including:
receiving a data stream including data messages having a plurality of formats;
disassembling the data messages into a set of data elements and associated metadata, the set of data elements having a particular format;
determining, from the associated metadata and the set of data elements, at least one pattern included in the set of data elements;
instantiating a workflow to process the set of data elements based on the pattern, the workflow configured to:
select a compact pattern stream graph (CPS-G) data model based on the particular format of the set of data elements, the CPS-G data model representing processed data messages of the data stream; and
populate the CPS-G data model with data elements from the set of data elements, the CPS-G data model being a CPS-G dataset when populated with the set of data elements;
wherein populating the CPS-G data model comprises:
configuring a CPS-G data model sub-graph to add to the CPS-G data model that indicates the pattern represented by the set of data elements and one or more data elements of the set of data elements; and
adding the CPS-G data model sub-graph to the CPS-G data model, wherein a location of the CPS-G data model sub-graph in the CPS-G data model represents a relationship of the pattern of the data elements to other processed data messages of the data stream; and
generate, by a logic engine, output data from the CPS-G dataset, wherein the logic engine is configured to update the output data responsive to when the CPS-G data model sub-graph is added to the CPS-G data model;
receiving, at a compute module, the CPS-G dataset through a real-time streaming interface or from a data store;
selecting, based on the instantiated workflow, one or more logic engines for processing the CPS-G dataset, the one or more logic engines being selected from a set of logic engines, each logic engine including a logic model that is unique to that logic engine, the logic model configured for processing the CPS-G dataset; and
generating, by the one or more logic engines, intermediate data from the CPS-G dataset, the intermediate data being transformable into one or more different target data models.

37. A method for real-time processing of a data stream using a graph-based data model, the method comprising:
receiving a data stream comprising data messages representing a biological or chemical structure that includes a plurality of features;

disassembling each of the data messages into a set of data elements and associated metadata, the set of data elements having a particular format;

determining, from the associated metadata and the set of data elements, at least a portion of the biological or chemical structure represented in the set of data elements;

instantiating a workflow to process the set of data elements based on the portion of the biological or chemical structure, the workflow configured to:

configure a compact pattern stream graph (CPS-G) data model based on the particular format of the set of data elements, the CPS-G data model representing processed data messages of the data stream;

populate the CPS-G data model with data elements from the set of data elements, the CPS-G data model being a CPS-G dataset when populated with the set of data elements;

wherein populating the CPS-G data model comprises:

accessing logic of a graph neural network (GNN) that is trained with training data representing one or more biological or chemical structures;

inputting one or more data elements of the set of data elements into the GNN; and generating, by the logic of the GNN based on the one or more data elements, a feature vector predicting a feature value of at least one feature of the biological or chemical structure;

determining, based on the feature vector, at least one of:
- a relationship of the at least one feature to at least one other feature of the plurality of features, the relationship indicative of a structural relationship or a biological or chemical interaction of the biological or chemical structure; or
- a presence of a feature in the biological or chemical structure that improves a utility of the portion of the biological or chemical structure represented in the set of data elements, the utility being improved relative to the portion of the portion of the biological or chemical structure without the feature; and generating output data from the CPS-G dataset comprising
- the relationship indicative of the structural relationship or the respective interaction of the biological or chemical structure, or
- an indication of the presence of a feature in the biological or chemical structure that improves the utility of the portion of the biological or chemical structure represented in the set of data elements.

* * * * *

UNITED STATES PATENT AND TRADEMARK OFFICE
CERTIFICATE OF CORRECTION

| | | |
|---|---|---|
| PATENT NO. | : 11,630,826 B2 | Page 1 of 1 |
| APPLICATION NO. | : 17/328983 | |
| DATED | : April 18, 2023 | |
| INVENTOR(S) | : Richard Neill | |

It is certified that error appears in the above-identified patent and that said Letters Patent is hereby corrected as shown below:

On the Title Page

Item (57), Column 2, Line 3-4, delete "data messages data elements" and insert -- data messages, data elements --

In the Claims

Column 56, Line 8, Claim 27, delete "(EKG)," and insert -- (ECG), --

Column 60, Line 14, Claim 37, delete "portion of the portion of the" and insert -- portion of the --

Signed and Sealed this
Twenty-seventh Day of June, 2023

Katherine Kelly Vidal
*Director of the United States Patent and Trademark Office*